(12) United States Patent
Ota et al.

(10) Patent No.: US 10,779,468 B2
(45) Date of Patent: Sep. 22, 2020

(54) FOLDABLE WORKING MACHINE WITH SAFETY SWITCH TO ENABLE OPERATION

(71) Applicant: MAKITA CORPORATION, Anjo-shi, Aichi (JP)

(72) Inventors: Tomoyuki Ota, Anjo (JP); Yoshifumi Morita, Anjo (JP); Takeshi Nishimiya, Anjo (JP); Michisada Yabuguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 458 days.

(21) Appl. No.: 15/461,777

(22) Filed: Mar. 17, 2017

(65) Prior Publication Data

US 2017/0273239 A1 Sep. 28, 2017

(30) Foreign Application Priority Data

Mar. 23, 2016 (JP) .................................. 2016-058960

(51) Int. Cl.
*A01D 34/82* (2006.01)
*A01D 34/90* (2006.01)
*A01D 34/68* (2006.01)

(52) U.S. Cl.
CPC .......... *A01D 34/828* (2013.01); *A01D 34/68* (2013.01); *A01D 34/902* (2013.01)

(58) Field of Classification Search
CPC ........ A01G 3/053; A01G 3/085; A01G 3/086; A01G 3/088; A01D 34/81; A01D 34/90; A01D 34/4167; A01D 34/6818
(Continued)

(56) References Cited

U.S. PATENT DOCUMENTS 4,122,601 A * 10/1978 Katsuya ................. A01D 34/90
172/41
4,829,675 A * 5/1989 Beihoffer ............. A01D 34/822
30/276
(Continued)

FOREIGN PATENT DOCUMENTS

JP 2002-354922 A 12/2002
JP 2004-362949 A 12/2004
(Continued)

OTHER PUBLICATIONS

Aug. 20, 2019 Office Action issued in Japanese Patent Application No. 2016-058960.
(Continued)

*Primary Examiner* — Jason Daniel Prone
*Assistant Examiner* — Samuel A Davies
(74) *Attorney, Agent, or Firm* — Oliff PLC

(57) ABSTRACT

A working machine according to one aspect of the present disclosure comprises an operation rod, a leading end unit, a rear end unit, and a drive permitter. The operation rod is configured to be transformable between an extended state and a non-extended state. The leading end unit is provided at one end of the operation rod. The leading end unit comprises a motor configured to drive a working element. The rear end unit is provided at the other end of the operation rod. The rear end unit comprises a controller configured to control driving of the motor. The drive permitter is configured to permit driving of the motor when the operation rod is in the extended state and not to permit driving of the motor when the operation rod is in the non-extended state.

6 Claims, 25 Drawing Sheets

(58) Field of Classification Search
USPC .................. 30/276, 296.1; 403/310–312
See application file for complete search history.

(56) References Cited

U.S. PATENT DOCUMENTS

| | | | | |
|---|---|---|---|---|
| 4,899,446 A * | 2/1990 | Akiba | ................ | A01D 34/90 |
| | | | | 30/276 |
| 5,261,162 A * | 11/1993 | Siegler | ................ | A01G 3/053 |
| | | | | 30/216 |
| 5,802,724 A * | 9/1998 | Rickard | ................ | A01D 34/90 |
| | | | | 30/276 |
| 2013/0075122 A1 | 3/2013 | Yamada et al. | | |
| 2014/0102064 A1* | 4/2014 | Yamaoka | ................ | A01D 34/824 |
| | | | | 56/10.5 |
| 2016/0021819 A1* | 1/2016 | Nakano | ................ | A01G 3/062 |
| | | | | 30/276 |
| 2016/0278288 A1* | 9/2016 | Yamaoka | ................ | A01D 34/81 |

FOREIGN PATENT DOCUMENTS

| | | | |
|---|---|---|---|
| JP | 2011-045345 A | | 3/2011 |
| JP | 2011-254760 A | | 12/2011 |
| JP | 2013-146241 A | | 8/2013 |
| JP | 2013-165678 A | | 8/2013 |
| JP | 2013-198432 A | | 10/2013 |
| JP | 2014-147312 A | | 8/2014 |

OTHER PUBLICATIONS

Apr. 7, 2020 Office Action issued in Japanese Application No. 2016-058960.

* cited by examiner

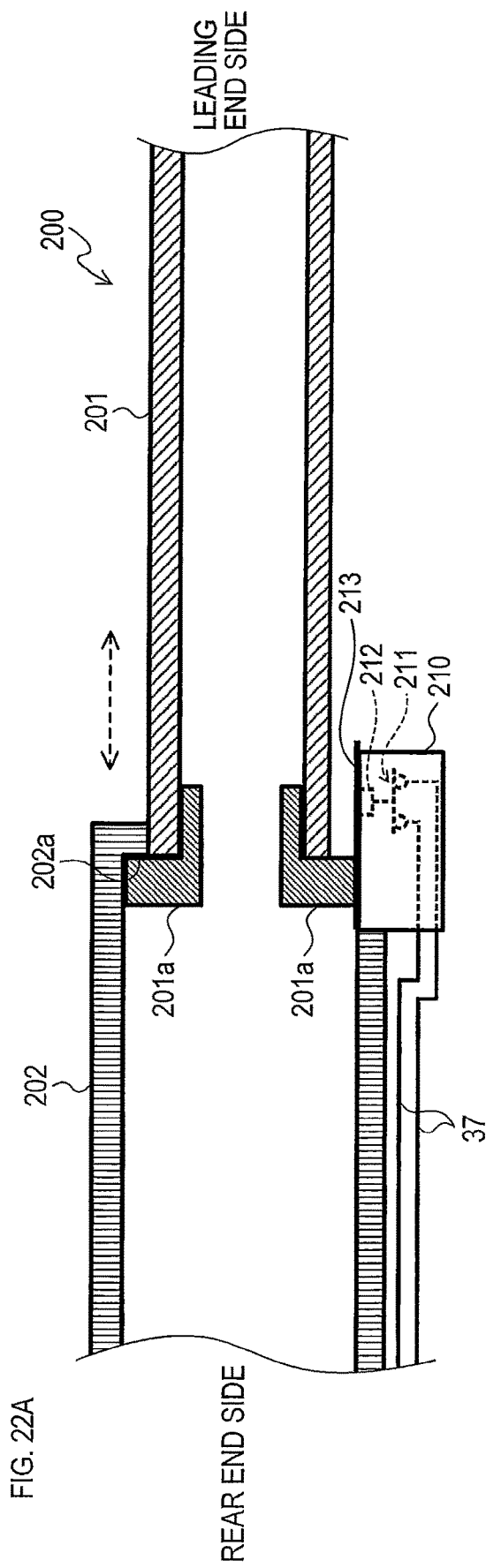
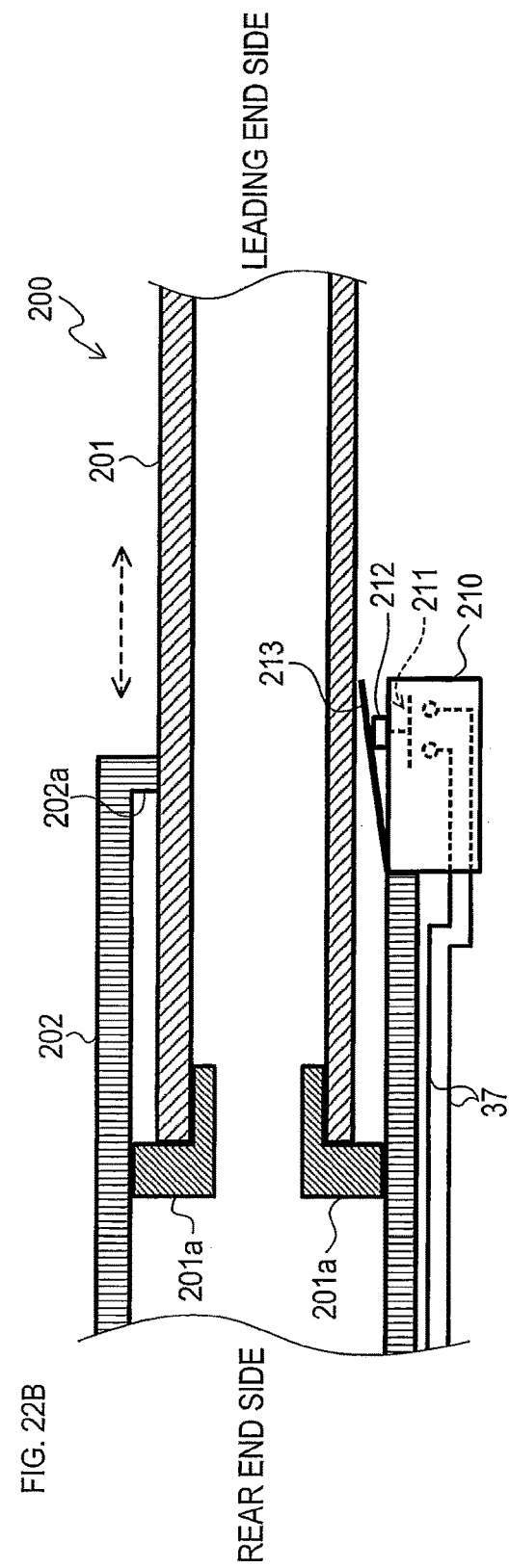

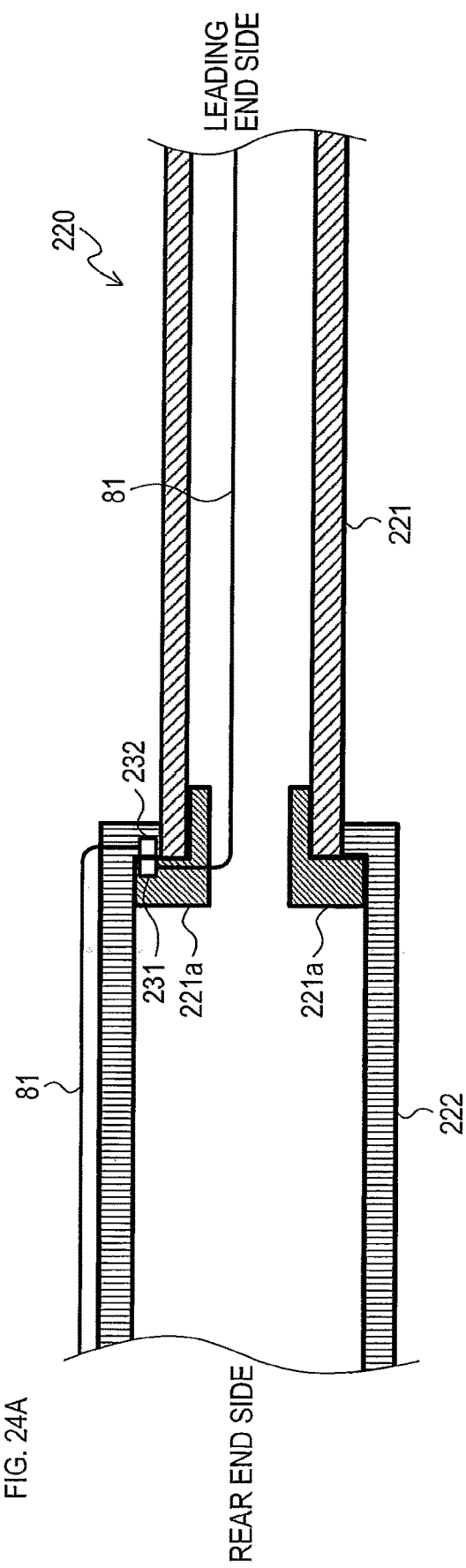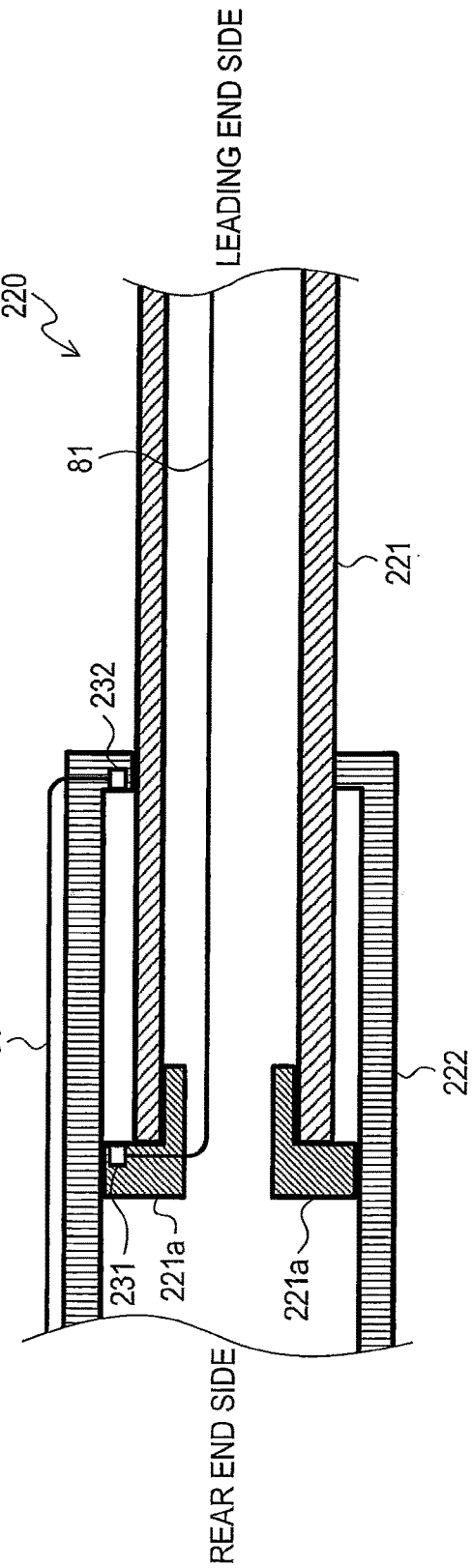

FOLDABLE WORKING MACHINE WITH SAFETY SWITCH TO ENABLE OPERATION

CROSS-REFERENCE TO RELATED APPLICATIONS

This application claims the benefit of Japanese Patent Application No. 2016-058960 filed on Mar. 23, 2016 with the Japan Patent Office, the entire disclosure of which is incorporated herein by reference.

BACKGROUND

The present disclosure relates to a working machine comprising an operation rod.

Known as a working machine comprising an operation rod is, for example, a brush cutter comprising a disk-shaped cutting blade at a leading end of the operation rod. The cutting blade is rotationally driven by a motor. Rotation of the cutting blade enables brush-cutting operation on grass, trees, and so on.

As a technique to improve portability and storability of such a brush cutter, a technique to configure the operation rod to be dividable is suggested in Japanese Unexamined Patent Application Publication No. 2011-254760.

SUMMARY

However, according to the aforementioned technique, the brush cutter is physically separated into two parts. Thus, a user is forced to hold the two parts when, for example, carrying the brush cutter, and its portability is not necessarily improved. Additionally, managerial burden for appropriately managing the separated two parts is increased.

It is desired, in the working machine comprising the operation rod, that the present disclosure be capable of making the length of the working machine not in use shorter than that in use, while inhibiting decrease in portability and storability.

A working machine according to one aspect of the present disclosure comprises an operation rod, a leading end unit, a rear end unit, and a drive permitter. The operation rod is configured to be transformable between an extended state and a non-extended state. The leading end unit is provided at one end of the operation rod. The leading end unit comprises a motor configured to drive a working element. The rear end unit is provided at the other end of the operation rod. The rear end unit comprises a controller configured to control driving of the motor. The drive permitter is configured to permit driving of the motor when the operation rod is in the extended state, and configured not to permit driving of the motor when the operation rod is in the non-extended state.

Since the thus-configured working machine comprises the operation rod configured to be transformable, when the working machine is in a non-use state, such as a carried state and a stored state, the length of the working machine can be shortened as compared with that in the extended state by bringing the operation rod into the non-extended state. The operation rod need not be divided physically in order to shorten the length of the working machine. Moreover, when the operation rod is in the non-extended state, driving of the motor is not permitted.

Thus, according to the aforementioned configuration of the working machine, the length of the working machine in the non-use state can be shortened as compared with that in a use state, while inhibiting decrease in portability and storability.

Examples of the configuration in which the operation rod is transformable may include a configuration in which the operation rod is foldable and a configuration in which the operation rod is extendable and contractible by virtue of a telescopic mechanism. Thus, the operation rod may be configured to be foldable. The operation rod may be configured to be transformable between the extended state, in which the operation rod extends in a longitudinal direction, and the non-extended state, in which the operation rod is shorter in length in the longitudinal direction than that in the extended state.

According to another aspect of the present disclosure, a working machine comprising an operation rod configured to be foldable, a leading end unit, a rear end unit, and drive permitter may be provided. The leading end unit may be provided at one end of the operation rod. The leading end unit may comprise a motor configured to drive a working element. The rear end unit may be provided at the other end of the operation rod. The rear end unit may comprise a controller configured to control driving of the motor. The drive permitter may be configured to permit driving of the motor when the operation rod is in an extended state, in which the operation rod is not folded, and configured not to permit driving of the motor when the operation rod is in a non-extended state, in which the operation rod is folded.

The extended state may be understood as a normal state in which a user of the working machine performs some operation using the working machine. A boundary between the extended state and the non-extended state can be decided as appropriate. For example, a state in which the operation rod is not folded at all may be understood as the extended state, and a state in which the operation rod is folded even if only slightly may be understood as the non-extended state. Alternatively, the extended state may be understood as ranging from the state in which the operation rod is not folded at all to a state in which the operation rod is folded at a specified angle, and the non-extended state may be understood as a state in which the operation rod is further folded at an angle greater than the specified angle.

For example, the working machine may be configured such that driving of the motor is not permitted when the operation rod is folded from the state in which it is folded at the specified angle to the state in which it is further folded at the angle greater than the specified angle.

The working machine may comprise a plurality of conductors for electrically driving the motor. In this case, the drive permitter may comprise a wiring breaker. The wiring breaker may be configured not to permit driving of the motor by breaking at least one conductor of the plurality of conductors when the operation rod is in the non-extended state.

According to the thus-configured working machine, when the operation rod is brought into the non-extended state, the at least one conductor is broken, and driving of the motor is thereby not permitted. Thus, permission/non-permission of driving of the motor in the extended state/non-extended state, respectively, can be achieved by the simple configuration.

The working machine may comprise an operating portion and an operation signal outputter. The operating portion may be configured to receive a driving operation. The operation signal outputter may be configured to output an operation signal when the driving operation is performed on the operating portion.

The plurality of conductors may comprise at least one operation signal conductor for inputting the operation signal to the controller. The controller may be configured to drive the motor when the operation signal is inputted from the operation signal outputter via the at least one operation signal conductor. At least one conductor of the at least one operation signal conductor may be broken by the wiring breaker.

According to the thus-configured working machine, when the operation rod is brought into the non-extended state, the at least one conductor of the at least one operation signal conductor is broken, and the operation signal is thereby not inputted to the controller. Thus, it can be inhibited that the motor is driven when the operation rod is in the non-extended state.

The plurality of conductors may comprise a plurality of inter-unit conductors arranged between the rear end unit and the leading end unit so as to run along the operation rod. At least one conductor of the plurality of inter-unit conductors may be broken by the wiring breaker.

According to the thus-configured working machine, when the operation rod is brought into the non-extended state, the at least one conductor of the plurality of inter-unit conductors is broken, and driving of the motor is thereby not permitted. The configuration to break the at least one conductor of the plurality of inter-unit conductors when the operation rod is in the folded state can be easily established.

The plurality of inter-unit conductors may comprise a plurality of motor power-feed conductors for supplying the motor with a power for driving the motor from the rear end unit. At least one conductor of the plurality of motor power-feed conductors may be broken by the wiring breaker.

According to the thus-configured working machine, when the operation rod is brought into the non-extended state, the at least one conductor of the plurality of motor power-feed conductors is broken, and power feeding to the motor is thereby inhibited. Thus, it can be inhibited that the motor is driven when the operation rod is in the non-extended state.

The leading end unit may comprise a position signal outputter configured to output a position signal indicating a rotational position of the motor. The plurality of conductors may comprise at least one position signal conductor for inputting the position signal to the controller. The at least one position signal conductor may be arranged between the rear end unit and the leading end unit so as to run along the operation rod.

The controller may be configured to control driving of the motor on the basis of the position signal inputted from the position signal outputter via the at least one position signal conductor. The controller may be configured not to drive the motor when the position signal is in a specific abnormal state. At least one conductor of the at least one position signal conductor may be broken by the wiring breaker. The working machine may be configured such that, when the at least one conductor of the at least one position signal conductor is broken by the wiring breaker, the position signal inputted to the controller becomes the specific abnormal state.

According to the thus-configured working machine, when the operation rod is brought into the non-extended state, the at least one conductor of the at least one position signal conductor is broken to thereby cause the specific abnormal state, and the controller does not drive the motor. Thus, it can be inhibited that the motor is driven when the operation rod is in the non-extended state.

The leading end unit may comprise a position signal outputter configured to operate during supply of a power-supply power thereto from the rear end unit and configured to output a position signal indicating a rotational position of the motor. The plurality of conductors may comprise at least one power-supply conductor for supplying the power-supply power from the rear end unit to the position signal outputter. The at least one power-supply conductor may be arranged between the rear end unit and the leading end unit so as to run along the operation rod.

The controller may be configured to control driving of the motor on the basis of the position signal outputted from the position signal outputter and configured not to drive the motor when the position signal is in a specific abnormal state. At least one conductor of the at least one power-supply conductor may be broken by the wiring breaker. The working machine may be configured such that, when the at least one conductor of the at least one power-supply conductor is broken by the wiring breaker, the position signal inputted to the controller becomes the specific abnormal state.

According to the thus-configured working machine, when the operation rod is brought into the non-extended state, the at least one conductor of the at least one power-supply conductor is broken to thereby cause the specific abnormal state, and the controller does not drive the motor. Thus, it can be inhibited that the motor is driven when the operation rod is in the non-extended state.

The working machine may comprise a battery pack comprising a battery. The battery pack may be configured to be attachable to and detachable from the rear end unit. The motor may be configured to be driven by a battery power, which is a power supplied from the battery, when the battery pack is in a state attached to the rear end unit. The drive permitter may comprise at least one power interrupter and an interrupt signal outputter. The at least one power interrupter may be provided on a supply path of the battery power from the battery to the motor and may be configured to electrically interrupt the supply path when an interrupt signal is inputted from the interrupt signal outputter to the at least one power interrupter. The interrupt signal outputter may be configured to output the interrupt signal to the at least one power interrupter when the operation rod is in the non-extended state.

According to the thus-configured working machine, when the operation rod is brought into the non-extended state, the supply path of the battery power is interrupted, whereby the power is not supplied to the motor. Thus, it can be inhibited that the motor is driven when the operation rod is in the non-extended state.

The at least one power interrupter may be provided to at least one of the battery pack or the rear end unit.

The rear end unit may comprise an information outputter that outputs state information indicating whether the operation rod is in the non-extended state to the battery pack. The interrupt signal outputter may be provided to the battery pack. The interrupt signal outputter may be output the interrupt signal to the at least one power interrupter when the state information outputted from the information outputter indicates that the operation rod is in the non-extended state. According to the thus-configured working machine, the interrupt signal outputter can output the interrupt signal at an appropriate timing on the basis of the state information outputted from the information outputter.

In the working machine comprising the aforementioned information outputter, the leading end unit may further comprise a position signal outputter configured to output a position signal indicating a rotational position of the motor. At least one position signal conductor for inputting the position signal to the controller may be arranged between the rear end unit and the leading end unit so as to run along the operation rod. The working machine may comprise a wiring breaker configured to break at least one conductor of the at least one position signal conductor when the operation rod is in the non-extended state. The working machine may be configured such that, when the at least one conductor is broken by the wiring breaker, the position signal inputted to the controller becomes a specific abnormal state. The information outputter may be configured to output information indicating contents of the position signal inputted to the controller as the state information. The interrupt signal outputter may be configured to output the interrupt signal to the at least one power interrupter on the basis of the state information when the position signal is in the specific abnormal state.

According to the thus-configured working machine, the interrupt signal outputter can determine that the operation rod is brought into the non-extended state and that the position signal is in the specific abnormal state on the basis of the state information from the information outputter. Thus, it is possible to interrupt power supply to the motor by appropriately interrupting the supply path of the battery power when the operation rod is brought into the non-extended state and to thereby inhibit the motor from being driven.

The rear end unit may comprise a power supplier configured to supply the controller with a power-supply power for operation of the controller. The controller may be operated by the power-supply power supplied from the power supplier. In this case, the power supplier may function as the drive permitter. Specifically, the power supplier may be configured not to supply the controller with the power-supply power when the operation rod is in the non-extended state.

According to the thus-configured working machine, when the operation rod is brought into the non-extended state, the power-supply power is not supplied to the controller, whereby the controller stops operation and does not drive the motor. Thus, it can be inhibited that the motor is driven when the operation rod is in the non-extended state.

The working machine may comprise a rod state detector configured to detect whether the operation rod is in the non-extended state. The power supplier may stop supply of the power-supply power to the controller when the operation rod is detected to be in the non-extended state by the rod state detector.

According to the thus-configured working machine, when the operation rod is brought into the non-extended state, the power supplier can appropriately stop supply of the power-supply power to the controller on the basis of a detection result by the rod state detector.

The drive permitter may comprise a wiring breaker and a break determiner. The working machine may comprise a plurality of conductors for electrically driving the motor. The plurality of conductors may be arranged between the rear end unit and the leading end unit so as to run along the operation rod. The wiring breaker may be configured to break at least one conductor of the plurality of conductors when the operation rod is in the non-extended state. The break determiner may be configured to determine whether the at least one conductor is broken. The controller may be configured not to drive the motor when the at least one conductor is determined to be broken by the break determiner.

According to the thus-configured working machine, a break caused by the wiring breaker is determined to be present by the break determiner, and the controller inhibits driving of the motor on the basis of such determination. Thus, it can be inhibited that the motor is driven when the operation rod is in the non-extended state.

The wiring breaker may comprise a switch and a switch operating portion that operates the switch. The switch may be provided to the at least one conductor, in order to complete and break the at least one conductor. The switch operating portion may be configured to cause the switch to complete the at least one conductor when the operation rod is in the extended state. The switch operating portion may be configured to cause the switch to break the at least one conductor when the operation rod is in the non-extended state.

The wiring breaker may comprise a pair of connectors. The pair of connectors may be provided to the at least one conductor. The wiring breaker may be configured such that the at least one conductor is completed by coupling of the pair of connectors when the operation rod is in the extended state and such that the at least one conductor is broken by separation of the pair of connectors when the operation rod is in the non-extended state.

According to another aspect of the present disclosure, a working machine may be provided that comprises an operation rod configured to be transformable between an extended state, in which the operation rod extends in a longitudinal direction, and a non-extended state, in which the operation rod is shorter in length in the longitudinal direction than that in the extended state; a leading end unit; a rear end unit; a plurality of conductors for electrically driving a motor; and a wiring breaker. The leading end unit may be provided at one end of the operation rod. The leading end unit may comprise the motor configured to drive a working element. The rear end unit may be provided at the other end of the operation rod. The rear end unit may comprise a controller configured to control driving of the motor. The wiring breaker may be configured to permit driving of the motor by completing the plurality of conductors when the operation rod is in the extended state and configured not to permit driving of the motor by breaking at least one conductor of the plurality of conductors when the operation rod is in the non-extended state.

This working machine may comprise an operating portion and an operation signal outputter. The plurality of conductors may comprise at least one operation signal conductor for inputting the operation signal from the operation signal outputter to the controller. The controller may be configured to drive the motor when the operation signal is inputted from the operation signal outputter via the at least one operation signal conductor. At least one conductor of the at least one operation signal conductor may be broken by the wiring breaker.

According to the thus-configured working machine, when the operation rod is brought into the non-extended state, the at least one conductor of the at least one operation signal conductor is broken to thereby stop input of the operation signal to the controller. Thus, it can be inhibited that the motor is driven when the operation rod is in the non-extended state.

The leading end unit may comprise a position signal outputter configured to output a position signal indicating a rotational position of the motor. At least one position signal conductor for inputting the position signal to the controller may be arranged between the rear end unit and the leading end unit so as to run along the operation rod. The controller may be configured to control driving of the motor on the basis of the position signal inputted from the position signal outputter via the at least one position signal conductor and configured not to drive the motor when the position signal is in a specific abnormal state. At least one conductor of the at least one position signal conductor may be broken by the wiring breaker. The working machine may be configured such that, when the at least one conductor of the at least one position signal conductor is broken by the wiring breaker, the position signal inputted to the controller becomes the specific abnormal state.

According to the thus-configured working machine, when the operation rod is brought into the non-extended state, the at least one conductor of the at least one position signal conductor is broken to thereby cause the specific abnormal state, and the controller does not drive the motor. Thus, it can be inhibited that the motor is driven when the operation rod is in the non-extended state.

The leading end unit may comprise a position signal outputter configured to operate during supply of a power-supply power thereto from the rear end unit and configured to output a position signal indicating a rotational position of the motor. At least one power-supply conductor for supplying the power-supply power from the rear end unit to the position signal outputter may be arranged between the rear end unit and the leading end unit so as to run along the operation rod. The controller may be configured to control driving of the motor on the basis of the position signal outputted from the position signal outputter and configured not to drive the motor when the position signal is in a specific abnormal state. At least one conductor of the at least one power-supply conductor may be broken by the wiring breaker. The working machine may be configured such that, when the at least one conductor of the at least one power-supply conductor is broken by the wiring breaker, the position signal inputted to the controller becomes the specific abnormal state.

According to the thus-configured working machine, when the operation rod is brought into the non-extended state, the at least one conductor of the at least one power-supply conductor is broken to thereby cause the specific abnormal state, and the controller does not drive the motor. Thus, it can be inhibited that the motor is driven when the operation rod is in the non-extended state.

According to another aspect of the present disclosure, a working machine may be provided that comprises: an operation rod configured to be transformable between an extended state, in which the operation rod extends in a longitudinal direction, and a non-extended state, in which the operation rod is shorter in length in the longitudinal direction than that in the extended state; a leading end unit provided at one end of the operation rod and comprising a motor configured to drive a working element; and a rear end unit provided at the other end of the operation rod and comprising a controller configured to control driving of the motor. The rear end unit may comprise a power supplier configured to supply the controller with a power-supply power for operation of the controller. The controller may be configured to be operated by the power-supply power supplied from the power supplier. The power supplier may be configured not to supply the controller with the power-supply power when the operation rod is in the non-extended state.

According to the thus-configured working machine, when the operation rod is brought into the non-extended state, the power-supply power is not supplied to the controller, whereby the controller stops operation and does not drive the motor. Thus, it can be inhibited that the motor is driven when the operation rod is in the non-extended state.

The working machine may comprise a rod state detector that detects whether the operation rod is in the non-extended state. The power supplier may stop supply of the power-supply power to the controller when the operation rod is detected to be in the non-extended state by the rod state detector.

According to another aspect of the present disclosure, a working machine may be provided that comprises: an operation rod configured to be transformable between an extended state, in which the operation rod extends in a longitudinal direction, and a non-extended state, in which the operation rod is shorter in length in the longitudinal direction than that in the extended state; a leading end unit provided at one end of the operation rod and comprising a motor configured to drive a working element; a rear end unit provided at the other end of the operation rod and comprising a controller configured to control driving of the motor; a plurality of conductors for electrically driving the motor, arranged between the rear end unit and the leading end unit so as to run along the operation rod; a wiring breaker configured to break at least one conductor of the plurality of conductors when the operation rod is in the non-extended state; and a break determiner that determines whether the at least one conductor is broken. The controller is configured not to drive the motor when the at least one conductor is determined to be broken by the break determiner.

According to the thus-configured working machine, when the operation rod is brought into the non-extended state and the at least one conductor is broken by the wiring breaker, such a break is determined to be present by the break determiner, and driving of the motor by the controller is not performed on the basis of such determination. Thus, it can be inhibited that the motor is driven when the operation rod is in the non-extended state.

BRIEF DESCRIPTION OF THE DRAWINGS

Example embodiments of the present disclosure will be described below with reference to the accompanying drawings, in which:

FIG. 22A is an explanatory diagram showing an extended state of a pipe unit in a brush cutter of a thirteenth embodiment, and FIG. 22B is an explanatory diagram showing a contracted state of the pipe unit in the brush cutter of the thirteenth embodiment;

FIG. 24A is an explanatory diagram showing an extended state of a pipe unit in a brush cutter of a fourteenth embodiment, and FIG. 24B is an explanatory diagram showing a contracted state of the pipe unit in the brush cutter of the fourteenth embodiment.

DETAILED DESCRIPTION OF THE PREFERRED EMBODIMENTS

First Embodiment (1) Overall Structure of Brush Cutter

Figure 1:
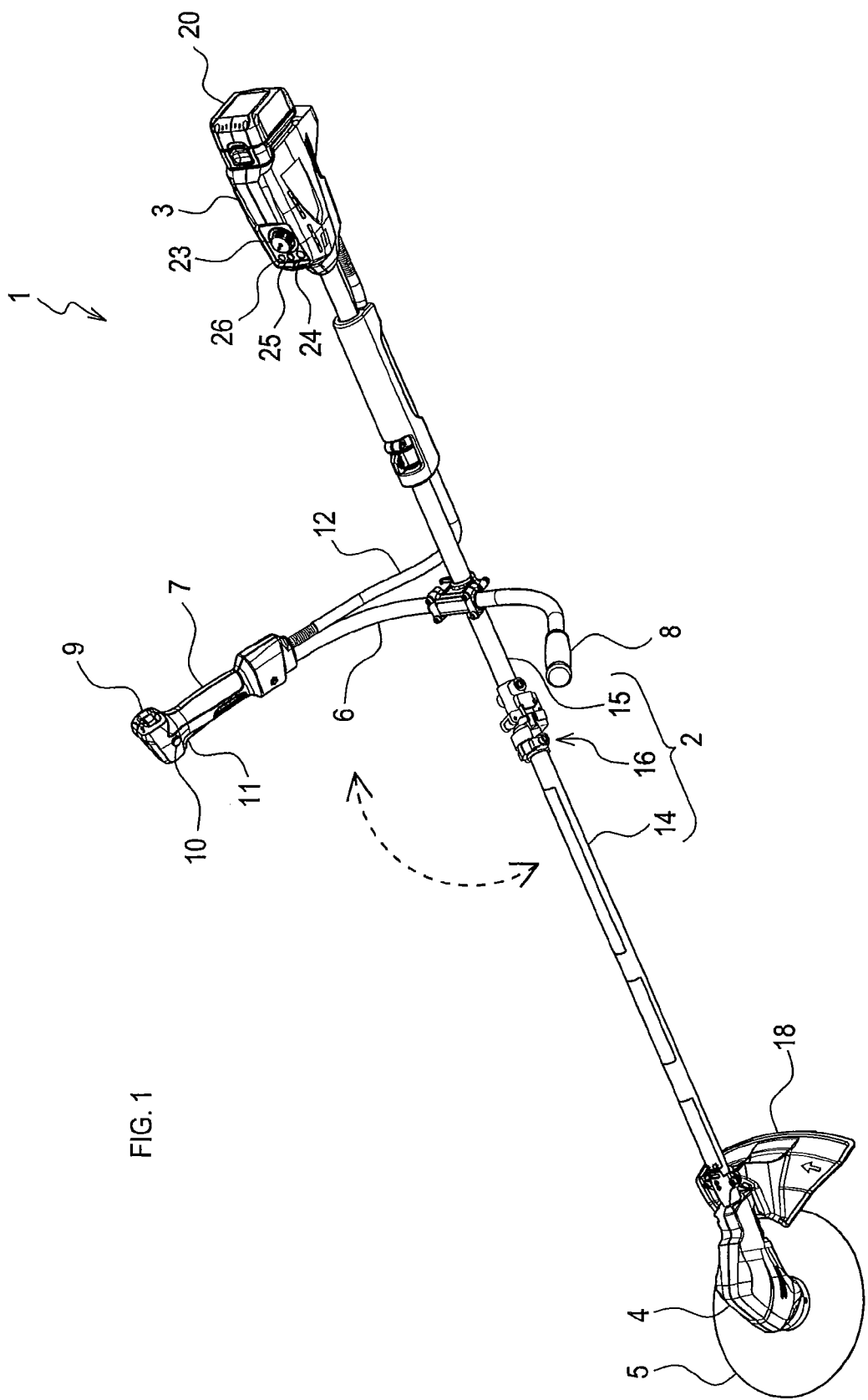
FIG. 1 is a perspective view of a brush cutter of a first embodiment.

As shown in FIG. 1, a brush cutter 1 comprises a pipe unit 2, a rear end unit 3, a leading end unit 4, and a handle 6. The pipe unit 2 is configured to be of an elongated tubular shape as a whole. The leading end unit 4 is provided at one of longitudinal both ends of the pipe unit 2, and the rear end unit 3 is provided at the other one of the longitudinal both ends of the pipe unit 2.

The pipe unit 2 comprises a first pipe 14, a second pipe 15, and a coupling portion 16. The coupling portion 16 couples the first pipe 14 and the second pipe 15 to each other. The first pipe 14 is coupled to one end of the coupling portion 16, and the second pipe 15 is coupled to the other end of the coupling portion 16.

The coupling portion 16 is a tubular member as a whole, and is configured to be foldable at its approximately middle portion. Thus, the pipe unit 2 can be folded at the coupling portion 16 in a direction shown by a dashed arrow in the drawing. In other words, the brush cutter 1 can be folded at the coupling portion 16.

FIG. 1 shows a non-folded state of the pipe unit 2, i.e., a state in which the pipe unit 2 is in an extended state. In one example, when the pipe unit 2 is in the extended state, the first pipe 14 and the second pipe 15 are aligned coaxially.

A cutting blade 5 is mounted to the leading end unit 4 in an attachable and detachable manner. The cutting blade 5 is a working element that clips subjects to be clipped, such as grass and small-diameter trees (hereinafter also referred to as "plants"). The cutting blade 5 is, for example, made of metal. The cutting blade 5 has a disk shape, and has saw blade-like teeth formed on a circumference thereof over its entirety.

Figure 7:
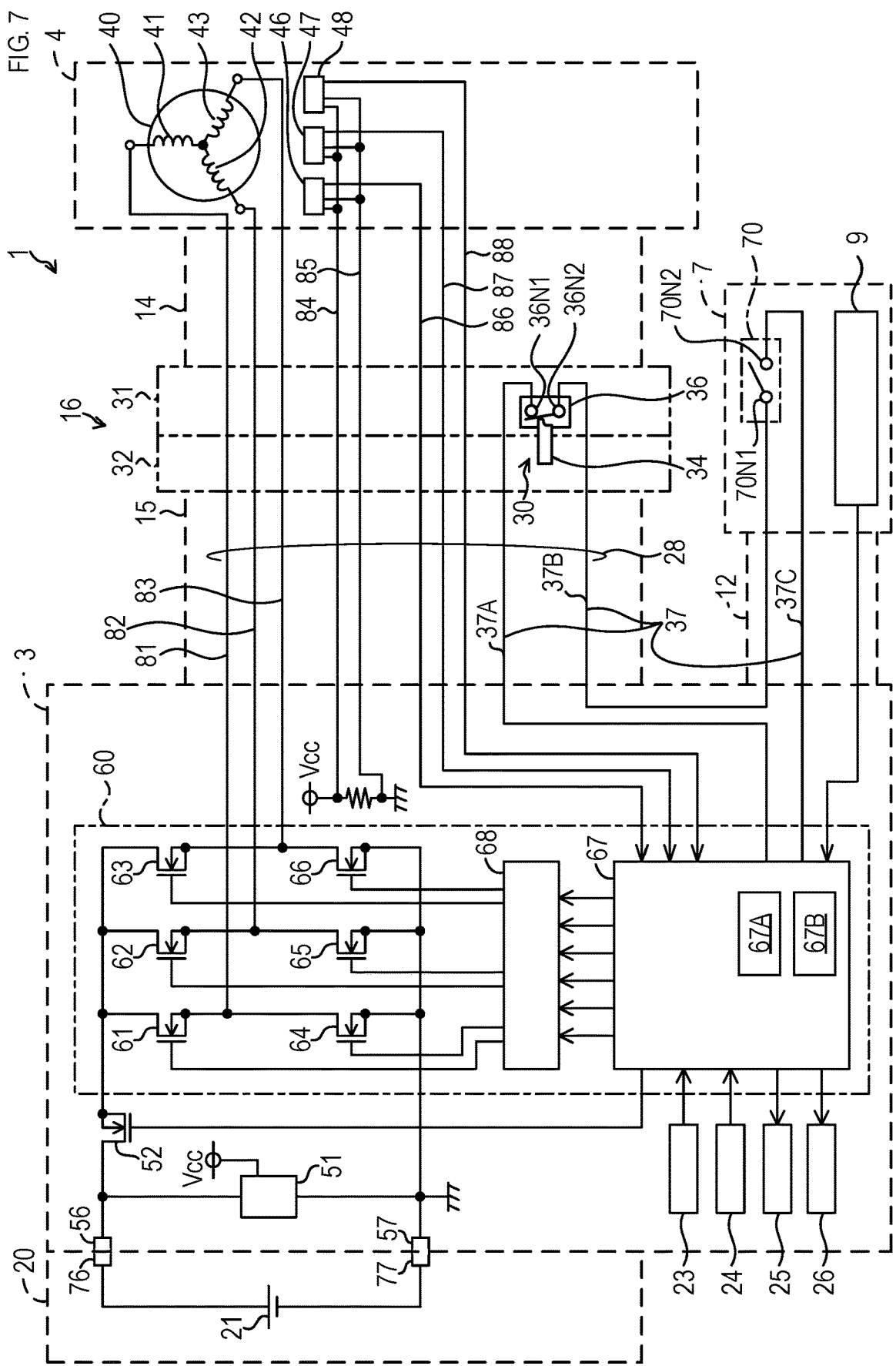
FIG. 7 is an explanatory diagram showing an electrical configuration of the brush cutter of the first embodiment.

Mounted to the leading end unit 4 is a motor 40 that rotationally drives the cutting blade 5. In FIG. 1, illustration of the motor 40 is omitted. The motor 40 is shown in FIG. 7. Rotating force of the motor 40 is transmitted to a not-shown drive shaft via a not-shown deceleration mechanism. The cutting blade 5 is mounted to this drive shaft. When the motor 40 is rotated, its rotating force is transmitted to the drive shaft to thereby rotate the cutting blade 5 together with the drive shaft. The plants can be cut down by bringing an outer peripheral part of the rotating cutting blade 5 into contact with the plants, to thereby enable plants clipping operation.

Here, a longitudinal direction of the pipe unit 2 is also referred to as a front-rear direction. Specifically, a direction from the pipe unit 2 toward the leading end unit 4 is referred to as a leading end direction, and a downstream side of a certain portion in the leading end direction is referred to as a leading end side of the portion. A direction from the pipe unit 2 toward the rear end unit 3 is referred to as a rear end direction, and a downstream side of a certain portion in the rear end direction is referred to as a rear end side of the portion. A direction perpendicular to the front-rear direction and parallel to a face of the cutting blade 5 is referred to as a left-right direction. A direction perpendicular to both the front-rear direction and the left-right direction is referred to as an up-down direction.

Provided at the leading end side of the pipe unit 2 is a cover 18. The cover 18 is provided to inhibit the plants clipped by the cutting blade 5 from being blown toward an operator. The operator corresponds to a user of the brush cutter 1.

The handle 6 is of a U-shape and is coupled to the pipe unit 2 in the vicinity of a middle position of the pipe unit 2 in the front-rear direction. More specifically, the handle 6 is coupled to a specified position on the leading end side of the second pipe 15. Provided at one of both ends of the handle 6 is a right grip 7 to be grasped by a right hand of the operator, and provided at the other end is a left grip 8 to be grasped by a left hand of the operator.

Provided on an upper side of the right grip 7 is a reverse switch 9, a lock-off button 10, and a trigger operating portion 11. The reverse switch 9 is configured to switch a rotation direction of the motor 40, i.e., a rotation direction of the cutting blade 5, to either of a forward rotation or a reverse rotation. For example, a rocker switch is adopted as the reverse switch 9. When the operator presses one side (for example, a left side) of the reverse switch 9, the rotation direction of the cutting blade 5 is set to the forward rotation (for example, a counterclockwise rotation), whereas when the operator presses the other side (for example, a right side) of the reverse switch 9, the rotation direction of the cutting blade 5 is set to the reverse rotation (for example, a clockwise rotation). The forward rotation is a rotation direction to be set to when the plants are clipped, and the reverse rotation is a rotation direction to be set to when the plants tangled in the cutting blade 5 are removed.

The trigger operating portion 11 is an operation member that receives an operation by the user of the brush cutter 1, specifically, that receives a driving operation for rotationally driving the motor 40. Within the right grip 7, a trigger switch 70 is integrated that is operated in conjunction with the trigger operating portion 11. The trigger switch 70 is turned on when the trigger operating portion 11 is subject to the driving operation (for example, a pulling operation), and is turned off when the trigger operating portion 11 is not subject to the driving operation. As shown in FIG. 7, trigger switch 70 includes first node 70N1 and second node 70N2.

When the operator performs the driving operation on the trigger operating portion 11 to thereby turn on the trigger switch 70, a current is applied to the motor 40 to thereby rotate the motor 40. Such a driving operation is performed in a state in which the brush cutter 1 is in the extended state and in which the brush cutter 1 is activated by turning on a main switch 24. When the main switch 24 is turned on, a motor controller 67 shown in FIG. 7 is activated.

The trigger operating portion 11 cannot be subject to the driving operation unless the lock-off button 10 is in a pressed state. The lock-off button 10 is a button for inhibiting an erroneous motion of the cutting blade 5. When the lock-off button 10 is in a non-pressed state, the lock-off button 10 is mechanically engaged with the trigger operating portion 11. This regulates a motion of the trigger operating portion 11, and the operator cannot perform the driving operation on the trigger operating portion 11.

Provided between the right grip 7 and the rear end unit 3 is a wiring pipe 12. The wiring pipe 12 is in the shape of a hollow rod, and arranged therein is wiring for electrically coupling the trigger switch 70 and the reverse switch 9 to the rear end unit 3.

The rear end unit 3 is configured such that a battery pack 20 can be attached to and detached from a rear end-side face of the rear end unit 3. The battery pack 20 houses a battery 21. In FIG. 1, illustration of the battery 21 is omitted. The battery 21 is shown in FIG. 7. The brush cutter 1 is configured such that, when the battery pack 20 is in a state attached to the rear end unit 3, the motor 40 can be rotationally driven by battery power, which is electric power supplied from the battery 21.

On the leading end side of an upper face of the rear end unit 3, a speed change dial 23 and the main switch 24 are provided in such a way that the operator can operate them. In addition, a lamp 25 and a remaining energy indicator 26 are provided in such a way that the operator can confirm them visually.

The main switch 24 is a switch that brings the brush cutter 1 into a usable state. When the operator turns on the main switch 24, respective portions within the rear end unit 3 are activated. This brings the brush cutter 1 into a state in which the motor 40 can be rotated by the user performing the driving operation on the trigger operating portion 11.

The speed change dial 23 is a turn-style operation member to be operated by the operator to set a rotation speed of the motor 40 (and thus a rotation speed of the cutting blade 5). The lamp 25 is a lamp that lights up when the brush cutter 1 goes into a specific state. The remaining energy indicator 26 is a lamp that indicates a remaining energy of the battery 21.

The thus-configured brush cutter 1 is foldable as described above.

Figure 2A:
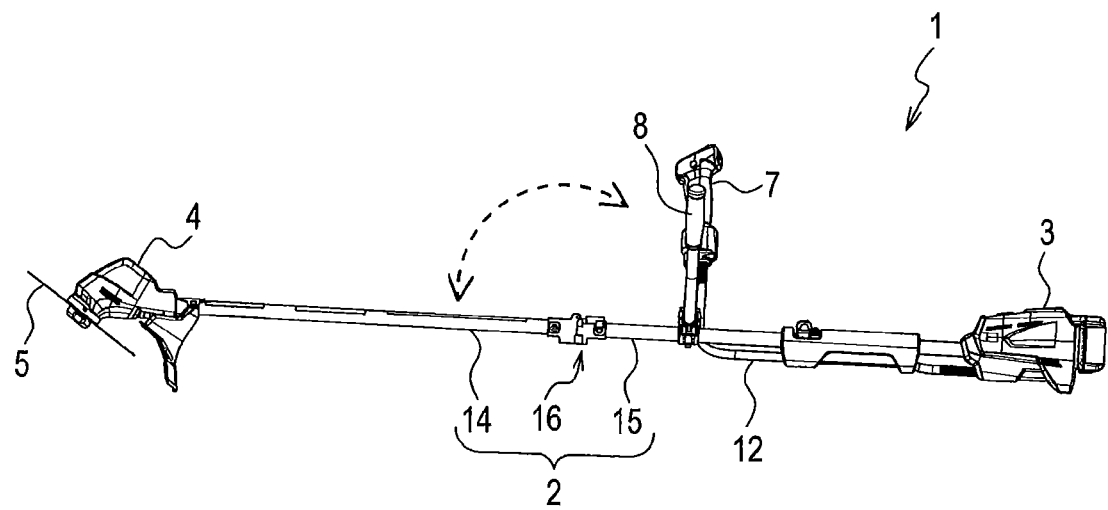
FIG. 2A is a side view showing the brush cutter in an extended state.
Figure 2B:
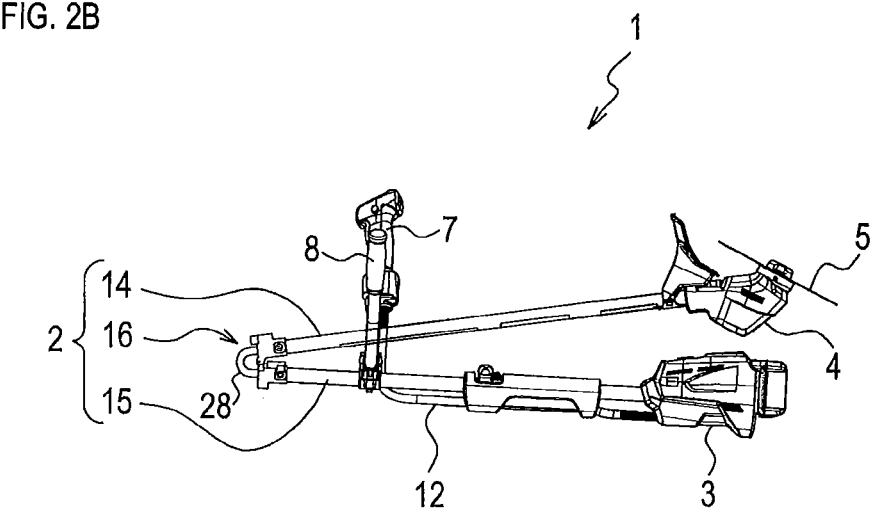
FIG. 2B is a side view showing the brush cutter in a folded state.

Specifically, the brush cutter 1 is transformed from the extended state in which it is extended as a whole in the front-rear direction as shown in FIG. 2A to a folded state as illustrated in FIG. 2B by being folded at the coupling portion 16. When the brush cutter 1 is in the folded state, an entire length of the brush cutter 1 becomes shorter than in the extended state. The entire length of the brush cutter 1 means a length in the front-rear direction.

The extended state is a normal state in which the user performs an operation using the brush cutter 1. In the present embodiment, when the brush cutter 1 is transformed to be in the folded state, part of electrical wiring that couples the trigger switch 70 integrated in the right grip 7 and the rear end unit 3 to each other is broken as will be hereinafter described. Thus, in the folded state, the motor 40 is not driven even when the user performs the driving operation on the trigger operating portion 11.

The folded state in the present embodiment may be understood as meaning a state in which the brush cutter 1 is folded to an angle or greater at which at least the aforementioned electrical wiring is broken. An angle at which the aforementioned electrical wiring is broken can be adjusted as appropriate by a structure of the coupling portion 16 and is, for example, one degree or less.

In the present embodiment, the pipe unit 2 can be folded from the extended state in which a folded angle is zero degree until the leading end unit 4 comes in contact with the rear end unit 3 at a maximum. FIG. 2B shows one example of the folded state, in which the pipe unit 2 is folded to a state immediately prior to the state in which the leading end unit 4 comes in contact with the rear end unit 3. A maximum folded angle may be decided as appropriate.

(2) Structure of Coupling Portion

The coupling portion 16 is a member that allows for folding of the pipe unit 2. As shown in FIGS. 3A, 3B, 3C, 4A, 4B, 5A, and 5B, the coupling portion 16 comprises a first holder 31 and a second holder 32. Both of the first holder 31 and the second holder 32 are of a tubular shape. A rear end-side end of the first pipe 14 is inserted into and fixed to the leading end side of the first holder 31. A leading end-side end of the second pipe 15 is inserted into and fixed to the rear end side of the second holder 32.

The first holder 31 and the second holder 32 are coupled to each other by a pipe pivot 33, and are configured to be relatively pivotable about the pipe pivot 33. However, such relative pivoting of the first holder 31 and the second holder 32 about the pipe pivot 33 is regulated by a fixing lever 35 in the extended state. To fold the pipe unit 2 from the extended state, such regulation by the fixing lever 35 needs to be eliminated.

Figure 3A:
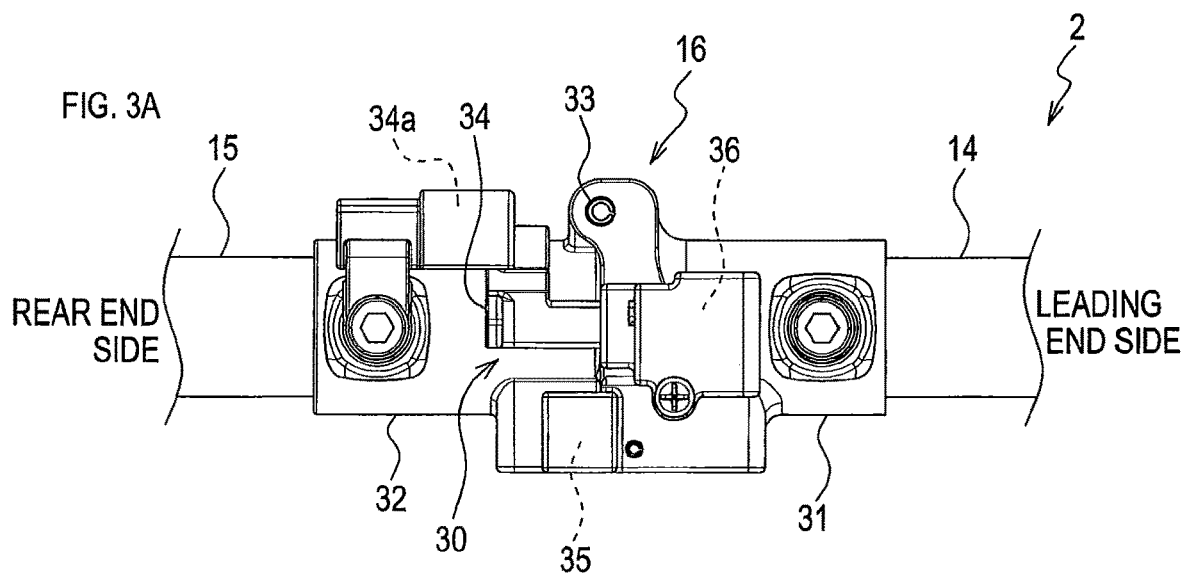
FIG. 3A is a side view of a coupling portion.
Figure 3B:
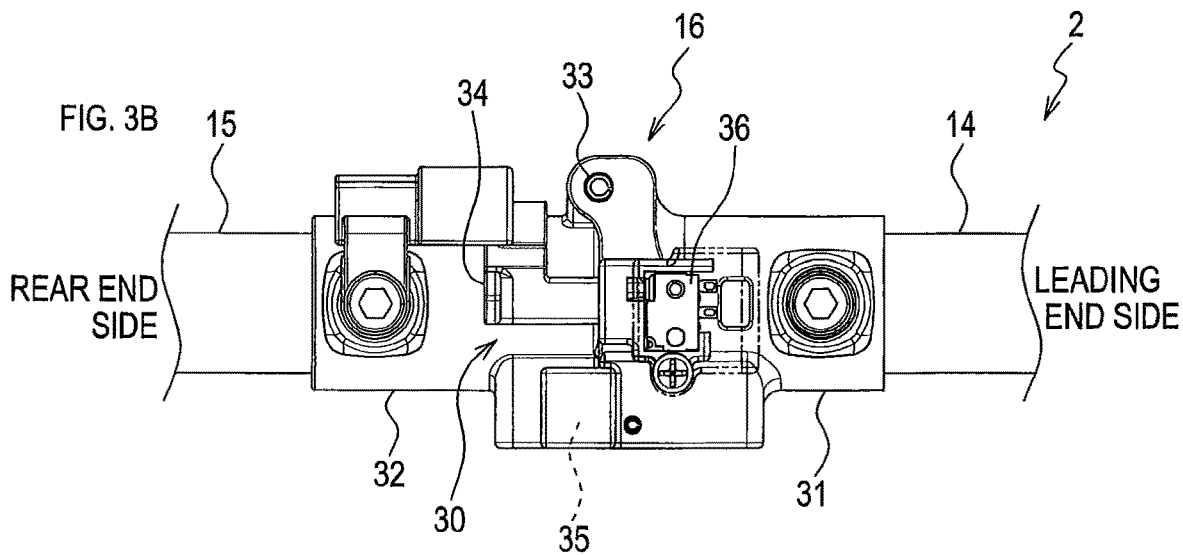
FIG. 3B is a partially transparent side view of the coupling portion.
Figure 3C:
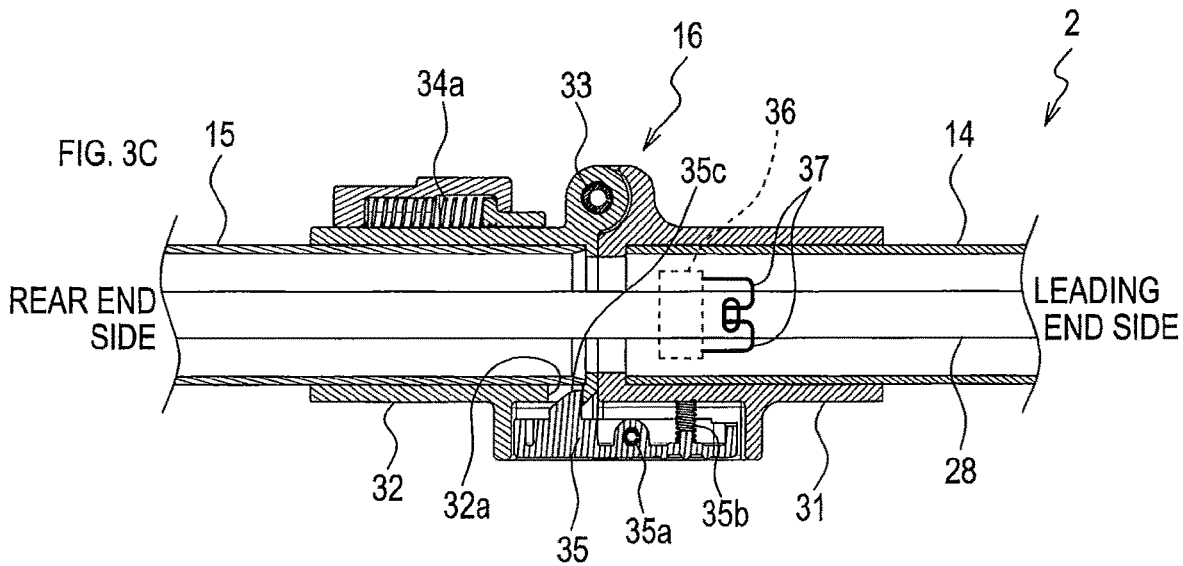
FIG. 3C is a sectional view of the coupling portion.
Figure 5A:
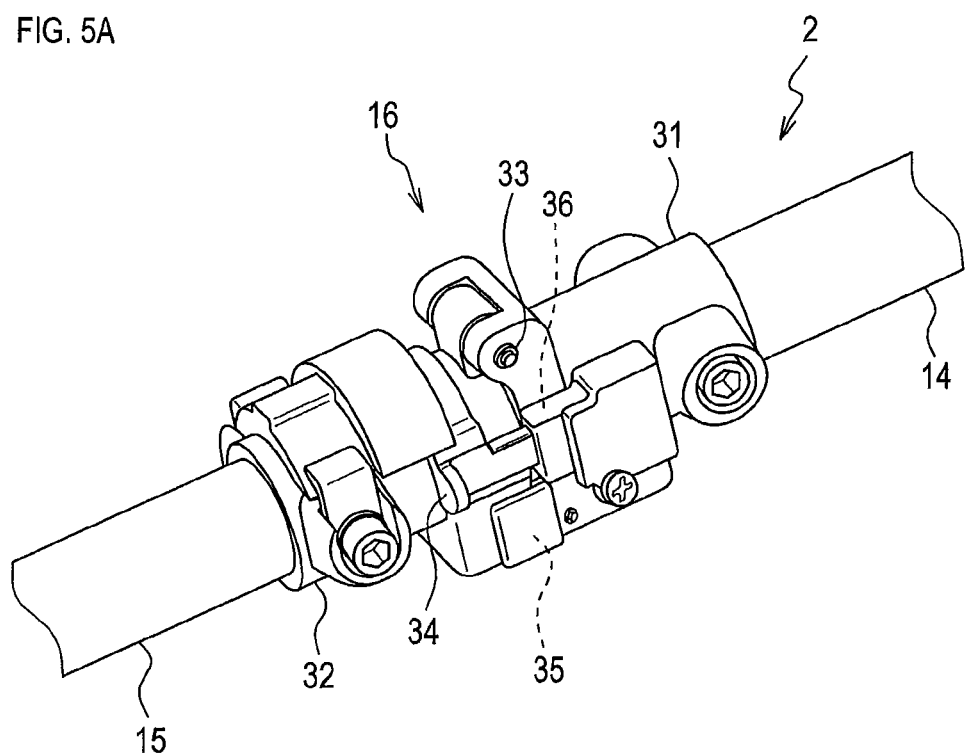
FIG. 5A is a perspective view showing the coupling portion in the extended state.
Figure 5B:
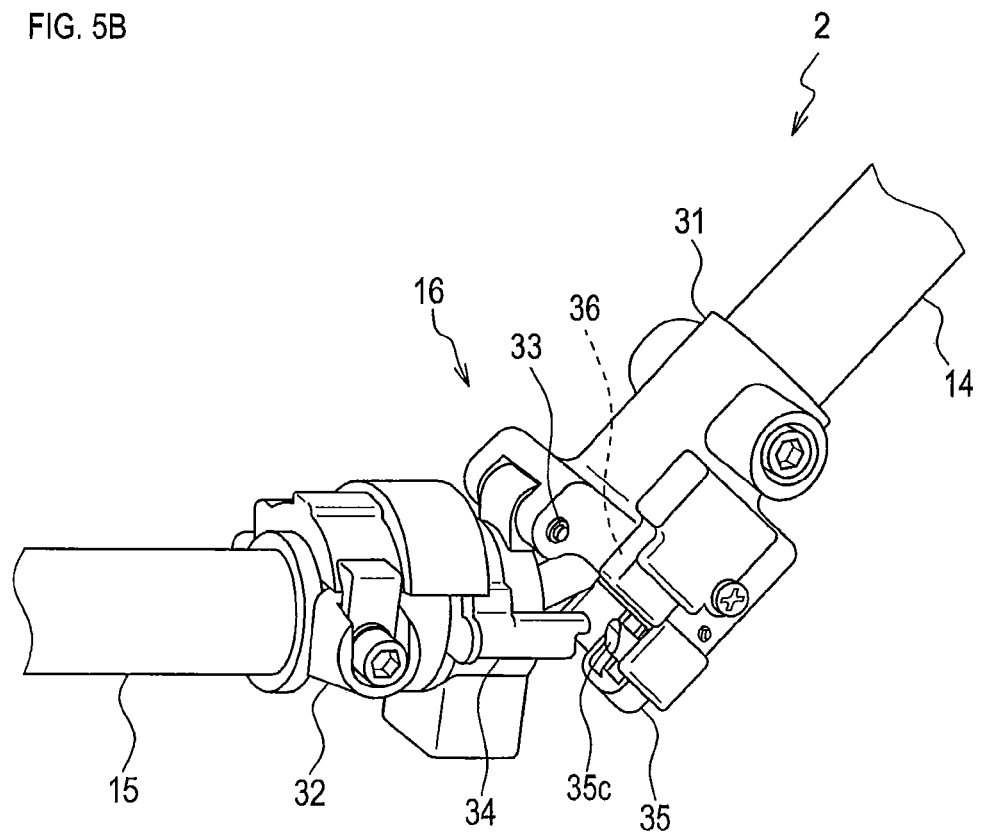
FIG. 5B is a perspective view showing the coupling portion in the folded state.

As shown in FIGS. 3C and 5B, the fixing lever 35 comprises a protrusion 35*c*. On the other hand, as shown in FIG. 3C, the second holder 32 has an engagement hole 32*a* formed for insertion thereinto of the protrusion 35*c* on the fixing lever 35.

As shown in FIG. 3C, in the extended state, the protrusion 35*c* on the fixing lever 35 is in a state inserted into the engagement hole 32*a* in the second holder 32. The fixing lever 35 is pivotable about a lever pivot 35*a*. However, one end side of the fixing lever 35, which is an opposite side from the other end side having the protrusion 35*c* formed thereon across the lever pivot 35*a*, is biased in a direction away from the first pipe 14 by means of a support spring 35*b*. Such biasing force acts so as to insert the protrusion 35*c* on the fixing lever 35 into the engagement hole 32*a*, to thereby maintain the protrusion 35*c* on the fixing lever 35 in a state inserted into the engagement hole 32*a*.

In the state in which the protrusion 35*c* on the fixing lever 35 is inserted into the engagement hole 32*a* as shown in FIG. 3C, the relative pivoting of the first holder 31 and the second holder 32 is regulated to thereby make the pipe unit 2 unfoldable, resulting in maintaining the extended state of the pipe unit 2.

Figure 4A:
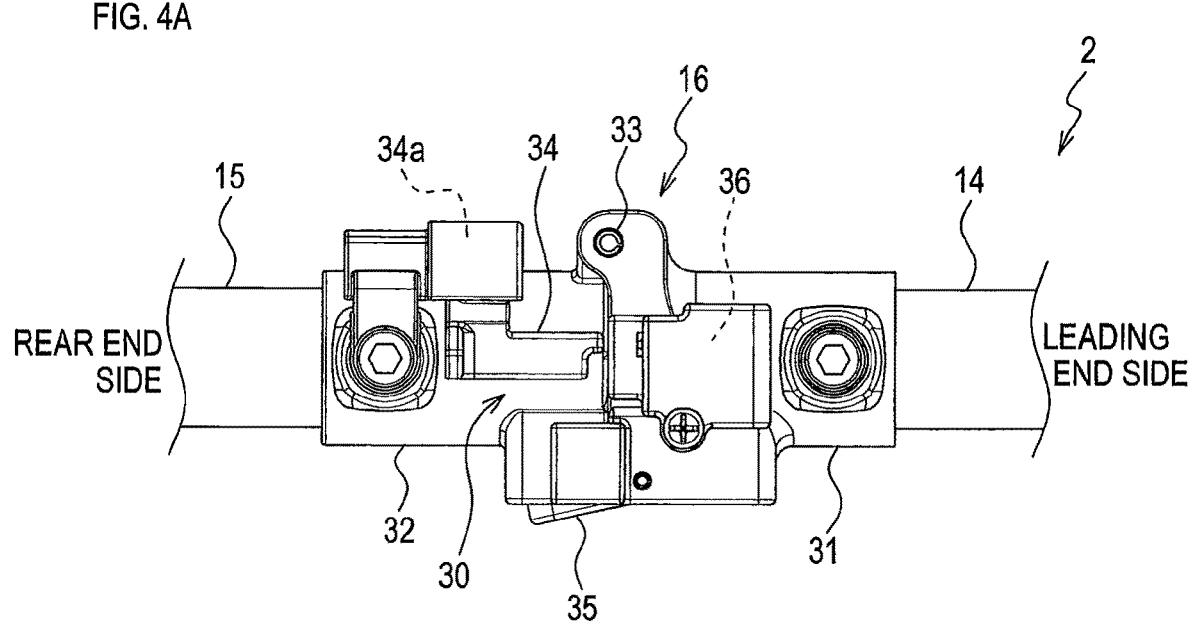
FIG. 4A is a side view showing the coupling portion in the extended state.

To fold the pipe unit 2, it is only necessary to disengage the protrusion 35*c* on the fixing lever 35 from the engagement hole 32*a* in the second holder 32 by performing a pulling operation on the fixing lever 35 in a direction away from the second pipe 15 to thereby eliminate an engaged state of the protrusion 35c with the engagement hole 32a. When the fixing lever 35 is subject to the pulling operation, the fixing lever 35 pivots about the lever pivot 35a against the biasing force of the support spring 35b, and turns to a position as illustrated in FIG. 4A. Specifically, the other end side of the fixing lever 35 on which the protrusion 35c is provided is moved in the direction away from the second pipe 15, to thereby disengage the protrusion 35c on the fixing lever 35 from the engagement hole 32a in the second holder 32.

Figure 4B:
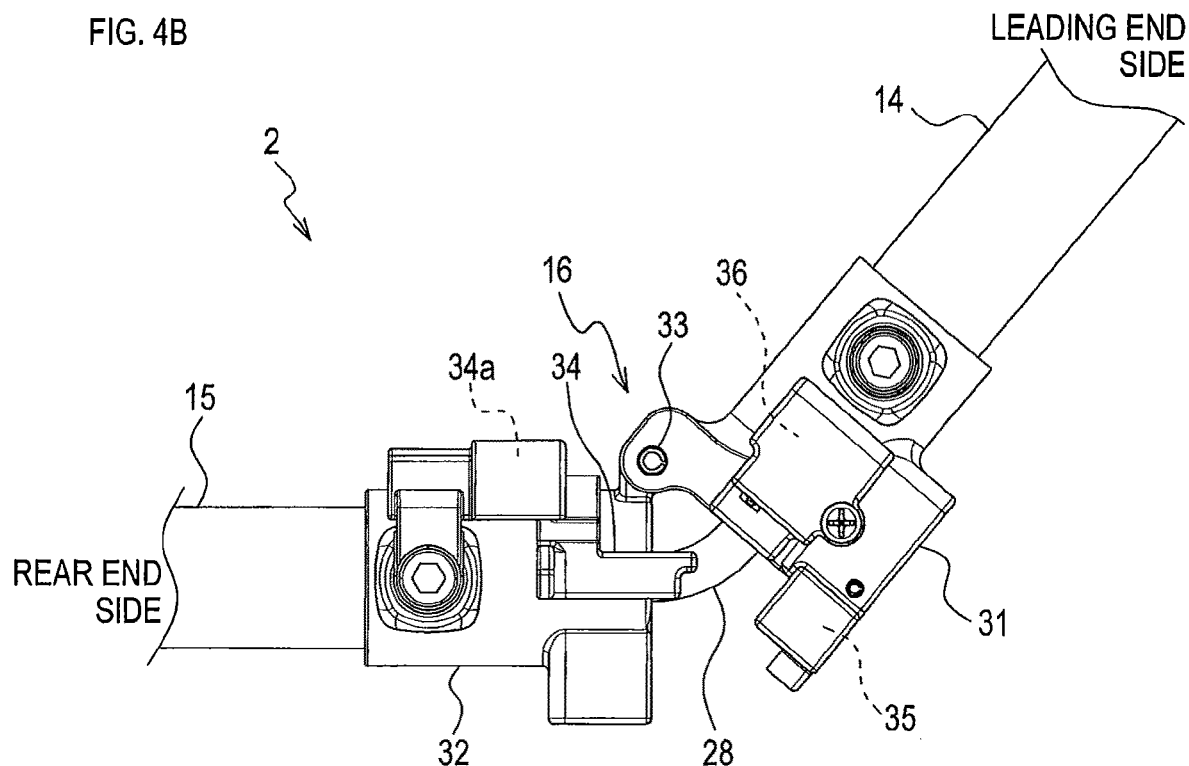
FIG. 4B is a side view showing the coupling portion in the folded state.

When the protrusion 35c is disengaged from the engagement hole 32a and a switch lever 34 is moved toward the rear end side thereof to eliminate an engaged state of the switch lever 34 with the first holder 31, the regulation on the relative pivoting of the first holder 31 and the second holder 32 is eliminated. Such elimination makes the first holder 31 and the second holder 32 relatively pivotable about the pipe pivot 33. In this state, when the first holder 31 and the second holder 32 are caused to pivot relatively, the coupling portion 16 is folded as illustrated in FIGS. 4B and 5B. That is, folding of the coupling portion 16 allows for folding of the pipe unit 2, to thereby bring the brush cutter 1 into the folded state.

As illustrated in FIGS. 3C, 4B, and 5B, arranged within the pipe unit 2 is a wiring hose 28. The wiring hose 28 houses a plurality of conductors. The conductors housed in the wiring hose 28 comprise a plurality of conductors that electrically couple the rear end unit 3 and the leading end unit 4 to each other. Specifically, the conductors comprise eight conductors 81 to 88 shown in FIG. 7, which will be hereinafter described. These eight conductors 81 to 88 are housed in the wiring hose 28 and are arranged so as to run along the pipe unit 2.

Further, the conductors housed in the wiring hose 28 comprise a conductor that couples the trigger switch 70 within the right grip 7 and the rear end unit 3 to each other. Specifically, the conductors comprise a trigger signal line 37 shown in FIG. 7, which will be hereinafter described.

As shown in FIGS. 3A and 3B, the coupling portion 16 comprises a wiring breaker 30. The wiring breaker 30 comprises the switch lever 34 and a breaker switch 36. The switch lever 34 is provided to the second holder 32, and the breaker switch 36 is provided to the first holder 31. As shown in FIG. 7, breaker switch 36 includes first node 36N1 and second node 36N2.

The trigger signal line 37 is arranged from the trigger switch 70 up to the rear end unit 3 through the wiring pipe 12, and is arranged within the pipe unit 2 from the rear end unit 3 up to the coupling portion 16 through the wiring hose 28. Then, as illustrated in FIG. 3C, within the coupling portion 16, the trigger signal line 37 is routed out of the wiring hose 28, and is arranged up to the breaker switch 36 constituting the wiring breaker 30. Further, the trigger signal line 37 is routed back from the breaker switch 36 into the wiring hose 28 again, and is arranged up to the rear end unit 3 through the wiring hose 28. As shown in FIG. 7, trigger signal line 37 includes three segments—first trigger signal line 37A, second trigger signal line 37B and third trigger signal line 37C. First trigger signal line 37A connects motor controller 67 to first node 36N1 of breaker switch 36. Second trigger signal line 37B connects second node 36N2 of breaker switch 36 to first node 70N1 of trigger switch 70. Third trigger signal line 37C connects second node 70N2 of trigger switch 70 to motor controller 67.

The breaker switch 36 is provided for conduction and interruption of the trigger signal line 37. When the breaker switch 36 is turned on, the trigger signal line 37 becomes conducted via the breaker switch 36. When the breaker switch 36 is turned off, the trigger signal line 37 is interrupted by the breaker switch 36.

The breaker switch 36 is configured to be turned on when the pipe unit 2 is in the extended state, and to be turned off when the pipe unit 2 is in the folded state. Specifically, as shown in FIGS. 3A, 3B, 4A, 4B, 5A, and 5B, the second holder 32 has the switch lever 34, which is a member constituting the wiring breaker 30, provided to turn on and off the breaker switch 36. The switch lever 34 also functions as a regulating member that regulates the relative pivoting of the first holder 31 and the second holder 32.

Figure 6A:
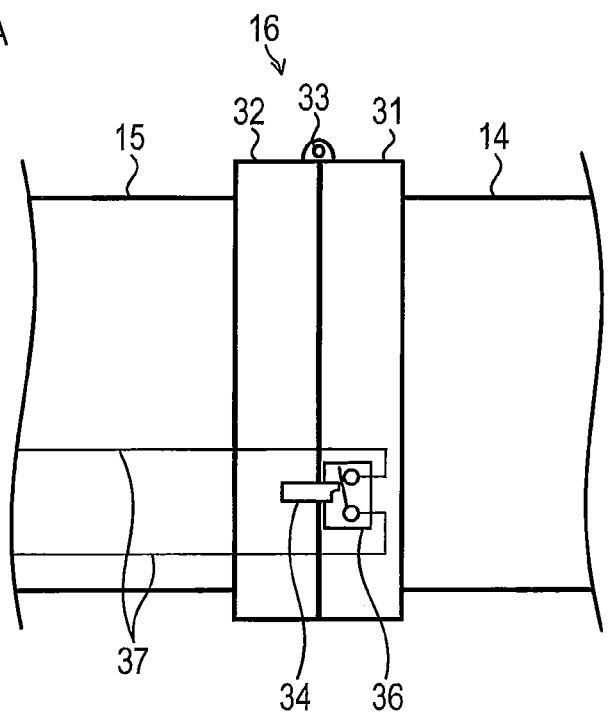
FIG. 6A and FIG. 6B are explanatory diagrams schematically showing a structure of a wiring breaker of the first embodiment.

When the pipe unit 2 is in the extended state, the breaker switch 36 is turned on by the switch lever 34 as schematically shown in FIG. 6A. The switch lever 34 is biased toward the leading end side thereof by a support spring 34a shown in FIG. 3C. Such biasing force maintains an ON state of the breaker switch 36. Further, the state in which the relative pivoting of the first holder 31 and the second holder 32 is regulated is maintained.

Figure 6B:
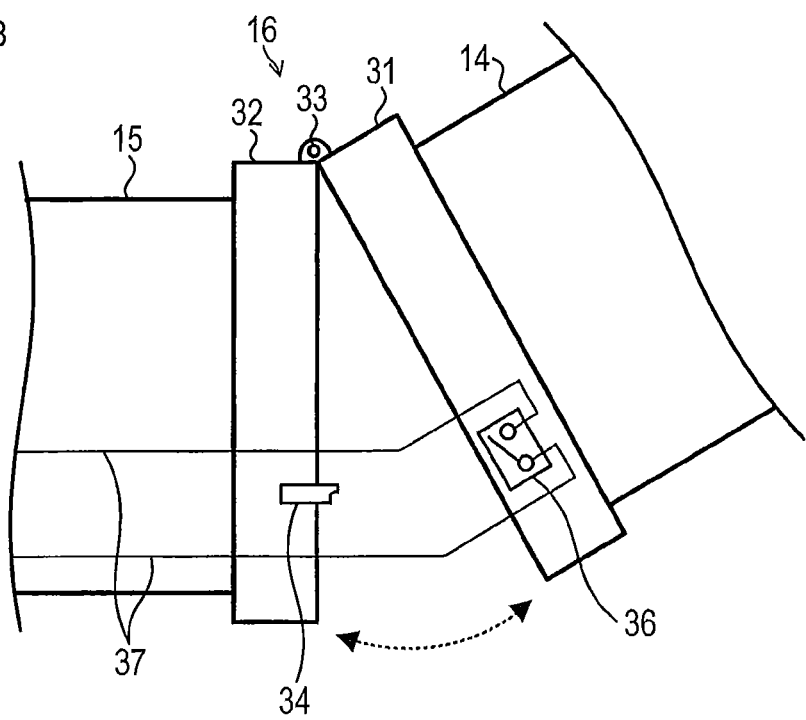

When folding the pipe unit 2, the fixing lever 35 is subject to the pulling operation as described above, and the switch lever 34 is subject to the pulling operation toward the rear end side thereof in the front-rear direction as illustrated in FIG. 4A. This eliminates the ON state of the breaker switch 36 and the breaker switch 36 goes into an OFF state. Further, the state in which the relative pivoting of the first holder 31 and the second holder 32 is regulated is also eliminated to thereby make the brush cutter 1 foldable. As long as the pipe unit 2 is in the folded state, the OFF state of the breaker switch 36 is maintained as schematically shown in FIG. 6B.

(3) Electrical Configuration of Brush Cutter

Next, an electrical configuration within the brush cutter 1 will be described with reference to FIG. 7. As shown in FIG. 7, the brush cutter 1 comprises the motor 40, and three rotation sensors 46, 47, and 48. The motor 40 and the three rotation sensors 46, 47, and 48 are arranged to the leading end unit 4, and are housed in a housing of the leading end unit 4.

The motor 40 is a drive source that drives the cutting blade 5. The motor 40 of the present embodiment is a three-phase brushless motor, and comprises a U-phase coil 41, a V-phase coil 42, and a W-phase coil 43.

The three rotation sensors 46, 47, and 48 each output a specified signal corresponding to a rotational position of the motor 40 (specifically, a rotational position of a rotor of the motor 40). To be more specific, the first rotation sensor 46 outputs a first sensor signal, the second rotation sensor 47 outputs a second sensor signal, and the third rotation sensor 48 outputs a third sensor signal. In the present embodiment, each of the rotation sensors 46, 47, and 48 is a Hall sensor comprising a Hall element.

The brush cutter 1 comprises a controller 60. The controller 60 is arranged to the rear end unit 3. The rear end unit 3 is configured such that the battery pack 20 can be attached thereto and detached therefrom. The battery pack 20 houses the battery 21. The battery 21 of the present embodiment is, for example, a lithium-ion rechargeable battery. However, the battery 21 may be a rechargeable battery other than the lithium-ion rechargeable battery, or may be a non-rechargeable battery.

The battery pack 20 comprises a positive terminal 76 and a negative terminal 77 for supplying the battery power of the battery 21 externally. Coupled to the positive terminal 76 is a positive electrode of the battery 21, and coupled to the negative terminal 77 is a negative electrode of the battery 21.

On the other hand, provided to the rear end unit 3 are a positive terminal 56 and a negative terminal 57. When the battery pack 20 is attached to the rear end unit 3, the positive terminal 76 of the battery pack 20 and the positive terminal 56 of the rear end unit 3 are coupled to each other, and the negative terminal 77 of the battery pack 20 and the negative terminal 57 of the rear end unit 3 are coupled to each other.

In the rear end unit 3, the positive terminal 56 is coupled to the controller 60 via a main switching element 52, and the negative terminal 57 is also coupled to the controller 60. Thus, when the battery pack 20 is attached to the rear end unit 3, the controller 60 is electrically coupled to the battery 21 within the battery pack 20. Further, the controller 60 is electrically coupled to the speed change dial 23, the main switch 24, the lamp 25, and the remaining energy indicator 26.

The aforementioned eight conductors 81 to 88 are arranged between the rear end unit 3 and the leading end unit 4. The eight conductors 81 to 88 comprise three power lines 81, 82, and 83, three sensor signal lines 86, 87, and 88, a sensor power-supply line 84, and a sensor ground line 85. As described above, these eight conductors 81 to 88 are housed in the wiring hose 28 within the pipe unit 2. Alternatively, at least one of these eight conductors 81 to 88 may be provided outside the pipe unit 2.

The three power lines 81, 82, and 83 are conductors for supplying electric power for driving the motor 40 from the rear end unit 3 to the motor 40, and electrically couple the controller 60 and the motor 40 to each other. Specifically, the three power lines 81, 82, and 83 comprise a U-phase power line 81, a V-phase power line 82, and a W-phase power line 83. The U-phase power line 81 is coupled to the U-phase coil 41 of the motor 40, the V-phase power line 82 is coupled to the V-phase coil 42 of the motor 40, and the W-phase power line 83 is coupled to the W-phase coil 43 of the motor 40.

The three power lines 81, 82, and 83 are coupled to the controller 60 in the rear end unit 3. Due to such a configuration, the battery 21 in the battery pack 20 is electrically coupled to the motor 40 via the controller 60. That is, the battery power of the battery 21 is supplied to the motor 40 via the controller 60 and the three power lines 81, 82, and 83.

The three sensor signal lines 86, 87, and 88 are conductors for respectively inputting the corresponding sensor signals from the rotation sensors 46, 47, and 48 to the controller 60. Specifically, the three sensor signal lines 86, 87, and 88 comprise a first sensor signal line 86, a second sensor signal line 87, and a third sensor signal line 88. The first sensor signal line 86 is coupled to the first rotation sensor 46, the second sensor signal line 87 is coupled to the second rotation sensor 47, and the third sensor signal line 88 is coupled to the third rotation sensor 48. In the rear end unit 3, the three sensor signal lines 86, 87, and 88 are coupled to the motor controller 67 within the controller 60.

The sensor power-supply line 84 and the sensor ground line 85 are conductors for supplying the three rotation sensors 46, 47, and 48 with power-supply power for operation. The sensor power-supply line 84 and the sensor ground line 85 are coupled to the three rotation sensors 46, 47, and 48 in the leading end unit 4. Applied to the sensor power-supply line 84 from the rear end unit 3 is a control voltage Vcc. The control voltage Vcc is supplied to the respective rotation sensors 46, 47, and 48 as a power-supply voltage for operation of the respective rotation sensors 46, 47, and 48. In the rear end unit 3, the sensor ground line 85 is coupled to a ground line. The ground line provides a reference potential. Due to such a configuration, the respective rotation sensors 46, 47, and 48 operate during supply of the power-supply power of the control voltage Vcc from the rear end unit 3 via the sensor power-supply line 84 and the sensor ground line 85, and each of the rotation sensors 46, 47, and 48 outputs the sensor signal indicating the rotational position of the motor 40.

Further provided to the rear end unit 3 are a regulator 51 and the main switching element 52. The regulator 51 is coupled to the positive terminal 56 and the negative terminal 57, and the battery power of the battery 21 is inputted to the regulator 51 when the battery pack 20 is attached. The regulator 51 generates the power-supply power of the specified control voltage Vcc during input of the battery power. The power-supply power generated by the regulator 51 is used as electric power for operation of the respective portions within the rear end unit 3, including the controller 60. The power-supply power generated by the regulator 51 is also supplied to the respective rotation sensors 46, 47, and 48 via the sensor power-supply line 84 as the power-supply power for operation of the three rotation sensors 46, 47, and 48.

The main switching element 52 is provided to a conductor between the positive terminal 56 and the controller 60. Specifically, the main switching element 52 is provided to a supply path for supplying the battery power to the controller 60, and can conduct and interrupt this supply path.

The main switching element 52 of the present embodiment is, for example, a field-effect transistor (MOSFET). However, the main switching element 52 may be, for example, an insulated gate bipolar transistor (IGBT) or may be other switching elements. The same applies to six switching elements 61 to 66 to be hereinafter described.

The controller 60 comprises, by way of example, the six switching elements 61 to 66, the motor controller 67, and a gate driver 68. The motor controller 67 controls the respective switching elements 61 to 66 individually via the gate driver 68.

The motor controller 67 comprises a known microcomputer comprising a CPU 67A and a semiconductor memory 67B. Various functions of the motor controller 67 are performed by execution, by the CPU 67A, of programs stored in the semiconductor memory 67B. The microcomputer of the motor controller 67 may be one or more in number. The configuration of the motor controller 67 is not limited to that in which the various functions are performed by the microcomputer, but may be that in which part or all of the various functions are performed by hardware configured with a combination of a logic circuit, an analog circuit, and so on.

The motor controller 67 is operated by being supplied with the power-supply power of the control voltage Vcc from the regulator 51. Specifically, when the main switch 24 is turned on by the user, the regulator 51 is operated and the control voltage Vcc is generated, whereby the motor controller 67 is activated. When the main switch 24 is turned off by the user, the regulator 51 stops operation and the control voltage Vcc is not generated. As a result, operation of the motor controller 67 is stopped.

Although not shown in the drawings, in the motor controller 67, a capacitor for holding the power-supply voltage is coupled to a power-supply input terminal to which the control voltage Vcc is inputted from the regulator 51. During application of the control voltage Vcc to the motor controller 67 from the regulator 51, the capacitor is also charged by the control voltage Vcc.

Due to such a configuration, even when input of the control voltage Vcc from the regulator 51 is stopped, the motor controller 67 does not immediately lose the power-supply power for operation, but can continue operation for a certain period of time by the power charged in the capacitor. After input of the control voltage Vcc is stopped and the motor controller 67 shifts to operation enabled by the power charged in the capacitor, the charging voltage of the capacitor is decreased gradually. To cope with this, the motor controller 67 comprises a low-voltage protection function. The low-voltage protection function is a function in which, when a voltage to be inputted to the power-supply input terminal is equal to or less than a specified threshold, the motor controller 67 itself executes a specified operation stop processing to thereby stop the operation.

However, it is not essential for the motor controller 67 to comprise the capacitor for holding the power-supply voltage. For example, the capacitor for holding the power-supply voltage need not be present as long as no problems occur in the motor controller 67 itself and operation of the brush cutter 1, when input of the control voltage Vcc to the motor controller 67 is stopped suddenly.

The motor controller 67 identifies the rotational position of the motor 40 on the basis of the respective sensor signals inputted from the three rotation sensors 46, 47, and 48 via the sensor signal lines 86, 87, and 88, respectively. Then, the motor controller 67 performs selective switching of the respective switching elements 61 to 66 according to the identified rotational position, to thereby control driving of the motor 40.

The aforementioned six switching elements 61 to 66 comprise first, second, and third switching elements 61, 62, and 63 on a so-called high side and fourth, fifth, and sixth switching elements 64, 65, and 66 on a so-called low side. Gates of the six switching elements 61 to 66 are all coupled to the gate driver 68. Drains of the first, second, and third switching elements 61, 62, and 63 on the high side are all coupled to the main switching element 52. Sources of the fourth, fifth, and sixth switching elements 64, 65, and 66 on the low side are all coupled to the negative terminal 57.

The source of the first switching element 61 and the drain of the fourth switching element 64 are coupled to each other and also coupled to the U-phase power line 81. The source of the second switching element 62 and the drain of the fifth switching element 65 are coupled to each other and also coupled to the V-phase power line 82. The source of the third switching element 63 and the drain of the sixth switching element 66 are coupled to each other and also coupled to the W-phase power line 83.

A specific method of a so-called bipolar driving, in which a three-phase brushless motor is driven by six switching elements, is well known, and thus, an explanation of the method is omitted here.

In the present embodiment, each of the rotation sensors 46, 47, and 48 is, for example, a Hall sensor having an open collector output format, and an output resistance thereof changes to either a high-value resistance (for example, a few MΩ) or a low-value resistance (for example, approximately 0Ω) according to the rotational position of the motor 40.

In the motor controller 67, respective pull-up resistors (not shown) are coupled to corresponding sensor signal input terminals (not shown) to which the corresponding sensor signal lines 86, 87, and 88 are coupled. The control voltage Vcc is applied to the respective sensor signal lines 86, 87, and 88 individually via the pull-up resistors. Thus, when the output resistance of each rotation sensor is the high-value resistance, the sensor signal inputted to the motor controller 67 is H level, whereas when the output resistance of each rotation sensor is the low-value resistance, the sensor signal inputted to the motor controller 67 is L level. Specifically, the output resistance of each of the rotation sensors 46, 47, and 48 is switched to either the high-value resistance or the low-value resistance according to the rotational position of the motor 40, and, in response to such switching of the output resistance, each sensor signal inputted to the motor controller 67 via the corresponding one of the sensor signal lines 86, 87, and 88 is switched to either a voltage signal of H level or a voltage signal of L level.

The three rotation sensors 46, 47, and 48 are arranged, with respect to the motor 40, so as to output the sensor signals, whose phases are shifted from each other by, for example, 120 degrees in terms of electrical angle. Due to such an arrangement, as long as the respective rotation sensors 46, 47, and 48 operate normally and the respective sensor signals are inputted from the corresponding rotation sensors 46, 47, and 48 to the motor controller 67 normally, a situation does not occur in which the inputted respective sensor signals are all H level at the same time. In the present embodiment, any two of the three sensor signals can be H level at the same time depending on the rotational position of the motor 40.

Depending on how the rotation sensors 46, 47, and 48 are arranged, a case may arise in which the three sensor signals are all H level momentarily at a timing of switching of signal levels of the sensor signals. However, such a momentary coincidence of H level is not included in the situation of "being H level at the same time" mentioned herein.

The motor controller 67 is configured not to drive the motor 40 when a signal abnormal state occurs in which the respective sensor signals inputted from the corresponding rotation sensors 46, 47, and 48 are all H level at the same time. When the signal abnormal state occurs, the motor controller 67 does not feed power to the motor 40 by maintaining all of the six switching elements 61 to 66 within the controller 60 in an OFF state, even when the trigger switch 70 is turned on and an operation signal is inputted from the trigger switch 70. In such a case, the main switching element 52 may also be maintained in an OFF state.

Specific example of occurrence of the signal abnormal state may include a case in which at least one of the three sensor signal lines 86, 87, and 88 is interrupted and the sensor signal is not inputted to the motor controller 67 via the sensor signal line. When the sensor signal line is interrupted, a voltage at a coupling terminal for the interrupted sensor signal line in the motor controller 67 is maintained in a state pulled up to the control voltage Vcc. That is, the sensor signal inputted to the motor controller 67 via the interrupted sensor signal line is maintained at H level regardless of the rotational position of the motor 40. In such a state, if both of the sensor signals inputted via the other non-interrupted two sensor signal lines are H level, the three sensor signals are all H level.

Further example of occurrence of the signal abnormal state may include a case in which the sensor power-supply line 84 or the sensor ground line 85 is interrupted and the power-supply power for operation is not supplied to the respective rotation sensors 46, 47, and 48. When the power-supply power is not supplied to the respective rotation sensors 46, 47, and 48, the output resistances of the respective rotation sensors 46, 47, and 48 are all the high-value resistance. Thus, the respective sensor signals inputted from the corresponding rotation sensors 46, 47, and 48 to the motor controller 67 are all H level.

The signal abnormal state in which the respective sensor signals are all H level at the same time is merely one example. The signal abnormal state may take various forms depending on kinds of the rotation sensors, contents of the sensor signals outputted from the rotation sensors, relative relationships among the respective sensor signals outputted from the corresponding rotation sensors in the case of using the multiple rotation sensors, and so on.

For example, in a case where the rotation sensors are not of the open collector output format but is configured to be capable of outputting signals of H level and L level according to the rotational position and also the respective sensor signal lines 86, 87, and 88 are configured not to be pulled up in the motor controller 67, a state in which the respective sensor signals are all L level at the same time may be set as the signal abnormal state. That is, a state of the sensor signal that does not usually occur in a normal state, in which each sensor signal is normally inputted to the motor controller 67, may be set as the signal abnormal state.

The motor controller 67 is electrically coupled to the trigger switch 70 and to the reverse switch 9. The motor controller 67 turns on the main switching element 52 when the trigger switch 70 is turned on and the operation signal is inputted from the trigger switch 70. Then, the motor controller 67 controls a current flow to the motor 40 by controlling the six switching elements 61 to 66 according to an operation state of the reverse switch 9 and an operation state of the speed change dial 23, to thereby control rotation of the motor 40.

When the operation signal is not inputted from the trigger switch 70, the motor controller 67 does not drive the motor 40. Specifically, the motor controller 67 turns off the main switching element 52, and maintains all of the six switching elements 61 to 66 within the controller 60 in the OFF state.

The motor controller 67 further comprises a function of acquiring or calculating the remaining energy of the battery 21 and indicating the remaining energy using the remaining energy indicator 26. Moreover, the motor controller 67 comprises a function of turning on the lamp 25 when the brush cutter 1 goes into a specific state.

The trigger switch 70 is directly coupled at one end thereof to the motor controller 67 via third trigger signal line 37C and is coupled at the other end thereof to the motor controller 67 via breaker switch 36 and first and second trigger signal lines 37A and 37B. As described above, the trigger signal line 37 is routed within the pipe unit 2 up to the coupling portion 16, and the breaker switch 36 is provided on the trigger signal line 37 at the coupling portion 16.

As described with reference to FIGS. 3C, 6A, 6B, and so on, the breaker switch 36 is turned on by the switch lever 34 when the pipe unit 2 is in the extended state, and is turned off when the pipe unit 2 is in the folded state. When the trigger switch 70 is turned on while the breaker switch 36 is in the ON state, an operation signal indicating such turning-on of the trigger switch 70 is inputted to the motor controller 67 via the trigger signal line 37.

Thus, while the pipe unit 2 is in the extended state, when the user performs the driving operation on the trigger operating portion 11 to thereby turn on the trigger switch 70, the operation signal is inputted from the trigger switch 70 to the motor controller 67, and the motor 40 is rotationally driven by the motor controller 67.

In contrast, while the breaker switch 36 is in the OFF state, the operation signal is not inputted to the motor controller 67 even when the trigger switch 70 is turned on. This is because the trigger signal line 37, which is a transmission path for transmitting the operation signal, is interrupted by the breaker switch 36.

Thus, while the pipe unit 2 is in the folded state, even when the user performs the driving operation on the trigger operating portion 11 to thereby turn on the trigger switch 70, the operation signal is not inputted from the trigger switch 70 to the motor controller 67, and thus, the motor 40 is not rotationally driven by the motor controller 67.

In sum, the brush cutter 1 of the present embodiment is configured such that, when the pipe unit 2 is in the folded state, the breaker switch 36 is turned off to thereby prohibit driving of the motor 40, whereas when the pipe unit 2 is in the extended state, the breaker switch 36 is turned on to thereby permit driving of the motor 40.

(4) Effects of First Embodiment

As described so far, the brush cutter 1 of the first embodiment is configured such that the pipe unit 2 is foldable. Thus, when the brush cutter 1 is in a non-use state, such as a carried state and a stored state, the length of the brush cutter 1 can be shortened as compared with that in the extended state at the time of normal use, by bringing the brush cutter 1 into the folded state.

What is more, even when the brush cutter 1 is brought into the folded state, the brush cutter 1 is not divided physically. Further, when the brush cutter 1 is in the folded state, driving of the motor 40 is prohibited. Specifically, when the brush cutter 1 is brought into the folded state, the breaker switch 36 is in the OFF position, interrupting trigger signal line 37 between first and second trigger signal lines 37A and 37B. Upon interruption of the trigger signal line 37, even when the trigger switch 70 is turned on, the operation signal is not inputted to the motor controller 67. Thus, the motor 40 is not driven regardless of the state of the trigger switch 70.

Consequently, according to the thus-configured brush cutter 1, the brush cutter 1 can be brought into the folded state, in which the length of the brush cutter 1 is shorter than that at the time of normal use, while inhibiting decrease in portability and storability.

Moreover, the prohibition of driving of the motor 40 in the folded state is enabled by a simple configuration, i.e., by interruption of the trigger signal line 37.

Such interruption of the trigger signal line 37 in the folded state is performed by the breaker switch 36 provided on the trigger signal line 37 and by the switch lever 34 that turns on and off the breaker switch 36 according to the state of the pipe unit 2. When the pipe unit 2 is in the extended state, the switch lever 34 is in contact with the breaker switch 36 to thereby maintain the breaker switch 36 in the ON state, whereas when the pipe unit 2 is brought into the folded state, the switch lever 34 becomes physically away from the breaker switch 36 to thereby turn off the breaker switch 36. Even such a simple configuration can appropriately perform conduction and interruption of the trigger signal line 37 according to the state of the pipe unit 2.

(5) Correspondence Relationships

Here, correspondence relationships of terms related to the present embodiment will be described. The brush cutter 1 corresponds to one example of a working machine. The pipe unit 2 corresponds to one example of an operation rod. The motor controller 67 corresponds to one example of a controller. The wiring breaker 30 comprising the breaker switch 36 and the switch lever 34 corresponds to one example of a drive permitter. The breaker switch 36 corresponds to one example of a switch, and the switch lever 34 corresponds to one example of a switch operating portion. The eight conductors 81 to 88 correspond to one example of inter-unit conductors, and the three power lines 81, 82, and 83 correspond to one example of motor power-feed conductors, the three sensor signal lines 86, 87, and 88 correspond to one example of position signal conductors, and the sensor power-supply line 84 and the sensor ground line 85 correspond to one example of power-supply conductors. The trigger signal line 37 corresponds to one example of an operation signal conductor. The trigger operating portion 11 corresponds to one example of an operating portion. The three rotation sensors 46, 47, and 48 correspond to one example of a position signal outputter. The respective sensor signals outputted from the three rotation sensors 46, 47, and 48 correspond to one example of position signals. The trigger switch 70 corresponds to one example of an operation signal outputter. The folded state is one example of a specific form of a non-extended state.

Second Embodiment

Figure 8:
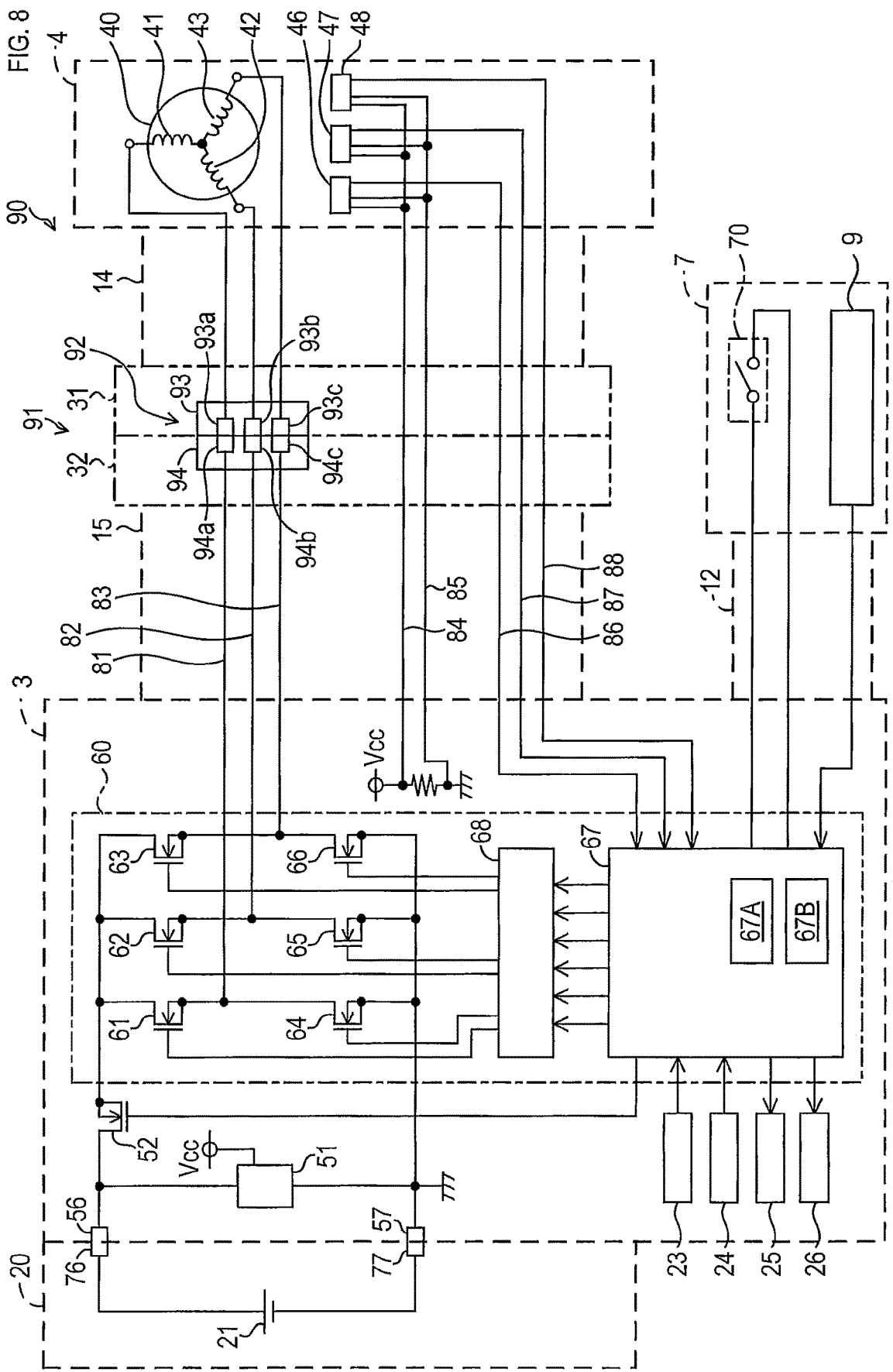
FIG. 8 is an explanatory diagram showing an electrical configuration of a brush cutter of a second embodiment.

A brush cutter 90 of a second embodiment shown in FIG. 8 has a configuration that is basically similar to that of the brush cutter 1 of the first embodiment except for some components including the wiring breaker. Thus, components of the brush cutter 90 common to those in the first embodiment are assigned with the reference numerals same as those in the first embodiment, and an explanation thereof is not repeated. An explanation will be given focusing on differences from the first embodiment.

In the above-described first embodiment, the wiring breaker 30 is configured to conduct and interrupt the trigger signal line 37 according to the state of the pipe unit 2. In the second embodiment, a wiring breaker 92 is configured to conduct and interrupt the three power lines 81, 82, and 83 according to the state of the pipe unit 2.

As shown in FIG. 8, in the brush cutter 90, both ends of the trigger switch 70 are coupled to the motor controller 67. Thus, even when the pipe unit 2 is folded, the state in which the trigger switch 70 and the motor controller 67 are coupled to each other is not changed.

Further, in the brush cutter 90, the wiring breaker 92 is provided to a coupling portion 91 of the pipe unit 2. The wiring breaker 92 comprises a pair of connectors 93 and 94, of which the first connector 93 is provided to the first holder 31 in the coupling portion 91 and the second connector 94 is provided to the second holder 32 in the coupling portion 91. The pair of connectors 93 and 94 are provided so as to conduct and interrupt the three power lines 81, 82, and 83 that electrically couple the controller 60 and the motor 40 to each other according to the state of the pipe unit 2.

The first connector 93 comprises a U-phase terminal 93a, a V-phase terminal 93b, and a W-phase terminal 93c. The U-phase terminal 93a is coupled to the U-phase coil 41 of the motor 40 via the U-phase power line 81. The V-phase terminal 93b is coupled to the V-phase coil 42 of the motor 40 via the V-phase power line 82. The W-phase terminal 93c is coupled to the W-phase coil 43 of the motor 40 via the W-phase power line 83.

The second connector 94 comprises a U-phase terminal 94a, a V-phase terminal 94b, and a W-phase terminal 94c. The U-phase terminal 94a is coupled to the controller 60 via the U-phase power line 81. The V-phase terminal 94b is coupled to the controller 60 via the V-phase power line 82. The W-phase terminal 94c is coupled to the controller 60 via the W-phase power line 83.

Figure 9:
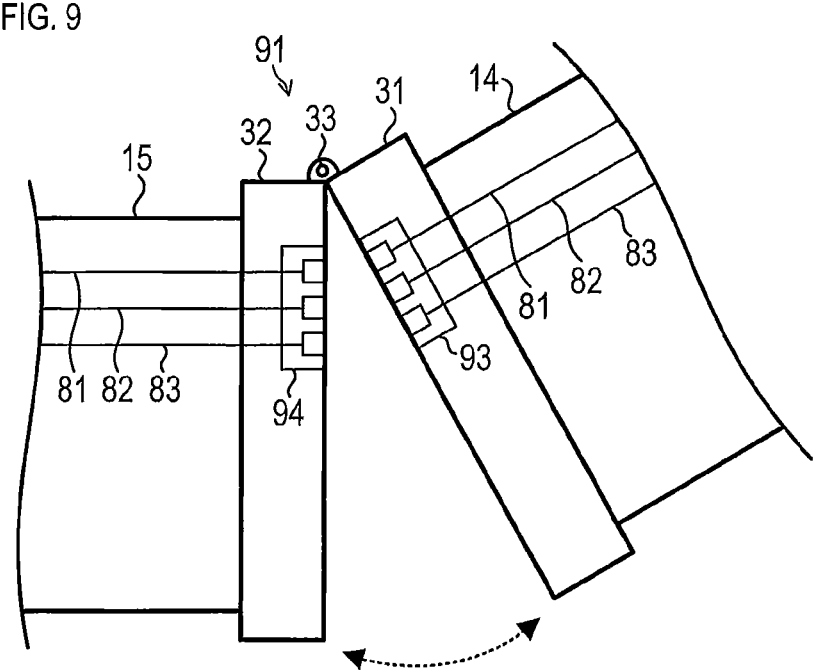
FIG. 9 is an explanatory diagram schematically showing a structure of a wiring breaker of the second embodiment.

When the pipe unit 2 is in the extended state, the first connector 93 and the second connector 94 are engaged with each other, to thereby electrically couple the respective phase terminals of the first connector 93 and the corresponding phase terminals of the second connector 94 to each other as shown in FIG. 8. In contrast, when the pipe unit 2 is in the folded state, the first connector 93 and the second connector 94 are spaced apart from each other as schematically shown in FIG. 9. As a result, the three power lines 81, 82, and 83 are all interrupted.

When the controller 60 and the respective phase coils 41, 42, and 43 of the motor 40 are disconnected from each other due to such interruption of the three power lines 81, 82, and 83, a drive power cannot be supplied from the controller 60 to the motor 40. Thus, even when the trigger switch 70 is turned on and the motor controller 67 controls the six switching elements 61 to 66 to drive the motor 40, no electric power is supplied from the controller 60 to the motor 40, and the motor 40 is not driven.

That is, the brush cutter 90 of the second embodiment is configured such that, when the pipe unit 2 is in the folded state, the pair of connectors 93 and 94 are spaced apart from each other to thereby prohibit driving of the motor 40. Further, the brush cutter 90 is configured such that, when the pipe unit 2 is in the extended state, the pair of connectors 93 and 94 are engaged with each other to thereby permit driving of the motor 40.

Consequently, according to the brush cutter 90 of the second embodiment, it is possible to appropriately inhibit the motor 40 from being driven when the pipe unit 2 is in the folded state. Moreover, subjects to be interrupted in the folded state are the three power lines 81, 82, and 83 arranged between the rear end unit 3 and the leading end unit 4. Thus, the configuration for such interruption in the folded state can be established relatively easily as compared with configurations for interrupting the electrical wiring not arranged between the units 3 and 4.

Third Embodiment

In the aforementioned second embodiment, the interruption-target lines are the three power lines 81, 82, and 83 of the eight conductors arranged between the units. In a third embodiment, an example will be shown in which the subjects to be interrupted are the sensor power-supply line 84 and the sensor ground line 85 instead of the three power lines 81, 82, and 83. Apart from the difference in the interruption-target lines, the third embodiment is the same as the second embodiment.

Figure 10:
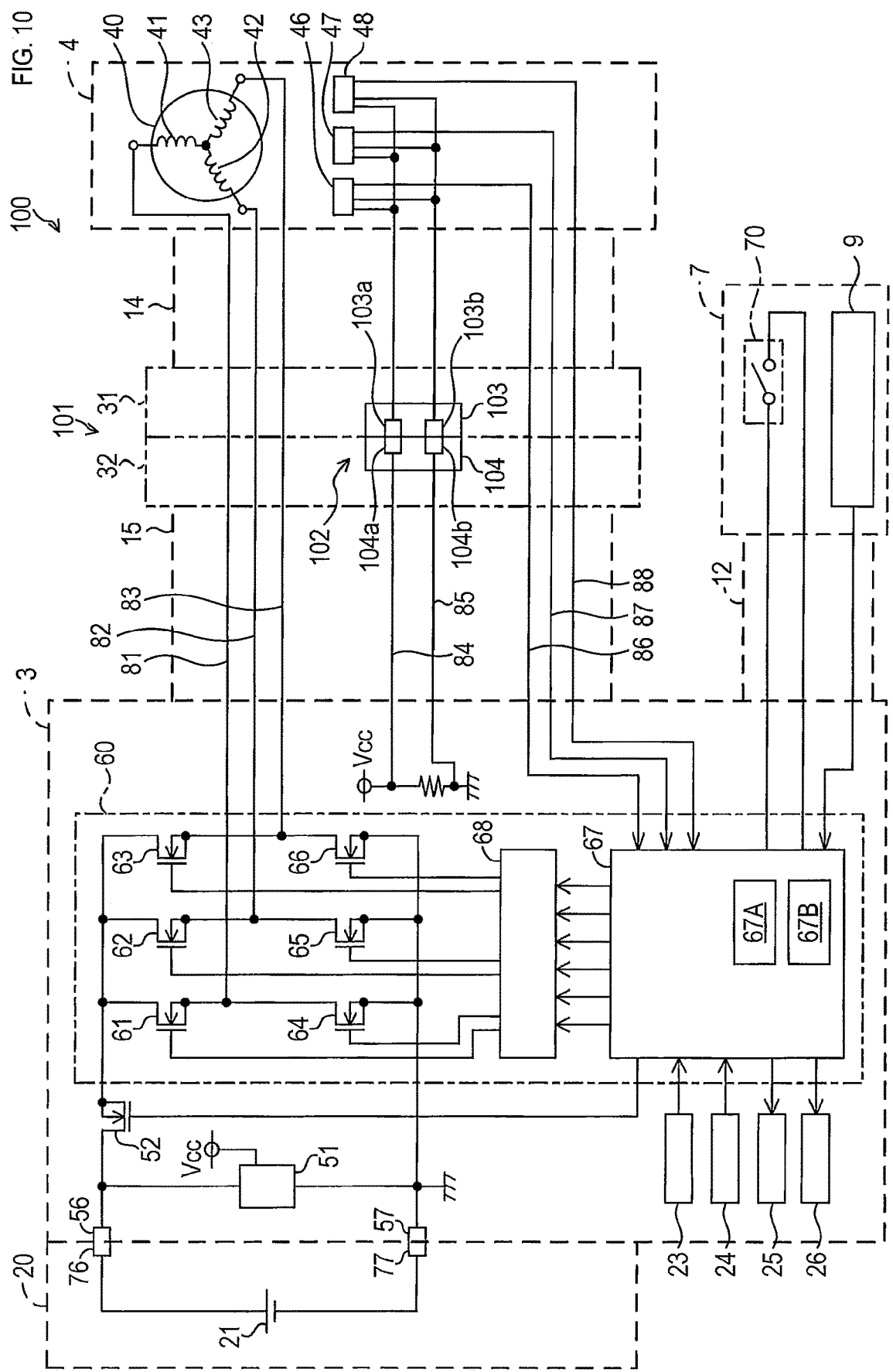
FIG. 10 is an explanatory diagram showing an electrical configuration of a brush cutter of a third embodiment.

As shown in FIG. 10, in a brush cutter 100 of the third embodiment, a wiring breaker 102 is provided to a coupling portion 101 of the pipe unit 2. The wiring breaker 102 comprises a pair of connectors 103 and 104, of which the first connector 103 is provided to the first holder 31 in the coupling portion 101 and the second connector 104 is provided to the second holder 32 in the coupling portion 101. The pair of connectors 103 and 104 are provided so as to conduct and interrupt the sensor power-supply line 84 and the sensor ground line 85 that electrically couple the controller 60 and the respective rotation sensors 46, 47, and 48 to each other according to the state of the pipe unit 2.

The first connector 103 comprises a power-supply terminal 103a and a ground terminal 103b. The power-supply terminal 103a is coupled to the respective rotation sensors 46, 47, and 48 via the sensor power-supply line 84. The ground terminal 103b is coupled to the respective rotation sensors 46, 47, and 48 via the sensor ground line 85.

The second connector 104 comprises a power-supply terminal 104a and a ground terminal 104b. The control voltage Vcc from the regulator 51 is applied to the power-supply terminal 104a via the sensor power-supply line 84. The ground terminal 104b is coupled to the ground line within the rear end unit 3 via the sensor ground line 85.

When the pipe unit 2 is in the extended state, the first connector 103 and the second connector 104 are engaged with each other, to thereby electrically couple the respective terminals of the first connector 103 and the corresponding terminals of the second connector 104 to each other. In contrast, when the pipe unit 2 is in the folded state, the first connector 103 and the second connector 104 are spaced apart from each other similarly to the connectors 93 and 94 shown in FIG. 9 in the second embodiment. As a result, the sensor power-supply line 84 and the sensor ground line 85 are both interrupted.

When the sensor power-supply line 84 and the sensor ground line 85 are interrupted, the power-supply power is not supplied to the respective rotation sensors 46, 47, and 48. As a result, the respective sensor signals inputted from the corresponding sensors 46, 47, and 48 to the motor controller 67 are all H level. Such a state is the signal abnormal state.

As described in the first embodiment, the motor controller 67 is configured, in the event of occurrence of the signal abnormal state, not to drive the motor 40 even when the trigger switch 70 is turned on. This is achieved by execution of a sensor monitoring processing shown in FIG. 11 by the motor controller 67.

Figure 11:
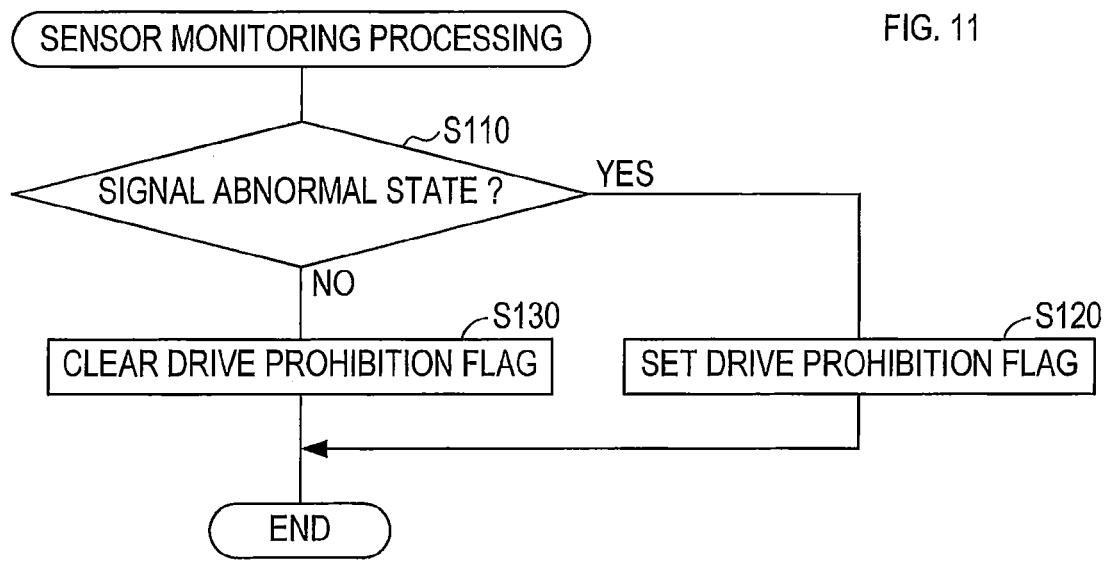
FIG. 11 is a flowchart of a sensor monitoring processing of the third embodiment.

After being activated, the motor controller 67 repeatedly executes the sensor monitoring processing shown in FIG. 11 at constant intervals. Upon start of the sensor monitoring processing shown in FIG. 11, in S110, the motor controller 67 determines presence/absence of occurrence of the signal abnormal state. More specifically, the motor controller 67 determines whether the inputted respective sensor signals are all H level and also such a state has continued for a specified period of time or longer.

In the presence of occurrence of the signal abnormal state, i.e., if the state in which the inputted respective sensor signals are all H level has continued for the specified period of time or longer, the motor controller 67 sets a drive prohibition flag in S120. When driving the motor 40 due to the trigger switch 70 being turned on, the motor controller 67 checks a state of the drive prohibition flag. The motor controller 67 is configured to drive the motor 40 if the drive prohibition flag is cleared and not to drive the motor 40 if the drive prohibition flag is set. Thus, if the drive prohibition flag is set in S120, the motor controller 67 does not drive the motor 40 thereafter regardless of the state of the trigger switch 70 until the drive prohibition flag is cleared in S130. During a period of time in which the drive prohibition flag is set, the motor controller 67 may keep the lamp 25 on.

In S110, in the absence of occurrence of the signal abnormal state, i.e., if at least one of the sensor signals is not H level or if the sensor signals are all H level but such a state has not continued for the specified period of time or longer, the processing shifts to S130. In S130, the motor controller 67 clears the drive prohibition flag. In the case where the lamp 25 is turned on in S120 when the drive prohibition flag is set, the lamp 25 may be turned off in S130.

Also according to the brush cutter 100 of the third embodiment, it is possible to appropriately inhibit the motor 40 from being driven when the brush cutter 100 is in the folded state. Moreover, the subjects to be interrupted in the folded state are the sensor power-supply line 84 and the sensor ground line 85 arranged between the units. Thus, as in the second embodiment, the configuration for such interruption in the folded state can be established relatively easily as compared with configurations for interrupting the electrical wiring not arranged between the units.

The function performed by the sensor monitoring processing shown in FIG. 11 corresponds to one example of a function of the controller of the present disclosure.

Fourth Embodiment

In the aforementioned third embodiment, the interruption-target lines are the sensor power-supply line 84 and the sensor ground line 85 among the eight conductors arranged between the units. In a fourth embodiment, an example is shown in which the subjects to be interrupted are the three sensor signal lines 86, 87, and 88. Apart from the difference in the interruption-target lines, the fourth embodiment is the same as the third embodiment.

Figure 12:
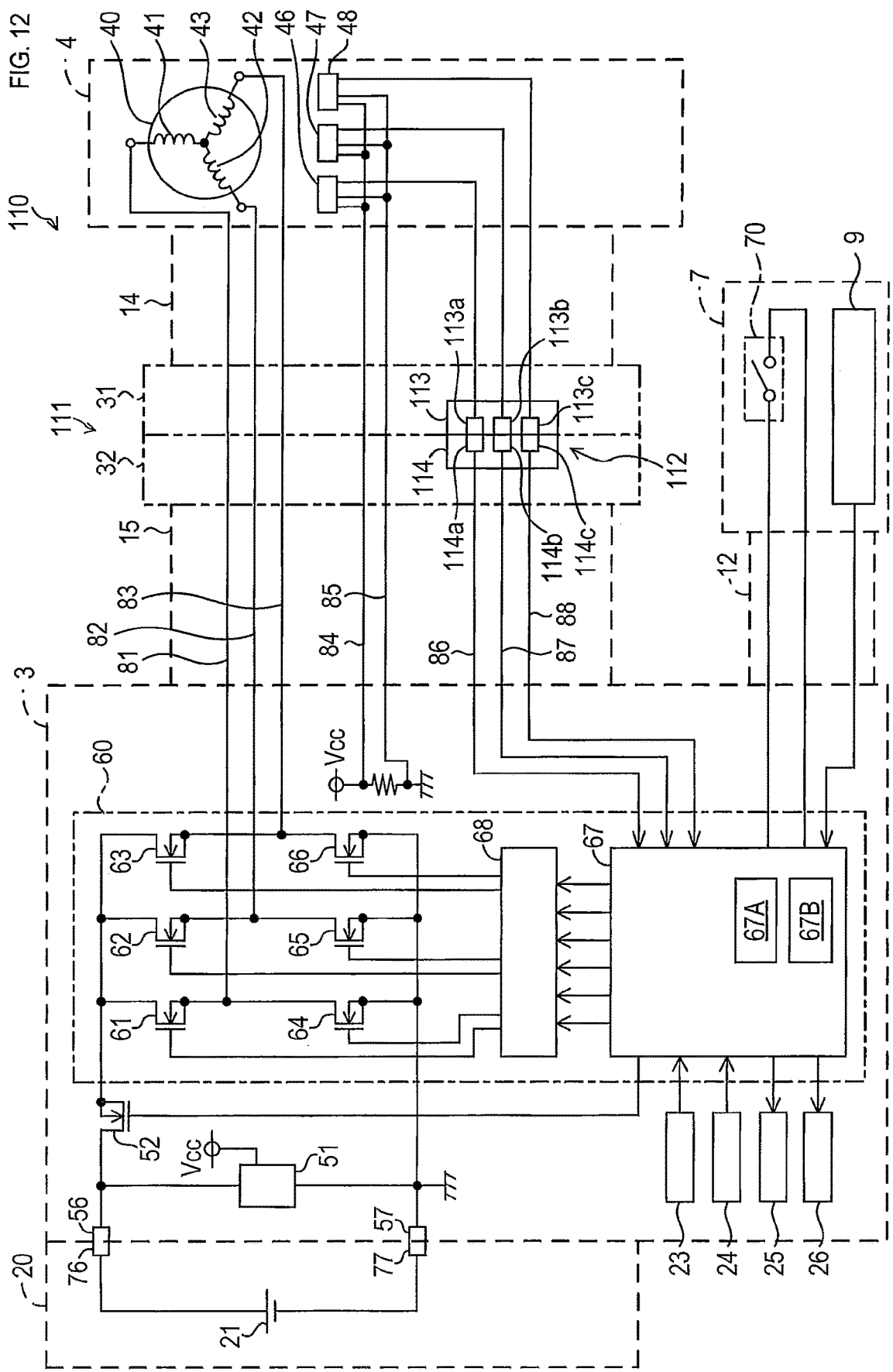
FIG. 12 is an explanatory diagram showing an electrical configuration of a brush cutter of a fourth embodiment.

As shown in FIG. 12, in a brush cutter 110 of the fourth embodiment, a wiring breaker 112 is provided to a coupling portion 111 of the pipe unit 2. The wiring breaker 112 comprises a pair of connectors 113 and 114, of which the first connector 113 is provided to the first holder 31 in the coupling portion 111 and the second connector 114 is provided to the second holder 32 in the coupling portion 111. The pair of connectors 113 and 114 are provided so as to conduct and interrupt the respective sensor signal lines 86, 87, and 88 that electrically couple the controller 60 and the rotation sensors 46, 47, and 48, respectively, to each other according to the state of the pipe unit 2.

The first connector 113 comprises a first signal terminal 113*a*, a second signal terminal 113*b*, and a third signal terminal 113*c*. The first signal terminal 113*a* is coupled to the first rotation sensor 46 via the first sensor signal line 86. The second signal terminal 113*b* is coupled to the second rotation sensor 47 via the second sensor signal line 87. The third signal terminal 113*c* is coupled to the third rotation sensor 48 via the third sensor signal line 88.

The second connector 114 comprises a first signal terminal 114*a*, a second signal terminal 114*b*, and a third signal terminal 114*c*. The first signal terminal 114*a* is coupled to the motor controller 67 via the first sensor signal line 86. The second signal terminal 114*b* is coupled to the motor controller 67 via the second sensor signal line 87. The third signal terminal 114*c* is coupled to the motor controller 67 via the third sensor signal line 88.

When the pipe unit 2 is in the extended state, the first connector 113 and the second connector 114 are engaged with each other, to thereby electrically couple the respective terminals of the first connector 113 and the corresponding terminals of the second connector 114 to each other. In contrast, when the pipe unit 2 is in the folded state, the first connector 113 and the second connector 114 are spaced apart from each other similarly to the first connector 93 and the second connector 94 shown in FIG. 9 in the second embodiment. As a result, the three sensor signal lines 86, 87, and 88 are all interrupted.

When the respective sensor signal lines 86, 87, and 88 are interrupted, the corresponding sensor signals inputted to the motor controller 67 are all H level. Such a state is the signal abnormal state. Since the motor controller 67 executes the sensor monitoring processing shown in FIG. 11, in the case where the signal abnormal state has occurred and the drive prohibition flag is set, the motor controller 67 does not drive the motor 40 even when the trigger switch 70 is turned on.

As described so far, also according to the brush cutter 110 of the fourth embodiment, it is possible to appropriately inhibit the motor 40 from being driven when the brush cutter 110 is in the folded state. Moreover, since the subjects to be interrupted are the three sensor signal lines 86, 87, and 88 arranged between the units, the configuration for such interruption in the folded state can be established relatively easily as compared with configurations for interrupting the electrical wiring not arranged between the units, similarly to the second embodiment and the third embodiment.

Fifth Embodiment

Figure 13:
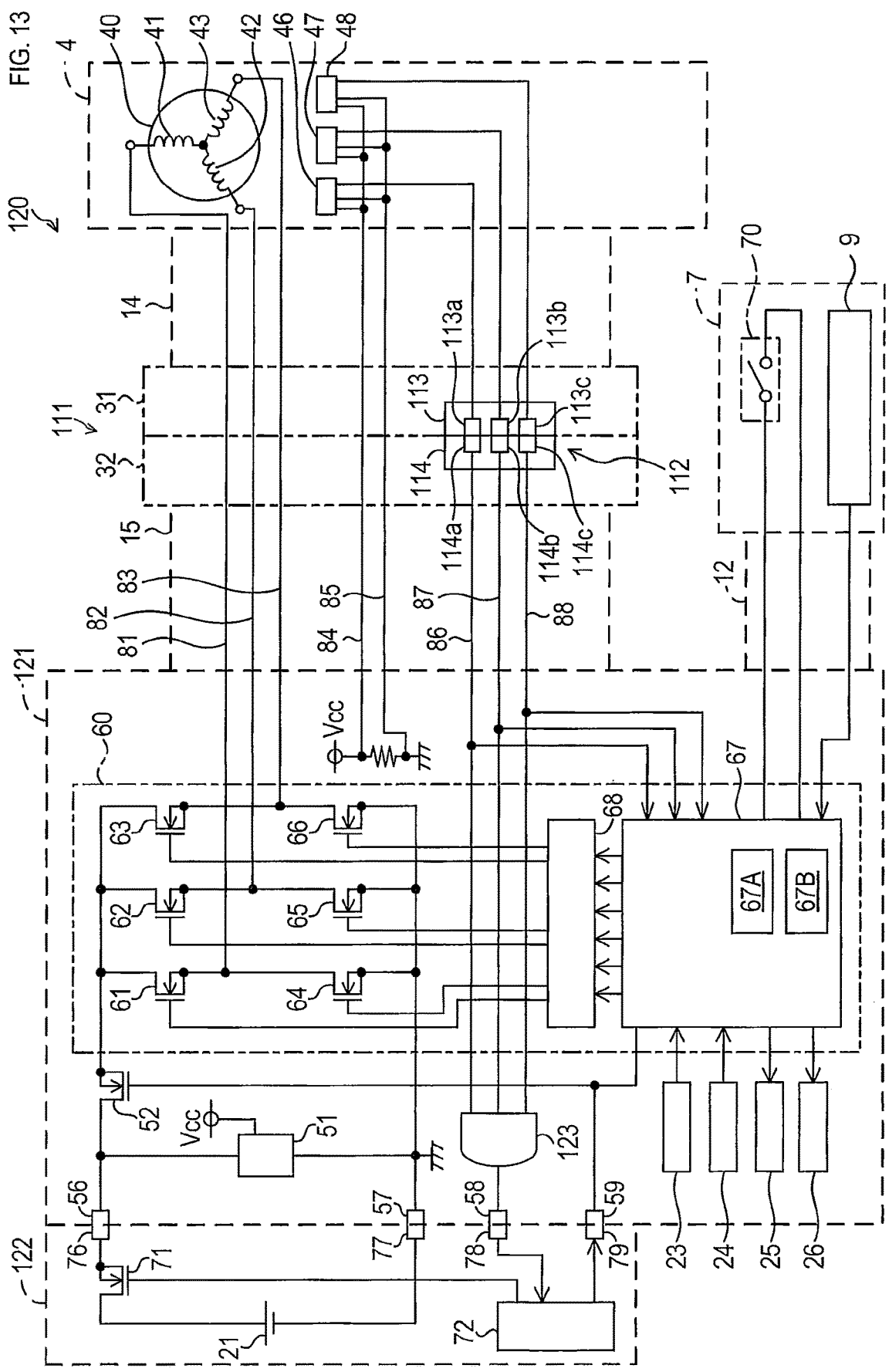
FIG. 13 is an explanatory diagram showing an electrical configuration of a brush cutter of a fifth embodiment.

A basic configuration of a brush cutter 120 of a fifth embodiment shown in FIG. 13 is similar to that of the brush cutter 110 of the fourth embodiment shown in FIG. 12. Thus, components of the brush cutter 120 common to those in the fourth embodiment will not be described below, and an explanation will be given focusing on differences from the fourth embodiment.

The brush cutter 120 of the fifth embodiment is different from the brush cutter 110 of the fourth embodiment shown in FIG. 12 mainly in terms of an internal configuration of a battery pack 122 and an internal configuration of a rear end unit 121.

As shown in FIG. 13, the rear end unit 121 comprises an AND circuit 123, a signal output terminal 58, and a signal input terminal 59. The AND circuit 123 calculates a logical product of three input signals and outputs a result of such calculation. The three sensor signal lines 86, 87, and 88 are coupled to corresponding three input terminals of the AND circuit 123. That is, the three sensor signals inputted to the motor controller 67 via the three sensor signal lines 86, 87, and 88 are also inputted to the AND circuit 123.

Thus, an output signal from the AND circuit 123 is L level when at least one of the three sensor signals is L level, and is H level when the three sensor signals are all H level. That is, when the signal abnormal state has occurred, the output signal from the AND circuit 123 is changed from L level to H level.

An output terminal of the AND circuit 123 is coupled to the signal output terminal 58. Thus, the output signal from the AND circuit 123 is outputted externally from the signal output terminal 58. The signal input terminal 59 of the rear end unit 121 is a terminal for inputting an interrupt signal from the battery pack 122. The signal input terminal 59 is coupled to a gate of the main switching element 52.

The battery pack 122 comprises a battery-side switching element 71, a battery controller 72, a signal input terminal 78, and a signal output terminal 79.

The battery-side switching element 71 is provided on a current flow path between the positive electrode of the battery 21 and the positive terminal 76, i.e., on a supply path for supplying the battery power to the rear end unit 121.

The battery-side switching element 71 of the present embodiment is, for example, a field-effect transistor (MOSFET). Alternatively, the battery-side switching element 71 may be, for example, an insulated gate bipolar transistor (IGBT) or may be other switching elements. The battery-side switching element 71 is turned on and off on the basis of a control signal inputted from the battery controller 72.

The signal input terminal 78 is coupled to the battery controller 72. When the battery pack 122 is attached to the rear end unit 121, the signal input terminal 78 is coupled to the signal output terminal 58 of the rear end unit 121. Thus, the output signal from the AND circuit 123 in the rear end unit 121 is inputted to the battery controller 72 via the signal output terminal 58 of the rear end unit 121 and the signal input terminal 78 of the battery pack 122.

The signal output terminal 79 of the battery pack 122 is coupled to the battery controller 72. The signal output terminal 79 is coupled to the signal input terminal 59 of the rear end unit 121 when the battery pack 122 is attached to the rear end unit 121.

The interrupt signal is outputted from the battery controller 72 to the signal output terminal 79 in some circumstances, as will be hereinafter described. The interrupt signal is, for example, a signal of L level in the present embodiment. When the interrupt signal is outputted from the battery controller 72, the interrupt signal is inputted to the rear end unit 121, and is inputted to the gate of the main switching element 52 in the rear end unit 121. When the interrupt signal is inputted from the battery pack 122, the main switching element 52 is forcibly turned off regardless of contents of control by the motor controller 67.

That is, the battery controller 72 forcibly turns off the main switching element 52 by outputting the interrupt signal, to thereby enable interruption of the supply path of the battery power from the battery pack 122 to the controller 60.

The battery controller 72 controls ON/OFF of the battery-side switching element 71. In a normal state, the battery controller 72 turns on the battery-side switching element 71, which allows for external supply of the battery power of the battery 21. Then, upon satisfaction of specific conditions that necessitate stop of discharge and charge of the battery 21, i.e., for example, upon detection of an abnormal state such as overdischarge, overcharge, and overcurrent, of the battery 21, the battery controller 72 turns off the battery-side switching element 71.

Additionally, the battery controller 72 determines whether the pipe unit 2 is in the folded state. When the battery controller 72 determines that the pipe unit 2 is in the folded state, the battery controller 72 outputs the interrupt signal to the rear end unit 121 via the signal output terminal 79. As a result, the main switching element 52 is forcibly switched to OFF.

Specifically, the battery controller 72 determines whether the signal abnormal state has occurred on the basis of a signal inputted from the AND circuit 123 in the rear end unit 121. As described in the fourth embodiment, when the pipe unit 2 is brought into the folded state, the signal abnormal state occurs and the output signal from the AND circuit 123 becomes H level. Thus, the battery controller 72 can determine whether the pipe unit 2 is in the folded state on the basis of the output signal from the AND circuit 123.

When the battery controller 72 determines that the signal abnormal state has occurred, i.e., that the pipe unit 2 is in the folded state, on the basis of the output signal from the AND circuit 123, the battery controller 72 outputs the interrupt signal to the rear end unit 121 via the signal output terminal 79. As a result, the main switching element 52 is forcibly turned off. At this time, the battery controller 72 may also turn off the battery-side switching element 71. Alternatively, the battery controller 72 may turn off the battery-side switching element 71 without turning off the main switching element 52 in the rear end unit 121.

As described so far, according to the brush cutter 120 of the fifth embodiment, when the pipe unit 2 is brought into the folded state, the supply path of the battery power from the battery 21 to the controller 60 is interrupted, whereby the electric power for driving is not supplied to the motor 40. Thus, it is possible to inhibit the motor 40 from being driven when the pipe unit 2 is in the folded state.

Further, interruption of the supply path of the battery power is performed by the battery controller 72. When the battery controller 72 determines that the signal abnormal state has occurred on the basis of the output signal from the AND circuit 123 in the rear end unit 121, the battery controller 72 outputs the interrupt signal to thereby turn off the main switching element 52. Consequently, it is possible to prohibit driving of the motor 40 when the pipe unit 2 is brought into the folded state, by outputting the interrupt signal at an appropriate timing.

Here, correspondence relationships of terms related to the fifth embodiment will be described. The main switching element 52 and the battery-side switching element 71 correspond to one example of a power interrupter. The battery controller 72 corresponds to one example of an interrupt signal outputter. The AND circuit 123 corresponds to one example of an information outputter. The output signal from the AND circuit 123 corresponds to one example of state information.

Sixth Embodiment

Figure 14:
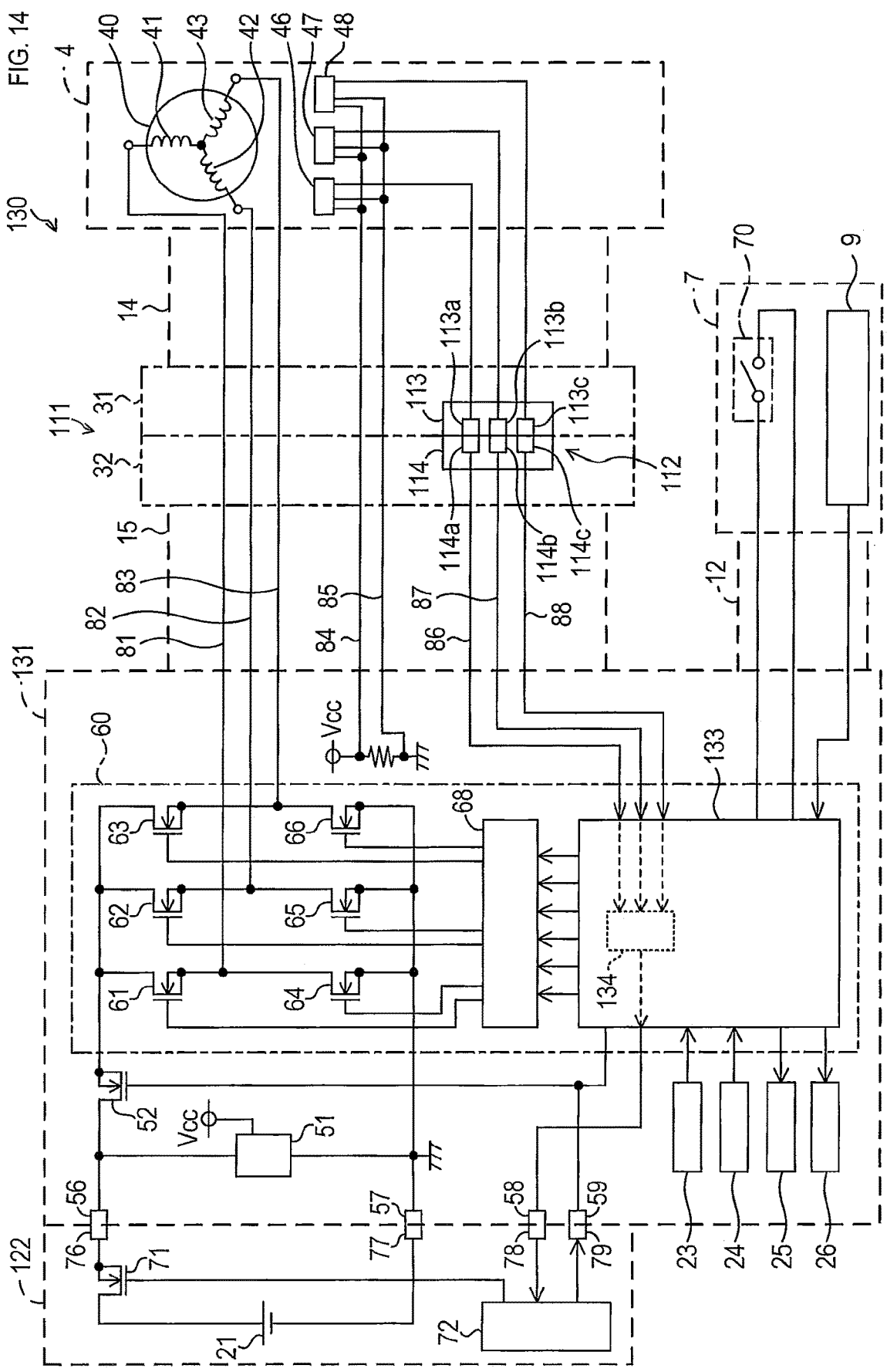
FIG. 14 is an explanatory diagram showing an electrical configuration of a brush cutter of a sixth embodiment.

A brush cutter 130 of a sixth embodiment shown in FIG. 14 is basically configured similarly to the brush cutter 120 of the fifth embodiment shown in FIG. 13. Thus, components of the brush cutter 130 common to those in the fifth embodiment will not be described below, and an explanation will be given focusing on differences from the fifth embodiment.

The brush cutter 130 of the sixth embodiment is different from the brush cutter 120 of the fifth embodiment shown in FIG. 13 in terms of part of a configuration of a rear end unit 131. Specifically, the configuration of the rear end unit 131 differs in that the information on whether the pipe unit 2 is in the folded state (directly speaking, the information on presence/absence of occurrence of the signal abnormal state) is generated and outputted not by the AND circuit but by a component within the motor controller.

As shown in FIG. 14, the brush cutter 130 does not comprise the AND circuit 123 as in the fifth embodiment within the rear end unit 131. Instead, the rear end unit 131 has a sensor signal determiner 134 integrated within a motor controller 133.

The sensor signal determiner 134 generates and outputs sensor signal information indicating what state the three sensor signals inputted to the motor controller 133 are in. Specifically, the sensor signal determiner 134 is configured to output a constant signal of H level as the sensor signal information in the presence of occurrence of the signal abnormal state (i.e., when the three sensor signals are all H level), and to output a constant signal of L level as the sensor signal information in the absence of occurrence of the signal abnormal state.

The sensor signal information outputted from the sensor signal determiner 134 is inputted to the battery pack 122 via the signal output terminal 58 of the rear end unit 131, and is inputted to the battery controller 72. When the sensor signal information inputted from the rear end unit 131 indicates occurrence of the signal abnormal state, the battery controller 72 executes the processing identical to that executed, in the fifth embodiment, when the output signal from the AND circuit 123 is H level. That is, the battery controller 72 forcibly turns off the main switching element 52 by outputting the interrupt signal to the rear end unit 131 via the signal output terminal 79.

The sensor signal determiner 134 may be embodied by a hardware circuit such as a logic circuit or may be embodied by a software processing. It may be decided as appropriate what specific signal is to be outputted as the sensor signal information by the sensor signal determiner 134.

Also according to the thus-configured brush cutter 130 of the present sixth embodiment, effects similar to those in the fifth embodiment can be obtained. In the present embodiment, the sensor signal determiner 134 corresponds to one example of the information outputter, and the sensor signal information outputted from the sensor signal determiner 134 corresponds to one example of the state information.

A feature of the present sixth embodiment and the above-described fifth embodiment is that the battery controller 72 interrupts the supply path of the battery power when the pipe unit 2 is brought into the folded state. Thus, the configuration to output the signal indicating that the pipe unit 2 is in the folded state to the battery controller 72 may take various forms.

For example, a configuration may be adopted in which the three sensor signals inputted to the motor controller are outputted to the battery controller 72 as they are and the battery controller 72 determines presence/absence of occurrence of the signal abnormal state (and thus, whether the pipe unit 2 is in the folded state) on the basis of such three sensor signals. The AND circuit 123 may be provided within the battery pack and a processing based on the output signal from such an AND circuit 123 may be executed by the battery controller 72.

Alternatively, instead of the information on the three sensor signals, other information that enables determination on whether the pipe unit 2 is in the folded state may be directly outputted to the battery controller 72. As a further alternative example, a result of determination on whether the pipe unit 2 is in the folded state based on such other information may be outputted to the battery controller 72.

In other words, other configurations may be adopted in which the battery controller 72 can interrupt the supply path of the battery power appropriately when the pipe unit 2 is brought into the folded state. The configuration of the power interrupter that interrupts the supply path of the battery power may be decided as appropriate. For example, a type, the number, and a position of the element used for the power interrupter may be decided as appropriate.

Seventh Embodiment

Figure 15:
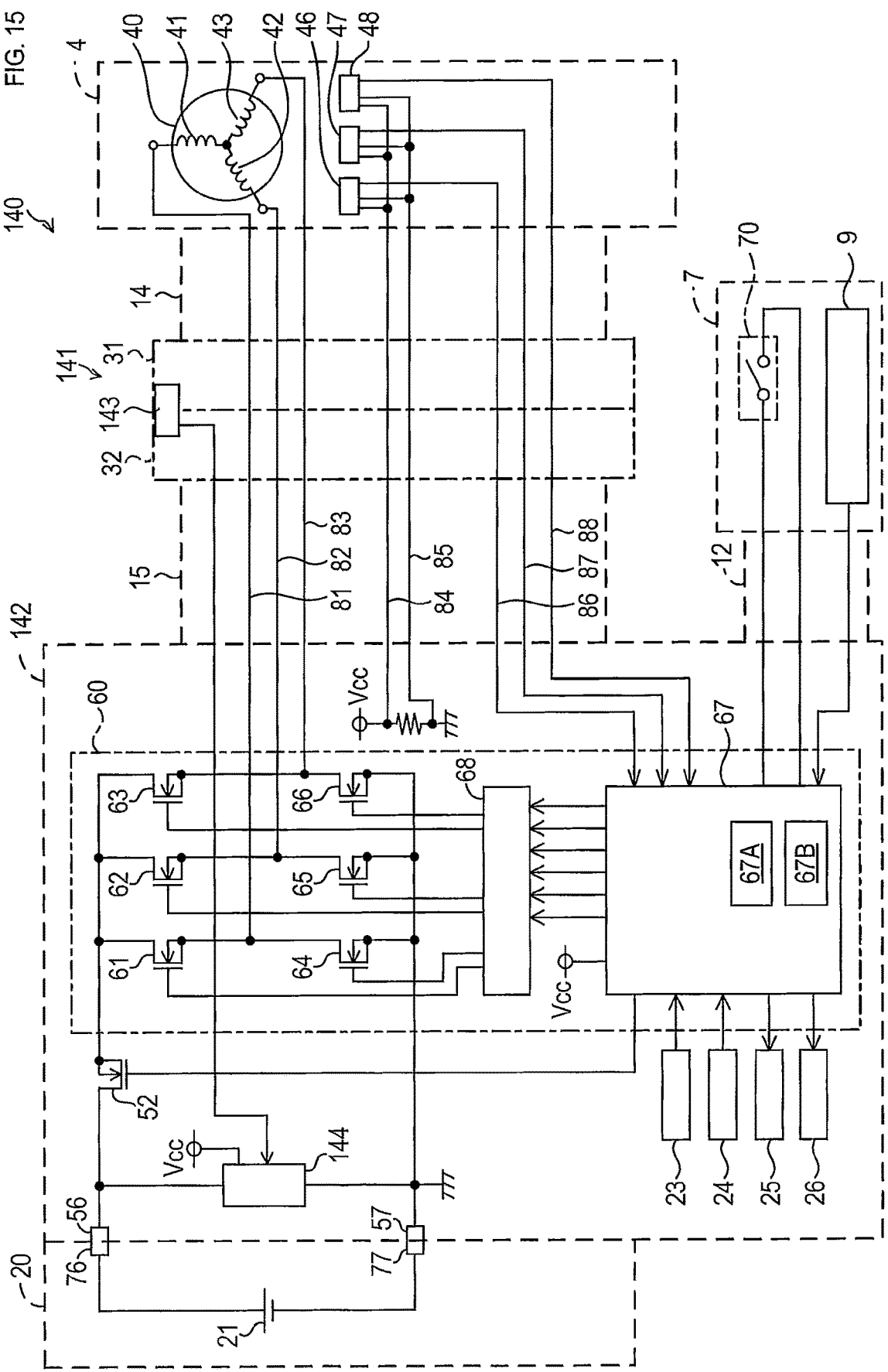
FIG. 15 is an explanatory diagram showing an electrical configuration of a brush cutter of a seventh embodiment.

A brush cutter 140 of a seventh embodiment shown in FIG. 15 is basically configured similarly to the brush cutter 1 of the first embodiment. Thus, components of the brush cutter 140 common to those in the first embodiment will not be described below. In the brush cutter 140 of the present seventh embodiment, an electrical coupling manner between the trigger switch 70 and the motor controller 67 is similar to that in the brush cutter 90 of the second embodiment.

Main features of the brush cutter 140 of the seventh embodiment that differ from those in the first embodiment and the second embodiment are that a fold detector 143 is provided to a coupling portion 141, and a function of a regulator 144 within a rear end unit 142.

As shown in FIG. 15, the fold detector 143 is provided to the coupling portion 141. The fold detector 143 detects whether the pipe unit 2 is in the folded state or in the extended state, and outputs a pipe state signal, which is a signal indicating a result of such detection, to the regulator 144.

In addition to the function of the regulator 51 of the first embodiment, the regulator 144 further comprises a function of controlling operation of the regulator 144 itself on the basis of the pipe state signal from the fold detector 143.

Specifically, when the pipe state signal inputted from the fold detector 143 indicates that the pipe unit 2 is in the extended state, the regulator 144 generates and outputs the power-supply power of the control voltage Vcc. In contrast, when the pipe state signal inputted from the fold detector 143 indicates that the pipe unit 2 is in the folded state, the regulator 144 stops generation and output of the power-supply power.

A configuration and arrangement of the fold detector 143 may be decided as appropriate. For example, a switch may be provided that is switched between ON and OFF according to whether the pipe unit 2 is in the extended state or in the folded state like the wiring breaker 30 of the first embodiment, and a signal indicating a state of such a switch may be inputted to the regulator 144 as the pipe state signal. Alternatively, a Hall sensor may be provided to either of the first holder 31 or the second holder 32 and a magnet may be provided to the other, so that an output signal from the Hall sensor is changed according to the state of the pipe unit 2, i.e., the extended state or the folded state. The output signal from the Hall sensor may be inputted to the regulator 144 as the pipe state signal.

The regulator 144 may be configured, when stopping generation of the power-supply power on the basis of the pipe state signal from the fold detector 143, not to immediately stop the generation (i.e., not to immediately decrease the output voltage to zero) but to decrease the voltage gradually. In such a configuration, the above-described capacitor for holding the power-supply voltage may be omitted from the motor controller 67.

When stopping generation of the control voltage Vcc, the regulator 144 may provide a notification to that effect to the motor controller 67 in advance. The motor controller 67 may be configured to stop operation upon receipt of such a stop notification from the regulator 144, whereas the regulator 144 may be configured, upon providing the stop notification, to stop generation of the control voltage Vcc after elapse of a specified period of time or longer required for the motor controller 67 to stop operation.

As described so far, according to the brush cutter 140 of the seventh embodiment, when the pipe unit 2 is brought into the folded state, the power-supply power of the control voltage Vcc from the regulator 144 is not supplied to the motor controller 67, whereby the motor controller 67 stops operation and driving of the motor 40 is not performed. Consequently, it is possible to inhibit the motor 40 from being driven when the pipe unit 2 is in the folded state. Further, the regulator 144 can easily determine that the pipe unit 2 has been brought into the folded state on the basis of the pipe state signal from the fold detector 143.

Here, correspondence relationships of terms related to the seventh embodiment will be described. The fold detector 143 corresponds to one example of a rod state detector. The regulator 144 corresponds to one example of a power supplier.

A feature of the seventh embodiment is that the power-supply power is not outputted from the regulator 144 when the pipe unit 2 is in the folded state, and eventually, that supply of the power-supply power to the motor controller 67 is stopped to thereby stop operation of the motor controller 67. Thus, other configurations may be adopted in which supply of the power-supply power to the motor controller 67 can be stopped when the pipe unit 2 is in the folded state.

For example, a configuration may be adopted in which the regulator 51 of the first embodiment is used as the regulator and a switch is provided on the supply path of the battery power between the positive terminal 56 of the rear end unit 142 and the regulator 51. In such a configuration, when the folded state is detected by the fold detector 143, input of the battery power to the regulator 51 may be blocked by turning off the switch, to thereby inhibit generation of the power-supply power of the control voltage Vcc in the regulator 51.

Alternatively, a configuration may be adopted in which a switch is provided on the supply path of the power-supply power from the regulator 51 to the motor controller 67 and supply of the power-supply power at least to the motor controller 67 is blocked by turning off the switch when the folded state is detected by the fold detector 143.

Eighth Embodiment

Figure 16:
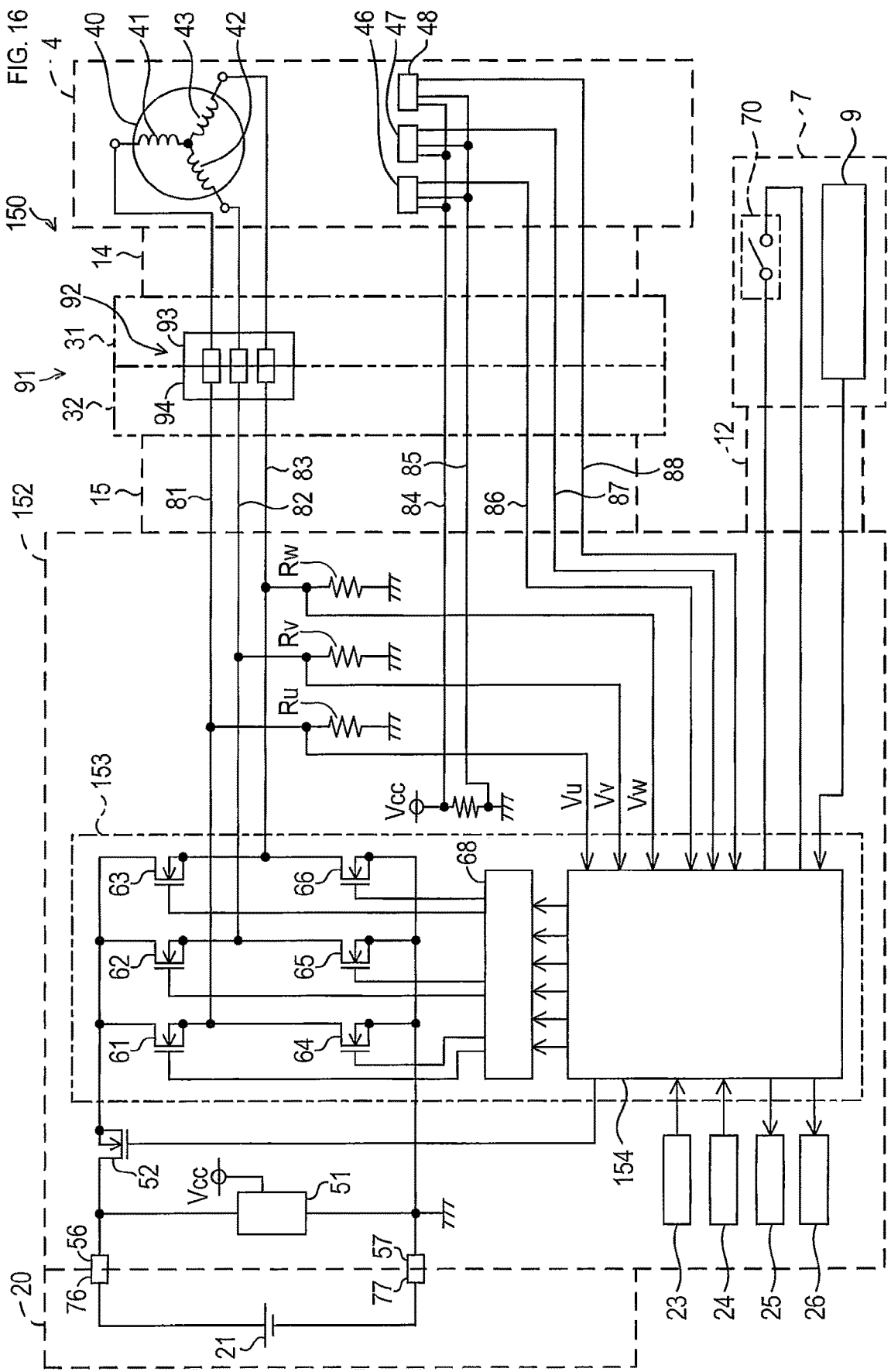
FIG. 16 is an explanatory diagram showing an electrical configuration of a brush cutter of an eighth embodiment.

A brush cutter 150 of an eighth embodiment shown in FIG. 16 has a configuration that is basically similar to that of the brush cutter 90 of the second embodiment except for some components within the rear end unit 152. Thus, components of the brush cutter 150 common to those in the second embodiment are assigned with the reference numerals same as those in the second embodiment, and an explanation will be given focusing on differences from the second embodiment.

As is obvious from comparison with the brush cutter 90 of the second embodiment shown in FIG. 8, the brush cutter 150 of the eighth embodiment comprises three resistors Ru, Rv, and Rw within the rear end unit 152.

One end of the first resistor Ru is coupled to the U-phase power line 81 and the other end is coupled to a ground line. The one end of the first resistor Ru is also coupled to a motor controller 154, and a voltage of the first resistor Ru is inputted to the motor controller 154 as a U-phase voltage value Vu.

One end of the second resistor Rv is coupled to the V-phase power line 82 and the other end is coupled to the ground line. The one end of the second resistor Rv is also coupled to the motor controller 154, and a voltage of the second resistor Rv is inputted to the motor controller 154 as a V-phase voltage value Vv.

One end of the third resistor Rw is coupled to the W-phase power line 83 and the other end is coupled to the ground line. The one end of the third resistor Rw is also coupled to the motor controller 154, and a voltage of the third resistor Rw is inputted to the motor controller 154 as a W-phase voltage value Vw.

Figure 17:
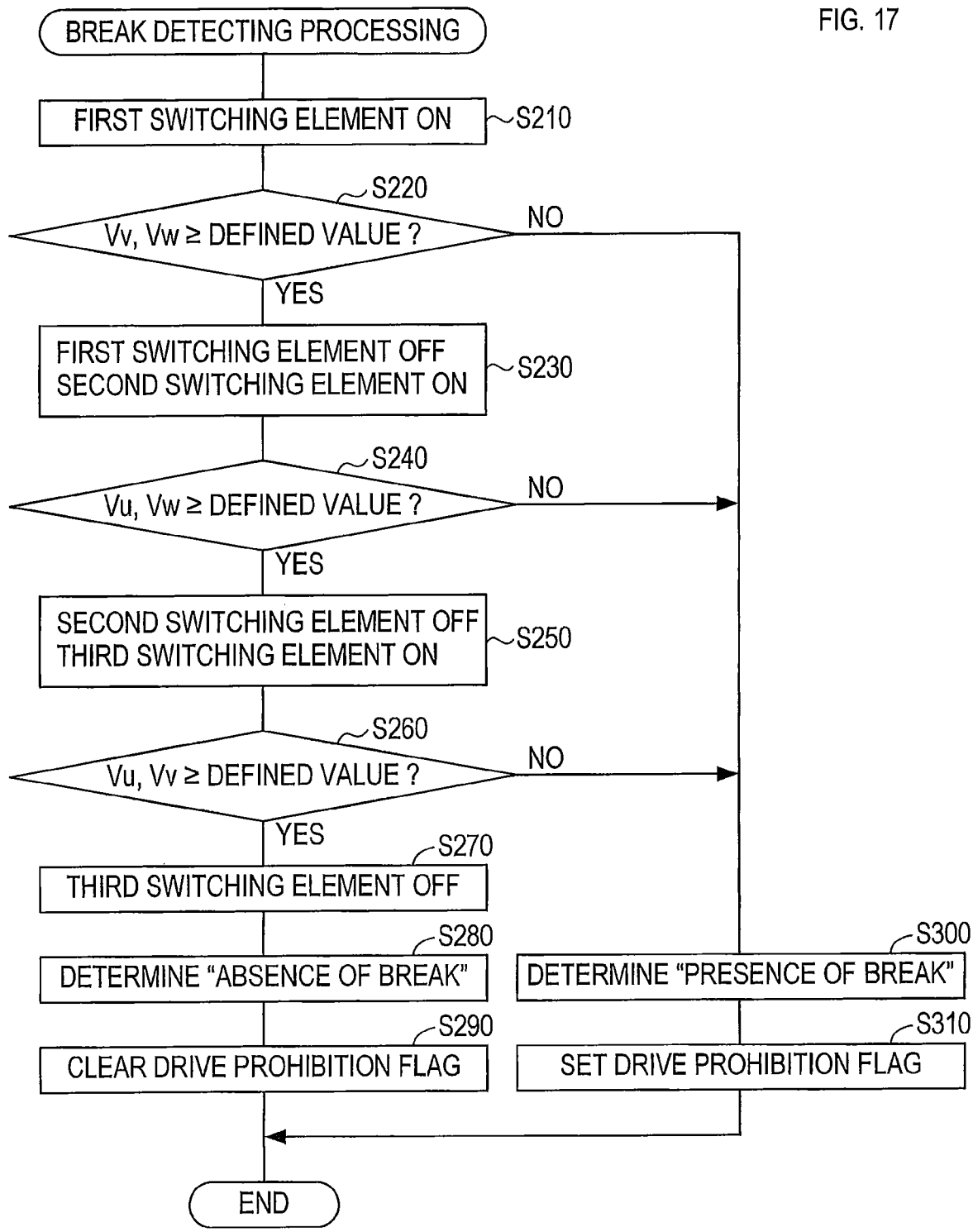
FIG. 17 is a flowchart of a break detecting processing of the eighth embodiment.

The motor controller 154 comprises functions basically the same as those of the motor controller 67 of the second embodiment. In addition, the motor controller 154 comprises a break detecting function of detecting interruption of the respective power lines 81, 82, and 83 on the basis of the corresponding phase voltage values Vu, Vv, and Vw from the corresponding resistors Ru, Rv, and Rw. Specifically, when the trigger switch 70 is turned on, the motor controller 154 executes the break detecting processing shown in FIG. 17 before driving the motor 40.

Upon start of the break detecting processing caused by turning-on of the trigger switch 70, the motor controller 154 turns on the first switching element 61 in S210. In S220, the motor controller 154 determines whether both of the V-phase voltage value Vv and the W-phase voltage value Vw are equal to or greater than a defined value.

At this time, when the pipe unit 2 is in the extended state and also the power lines 81, 82, and 83 are not interrupted, the turning-on of the first switching element 61 brings all of the three power lines 81, 82, and 83 into a state in which a voltage of a value close to that of the battery voltage is applied thereto. Thus, both of the V-phase voltage value Vv and the W-phase voltage value Vw inputted to the motor controller 154 are close to the value of the battery voltage.

When the pipe unit 2 is brought into the folded state, the power lines 81, 82, and 83 are interrupted by the wiring breaker 92 and thereby become an interrupted state. In such a case, although the first switching element 61 is turned on and the battery voltage is thereby applied to the U-phase power line 81, the battery voltage is not applied to the V-phase power line 82 and the W-phase power line 83. Thus, in this case, both of the V-phase voltage value Vv and the W-phase voltage value Vw inputted to the motor controller 154 become zero.

Accordingly, presence/absence of interruption of the respective power lines 81, 82, and 83 can be detected by setting the defined value to a specified value greater than zero and less than the battery voltage. In the present embodiment, set as the defined value is, for example, a value obtained by subtracting a given value including at least a voltage drop caused by the first switching element 61 from a rated voltage of the battery 21.

In S220, if at least one of the V-phase voltage value Vv or the W-phase voltage value Vw is less than the defined value, the processing shifts to S300. In S300, the motor controller 154 determines that any of the power lines 81, 82, and 83 is interrupted. Then, in S310, the motor controller 154 sets the drive prohibition flag. After the drive prohibition flag is set in S310, the motor controller 154 does not drive the motor 40 regardless of the state of the trigger switch 70 until the drive prohibition flag is cleared in S290.

In S220, if the motor controller 154 determines that both of the V-phase voltage value Vv and the W-phase voltage value Vw are equal to or greater than the defined value, the processing shifts to S230. In S230, the motor controller 154 turns off the first switching element 61 and turns on the second switching element 62. In S240, the motor controller 154 determines whether both of the U-phase voltage value Vu and the W-phase voltage value Vw are equal to or greater than the defined value.

At this time, when the pipe unit 2 is in the extended state and also the power lines 81, 82, and 83 are not interrupted, the turning-on of the second switching element 62 causes both of the U-phase voltage value Vu and the W-phase voltage value Vw inputted to the motor controller 154 to be equal to or greater than the defined value.

When the pipe unit 2 is brought into the folded state and the power lines 81, 82, and 83 are interrupted by the wiring breaker 92, although the second switching element 62 is turned on and the battery voltage is applied to the V-phase power line 82, the battery voltage is not applied to the U-phase power line 81 and the W-phase power line 83. Thus, both of the U-phase voltage value Vu and the W-phase voltage value Vw inputted to the motor controller 154 are less than the defined value.

In S240, if at least one of the U-phase voltage value Vu or the W-phase voltage value Vw is less than the defined value, the motor controller 154 determines in S300 that any of the power lines 81, 82, and 83 is interrupted, and then, the motor controller 154 sets the drive prohibition flag in S310.

In S240, if the motor controller 154 determines that both of the U-phase voltage value Vu and the W-phase voltage value Vw are equal to or greater than the defined value, the processing shifts to S250. In S250, the motor controller 154 turns off the second switching element 62 and turns on the third switching element 63. In S260, the motor controller 154 determines whether both of the U-phase voltage value Vu and the V-phase voltage value Vv are equal to or greater than the defined value.

At this time, when the pipe unit 2 is in the extended state and also the power lines 81, 82, and 83 are not interrupted, the turning-on of the third switching element 63 causes both of the U-phase voltage value Vu and the V-phase voltage value Vv inputted to the motor controller 154 to be equal to or greater than the defined value.

When the pipe unit 2 is brought into the folded state and the power lines 81, 82, and 83 are interrupted by the wiring breaker 92, although the third switching element 63 is turned on and the battery voltage is applied to the W-phase power line 83, the battery voltage is not applied to the U-phase power line 81 and the V-phase power line 82. Thus, both of the U-phase voltage value Vu and the V-phase voltage value Vv inputted to the motor controller 154 are less than the defined value.

In S260, if at least one of the U-phase voltage value Vu or the V-phase voltage value Vv is less than the defined value, the motor controller 154 determines in S300 that any of the power lines 81, 82, and 83 is interrupted, and then, the motor controller 154 sets the drive prohibition flag in S310.

In S260, if the motor controller 154 determines that both of the U-phase voltage value Vu and the V-phase voltage value Vv are equal to or greater than the defined value, the motor controller 154 turns off the third switching element 63 in S270, and the processing shifts to S280. In S280, the motor controller 154 determines that none of the power lines 81, 82, and 83 is interrupted. Then, the motor controller 154 clears the drive prohibition flag in S290.

According to the thus-configured brush cutter 150 of the eighth embodiment, when the pipe unit 2 is brought into the folded state and the break-target conductors (the three power lines 81, 82, and 83 in the present embodiment) are broken, such a state is determined to be a break by the motor controller 154. Upon such determination, driving of the motor 40 by the motor controller 154 is not performed. Consequently, it is possible to inhibit the motor 40 from being driven when the pipe unit 2 is in the folded state.

According to the brush cutter 150 of the eighth embodiment, if any of the power lines 81, 82, and 83 is actually interrupted even when the pipe unit 2 is in the extended state, such interruption is detected by the motor controller 154, and driving of the motor 40 is prohibited.

Ninth Embodiment

Next, a brush cutter 160 comprising a sensorless control function will be described as a ninth embodiment. With the sensorless control function, in the brush cutter 160, the rotational position of the motor 40 is detected with no use of the rotation sensors 46, 47, and 48, and driving of the motor 40 is controlled.

Figure 18:
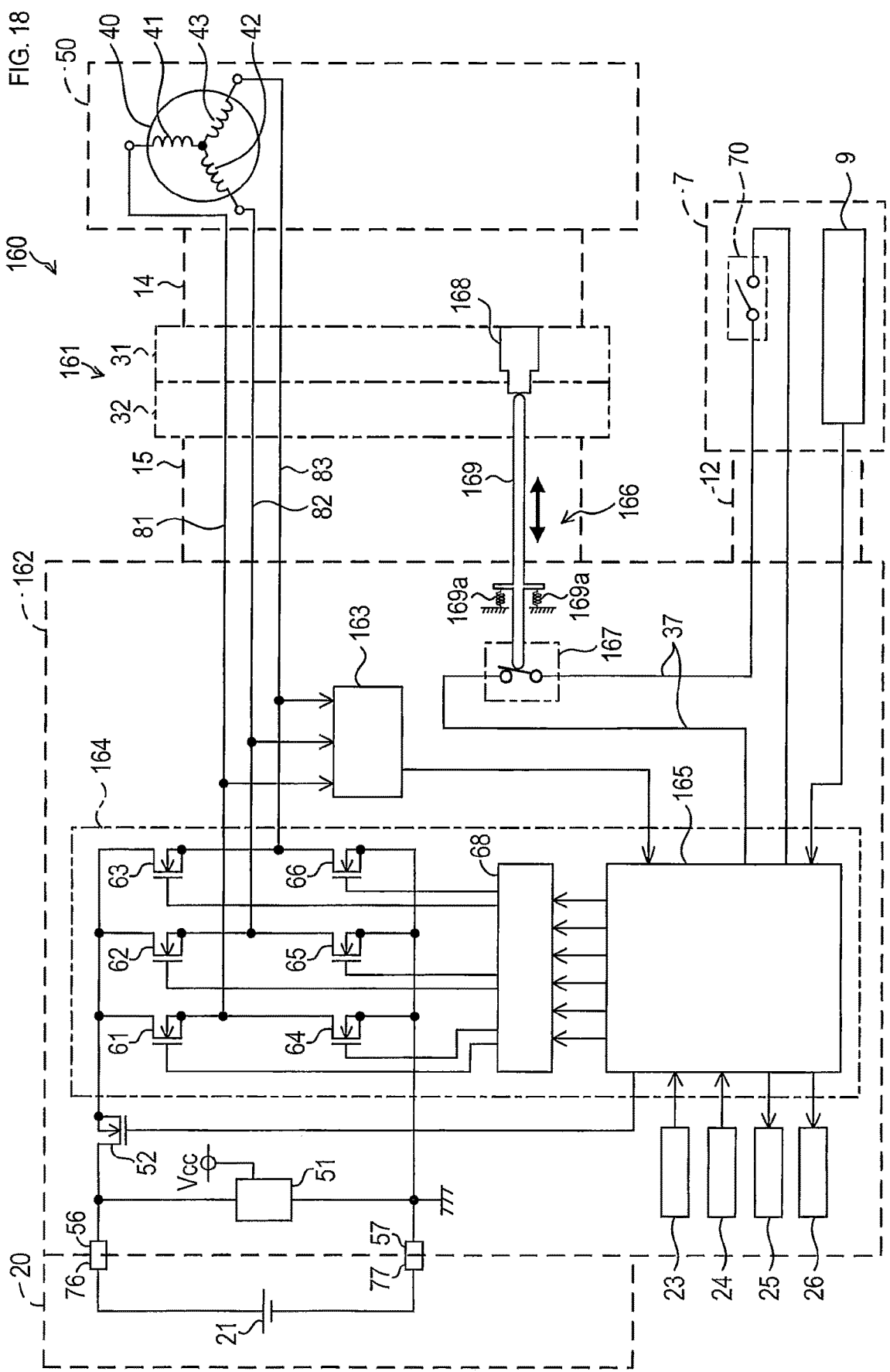
FIG. 18 is an explanatory diagram showing an electrical configuration of a brush cutter of a ninth embodiment.

The brush cutter 160 of the ninth embodiment shown in FIG. 18 is different from the brush cutter 1 of the first embodiment mainly in terms of adoption of a sensorless control and a configuration of a wiring breaker 166. Other than these points, the brush cutter 160 is configured basically similarly to the brush cutter 1 of the first embodiment.

As shown in FIG. 18, the brush cutter 160 of the ninth embodiment comprises no rotation sensors in a leading end unit 50. On the other hand, a rear end unit 162 comprises a rotational position identifier 163.

The rotational position identifier 163 is coupled to the three power lines 81, 82, and 83. The rotational position identifier 163 identifies the rotational position of the motor 40 by detecting a counter electromotive force generated in the coils 41, 42, and 43 of the motor 40. The rotational position identifier 163 outputs rotational position information indicating the identified rotational position to a motor controller 165 in a controller 164. The motor controller 165 controls the motor 40 on the basis of the rotational position information inputted from the rotational position identifier 163.

Since a technique to detect a rotational position of a motor on the basis of a counter electromotive force of motor coils is already well known, detailed explanation on a function of the rotational position identifier 163 is omitted here.

The wiring breaker 166 in the brush cutter 160 of the ninth embodiment comprises a breaker switch 167, a switch operating rod 169, and a pressing portion 168. The breaker switch 167 is configured similarly to the breaker switch 36 of the first embodiment, and is provided within the rear end unit 162 in the present embodiment. One end of the trigger switch 70 is coupled to the motor controller 165 via the trigger signal line 37 and the breaker switch 167 as in the first embodiment. Thus, when the breaker switch 167 is OFF, even when the trigger switch 70 is turned on, such turning-on is not conveyed to the motor controller 165.

The switch operating rod 169 is an elongated member that turns on and off the breaker switch 167, and is arranged within the second pipe 15 so as to be movable in the front-rear direction. A leading end-side end of the switch operating rod 169 is located in the vicinity of a middle position of a coupling portion 161. A rear end-side end of the switch operating rod 169 is located in the vicinity of the breaker switch 167.

The switch operating rod 169 is supported in the rear end unit 162 by a spring 169a. The spring 169a is provided to support the switch operating rod 169 and to bias the switch operating rod 169 in the leading end direction.

In the coupling portion 161, the pressing portion 168 is provided to the first holder 31. The pressing portion 168 is provided to cause the switch operating rod 169 to move in the rear end direction against a biasing force of the spring 169a.

When the pipe unit 2 is in the extended state, the switch operating rod 169 is moved in the rear end direction by the pressing portion 168, and the rear end-side end of the switch operating rod 169 comes in contact with the breaker switch 167 to thereby turn on the breaker switch 167. Thus, when the pipe unit 2 is in the extended state, the trigger signal line 37 is conducted.

When the pipe unit 2 is brought into the folded state, the pressing portion 168 moves away from the switch operating rod 169, and the switch operating rod 169 is thereby moved in the leading end direction by the biasing force of the spring 169a. This causes the rear end-side end of the switch operating rod 169 to be away from the breaker switch 167, and the breaker switch 167 is thereby turned off. Thus, when the pipe unit 2 is in the folded state, the trigger signal line 37 is interrupted. That is, the wiring breaker 166 of the present embodiment is another variation of the wiring breaker that completes and breaks the conductor according to the state of the pipe unit 2.

Consequently, according to the brush cutter 160 of the present embodiment, effects similar to those of the brush cutter 1 of the first embodiment can be obtained. Further, since the sensorless control with no use of rotation sensors is adopted in the brush cutter 160 of the present embodiment, the brush cutter 160 can be reduced in size and weight.

Tenth Embodiment

Figure 19:
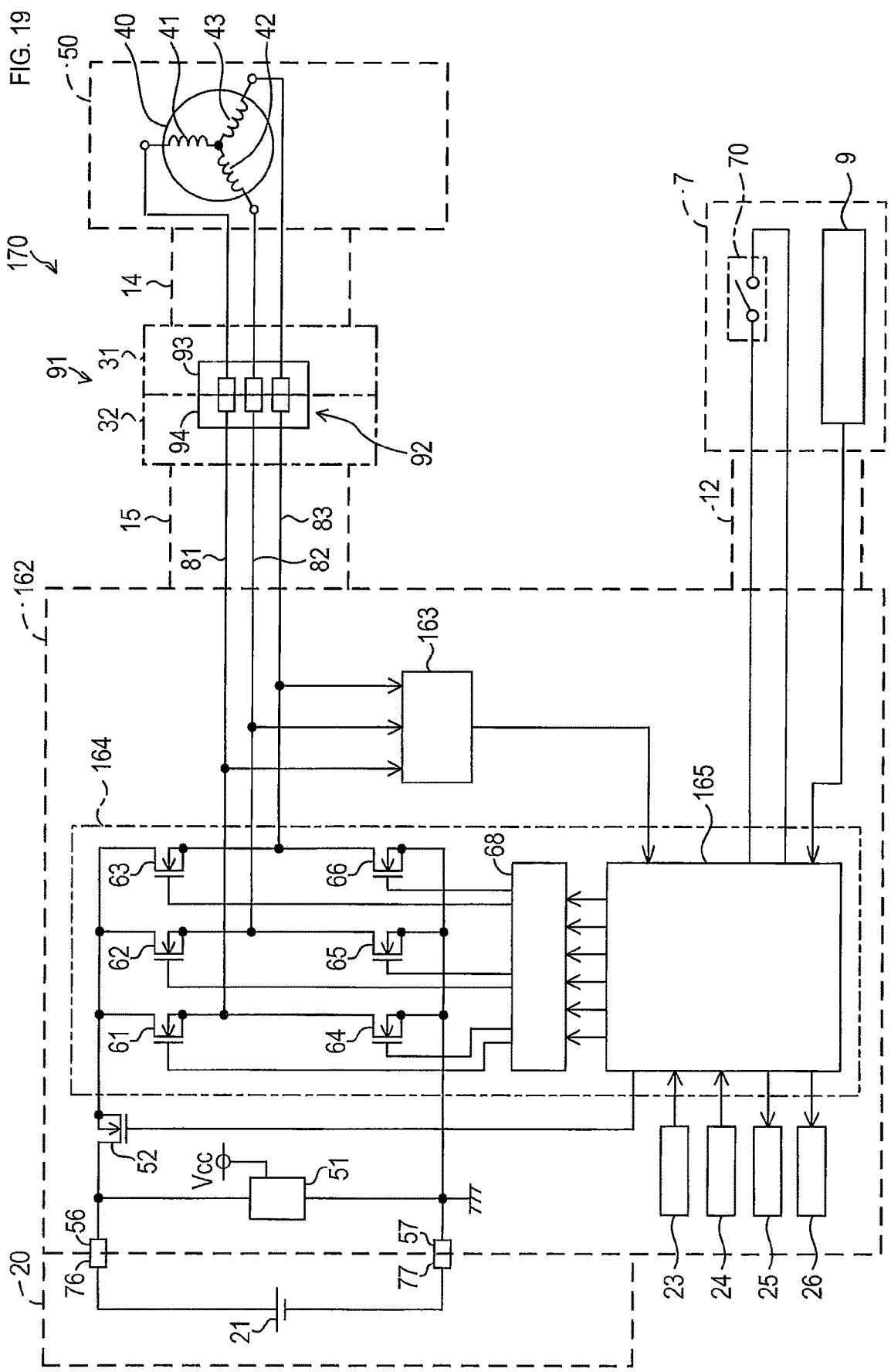
FIG. 19 is an explanatory diagram showing an electrical configuration of a brush cutter of a tenth embodiment.

As is obvious from comparison with the brush cutter 90 of the second embodiment shown in FIG. 8, a brush cutter 170 of a tenth embodiment shown in FIG. 19 is configured by changing the brush cutter 90 of the second embodiment so as to have a sensorless structure. Specifically, the brush cutter 170 of the present tenth embodiment is configured by removing the rotation sensors 46, 47, and 48, and the conductors 84 to 88 related to these sensors from the brush cutter 90 of the second embodiment.

Similarly to the brush cutter 160 of the ninth embodiment, the rear end unit 162 comprises the rotational position identifier 163, and the motor controller 165 controls the motor 40 on the basis of the rotational position information inputted from the rotational position identifier 163.

As in the second embodiment, the coupling portion 91 comprises the wiring breaker 92 that conducts and interrupts the three power lines 81, 82, and 83 according to the state of the pipe unit 2. When the pipe unit 2 is brought into the folded state, the three power lines 81, 82, and 83 are interrupted by the wiring breaker 92, and thus, the brush cutter 170 goes into a state in which power supply to the motor 40 cannot be performed.

Consequently, according to the brush cutter 170 of the tenth embodiment, effects similar to those of the brush cutter 90 of the second embodiment can be obtained. Further, since the sensorless control with no use of rotation sensors is adopted, the brush cutter 170 can be reduced in size and weight.

Eleventh Embodiment

Figure 20:
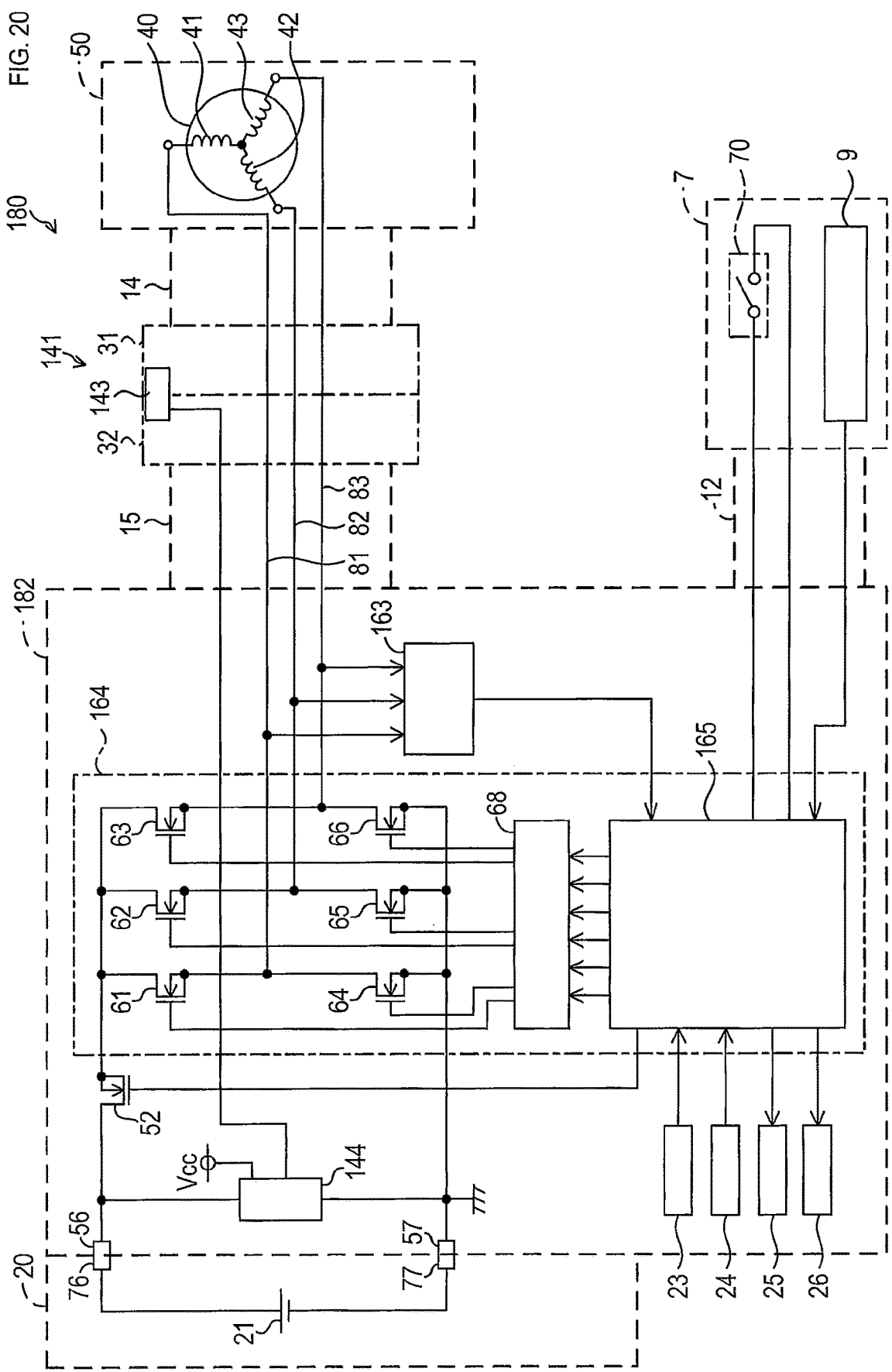
FIG. 20 is an explanatory diagram showing an electrical configuration of a brush cutter of an eleventh embodiment.

As is obvious from comparison with the brush cutter 140 of the seventh embodiment shown in FIG. 15, a brush cutter 180 of an eleventh embodiment shown in FIG. 20 is configured by changing the brush cutter 140 of the seventh embodiment so as to have a sensorless structure. Specifically, the brush cutter 180 of the eleventh embodiment is configured by removing the rotation sensors 46, 47, and 48, and the conductors 84 to 88 related to these sensors from the brush cutter 140 of the seventh embodiment.

Further, similarly to the brush cutter 160 of the ninth embodiment shown in FIG. 18, the rotational position identifier 163 is provided to a rear end unit 182, and the motor controller 165 controls the motor 40 on the basis of the rotational position information inputted from the rotational position identifier 163.

The fold detector 143 is provided to the coupling portion 141 as in the seventh embodiment. The pipe state signal outputted from the fold detector 143 is inputted to the regulator 144. When the pipe state signal inputted from the fold detector 143 indicates that the pipe unit 2 is in the folded state, the regulator 144 stops generation and output of the power-supply power.

Consequently, according to the brush cutter 180 of the eleventh embodiment, effects similar to those of the brush cutter 140 of the seventh embodiment can be obtained. Further, since the sensorless control with no use of rotation sensors is adopted, the brush cutter 180 can be reduced in size and weight.

Twelfth Embodiment

Figure 21:
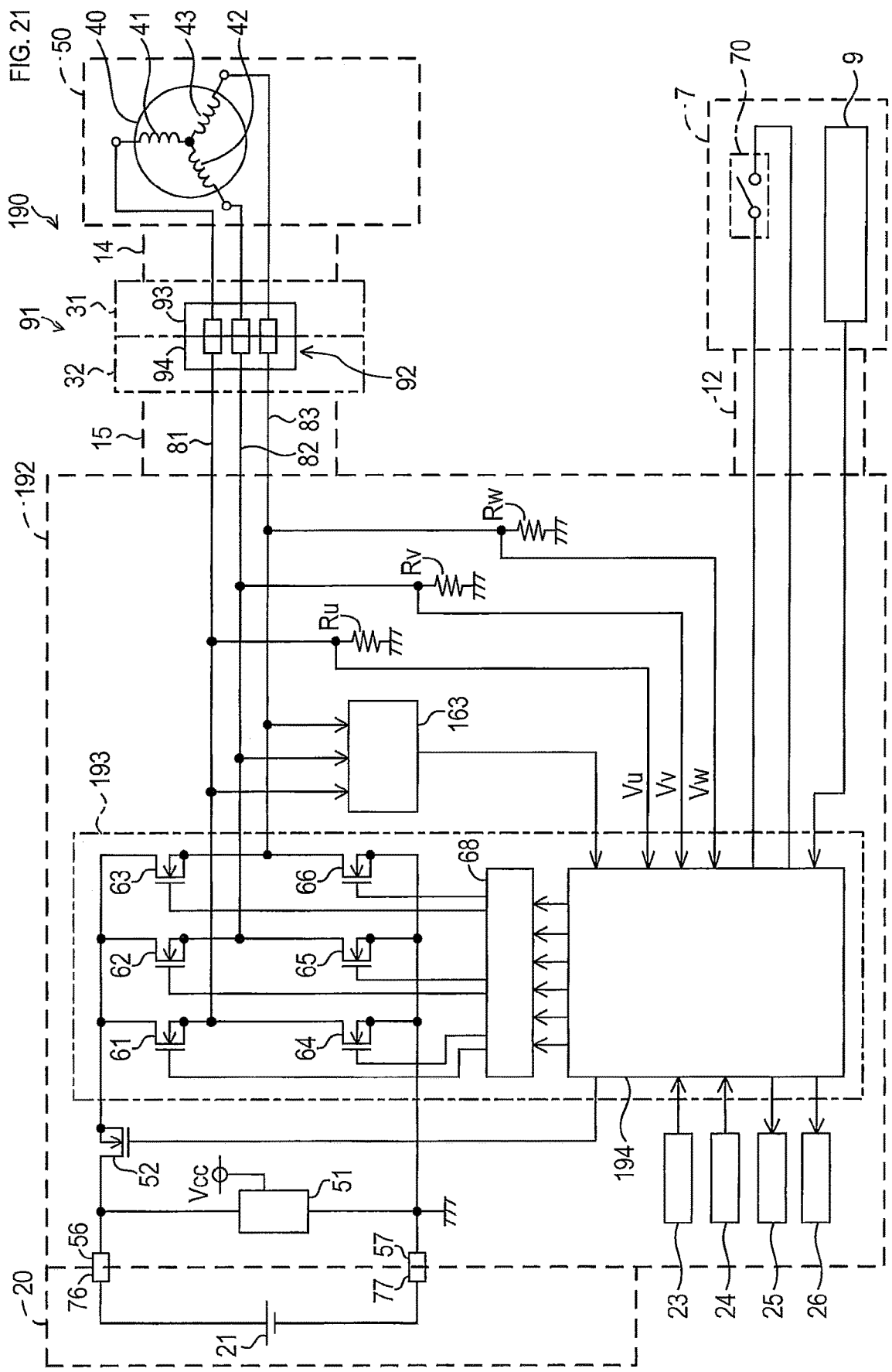
FIG. 21 is an explanatory diagram showing an electrical configuration of a brush cutter of a twelfth embodiment.

As is obvious from comparison with the brush cutter 150 of the eighth embodiment shown in FIG. 16, a brush cutter 190 of a twelfth embodiment shown in FIG. 21 is configured by changing the brush cutter 150 of the eighth embodiment so as to have a sensorless structure. Specifically, the brush cutter 190 of the twelfth embodiment is configured by removing the rotation sensors 46, 47, and 48, and the conductors 84 to 88 related to these sensors from the brush cutter 150 of the eighth embodiment.

Further, similarly to the brush cutter 160 of the ninth embodiment shown in FIG. 18, the rotational position identifier 163 is provided to a rear end unit 192, and a motor controller 194 within a controller 193 controls the motor 40 on the basis of the rotational position information inputted from the rotational position identifier 163.

As in the eighth embodiment, the coupling portion 91 comprises the wiring breaker 92 that conducts and interrupts the three power lines 81, 82, and 83 according to the state of the pipe unit 2.

Further, as in the eighth embodiment, the three resistors Ru, Rv, and Rw are provided to the rear end unit 192, and the respective phase voltage values Vu, Vv, and Vw, which are values of voltages of the corresponding resistors Ru, Rv, and Rw, are inputted to the motor controller 194. Similarly to the eighth embodiment, the motor controller 194 comprises the break detecting function based on the phase voltage values Vu, Vv, and Vw. When the trigger switch 70 is turned on, the motor controller 194 executes the break detecting processing shown in FIG. 17 before driving the motor 40.

Consequently, according to the thus-configured brush cutter 190 of the twelfth embodiment, effects similar to those of the brush cutter 150 of the eighth embodiment can be obtained. Further, since the sensorless control with no use of rotation sensors is adopted, the brush cutter 190 can be reduced in size and weight.

Thirteenth Embodiment

The folded state achieved by folding the pipe unit is one form of the non-extended state, in which the entire length of the pipe unit becomes shorter than that in the extended state. A specific form of the non-extended state may take various forms other than the folded state illustrated in the aforementioned respective embodiments.

For example, the pipe unit may be configured to be extendable and contractible in the longitudinal direction by adopting an extendable/contractible structure of a so-called telescopic type, which is heavily used in fishing rods, rod antennas, and so on. In this case, a state in which the pipe unit is extended so as to have a specified length is the extended state, and a contracted state in which the pipe unit is contracted so as to have a length shorter than the specified length is the non-extended state.

One example of a brush cutter comprising a pipe unit configured to be extendable and contractible will be described with reference to FIGS. 22A, 22B, and 23. A brush cutter 200 of a thirteenth embodiment shown in FIGS. 22A, 22B, and 23 has a configuration similar to that of the brush cutter 1 of the first embodiment shown in FIGS. 1 to 7 except for the extendable and contractible configuration of the pipe unit and a configuration to conduct and interrupt the trigger signal line 37. Thus, in FIGS. 22A, 22B, and 23, components common to those in the brush cutter 1 of the first embodiment are assigned with the reference numerals same as those in the first embodiment, and an explanation thereof is not repeated.

As shown in FIGS. 22A and 22B, in the brush cutter 200 of the thirteenth embodiment, an outer diameter of a first pipe 201 is somewhat smaller than an inner diameter of a second pipe 202. The rear end side of the first pipe 201 is inserted from the leading end side of the second pipe 202. The first pipe 201 is configured to be movable in the front-rear direction (in the left-right direction in FIGS. 22A and 22B) within the second pipe 202.

As the first pipe 201 is moved in the leading end direction with respect to the second pipe 202, the entire length of the pipe unit becomes longer. In contrast, as the first pipe 201 is moved in the rear end direction with respect to the second pipe 202, the entire length of the pipe unit becomes shorter.

FIG. 22A shows a state in which the first pipe 201 has been moved to a specified position in the leading end direction with respect to the second pipe 202. In FIG. 22A, the extended state is shown in which the pipe unit is fully extended to have the specified length. In contrast, FIG. 22B shows a state in which the first pipe 201 is moved in the rear end direction with respect to the second pipe 202 as compared with the extended state shown in FIG. 22A. In FIG. 22B, the non-extended state is shown in which the pipe unit is contracted.

Attached at a rear end of the first pipe 201 is a slider 201a. The slider 201a functions as a guide at the time of moving the first pipe 201 in the front-rear direction within the second pipe 202. Specifically, the first pipe 201 moves in the front-rear direction within the second pipe 202 in a state in which an outer peripheral surface of the slider 201a fixed to the first pipe 201 and an inner peripheral surface of the second pipe 202 are in contact with each other.

The slider 201a also comprises a function as a stopper. When the first pipe 201 is moved in the leading end direction to extend the pipe unit, the slider 201a inhibits the first pipe 201 from coming out of the second pipe 202. As the first pipe 201 is moved in the leading end direction, the slider 201a eventually comes in contact with a coming-off inhibiting face 202a at a leading end of the second pipe 202 as shown in FIG. 22A. As a result, further movement of the first pipe 201 in the leading end direction is inhibited.

Attached at the leading end of the second pipe 202 is a wiring breaker 210 that conducts and interrupts the trigger signal line 37 according to an extended/contracted state of the pipe unit.

Figure 23:
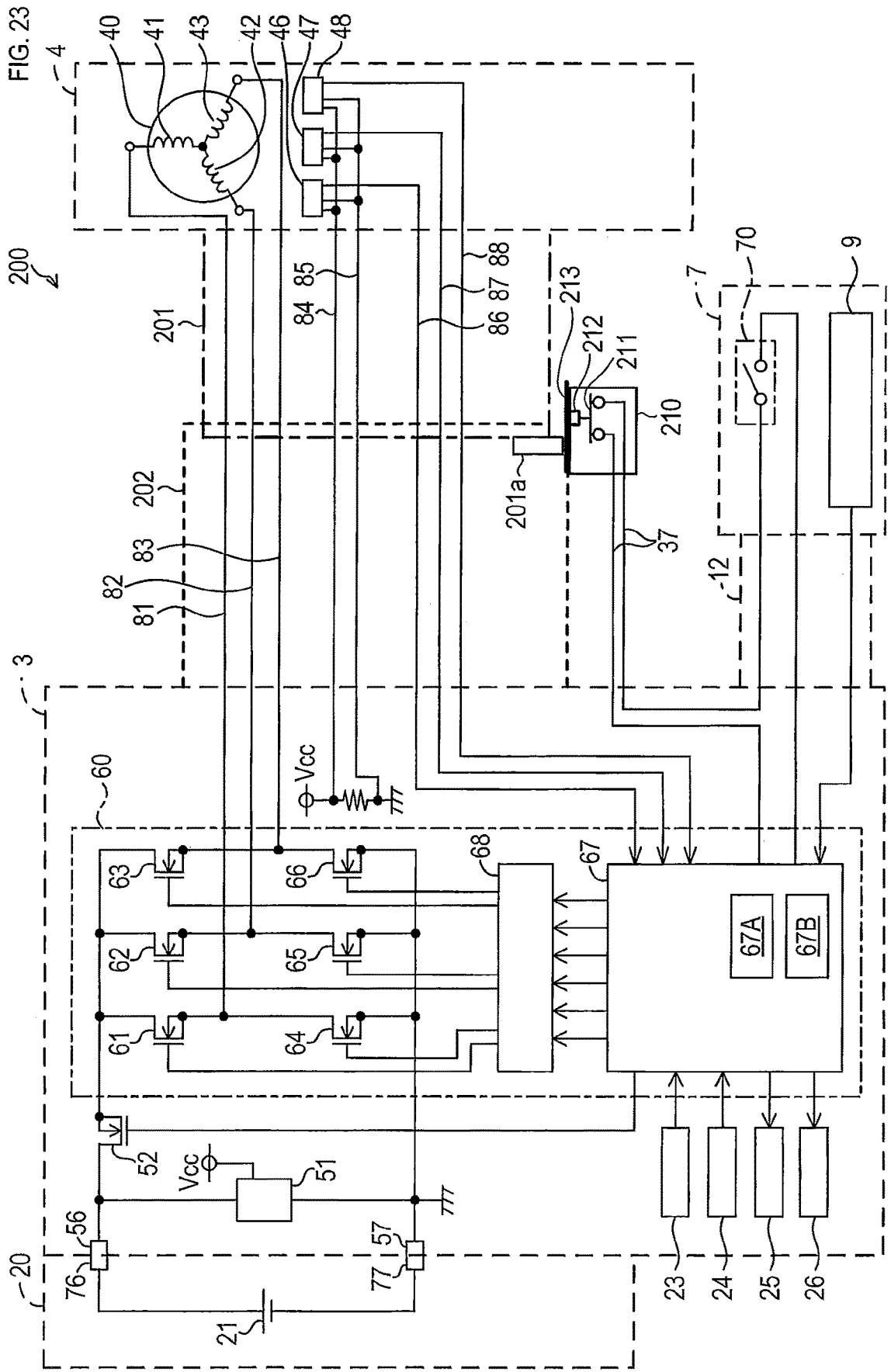
FIG. 23 is an explanatory diagram showing an electrical configuration of the brush cutter of the thirteenth embodiment.

As shown in FIGS. 22A, 22B, and 23, the wiring breaker 210 comprises a breaker switch 211 comprising two terminals, a movable portion 212 that connects and disconnects two terminals of the breaker switch 211 to/from each other, and a switch lever 213.

Two parts of the trigger signal line 37 are respectively coupled to the two terminals of the breaker switch 211. Specifically, as shown in FIG. 23, the two parts of the trigger signal line 37 are connected to each other via the breaker switch 211. In other words, the trigger signal line 37 couples the trigger switch 70 and the motor controller 67 to each other via the breaker switch 211.

The movable portion 212 is a member that turns on and off the breaker switch 211, and can move in the up-down direction. The movable portion 212 is biased in an upward direction by a not-shown biasing member. Thus, when no external force is applied to the movable portion 212, the movable portion 212 moves in the upward direction to turn off the breaker switch 211 as shown in FIG. 22B. As a result, the trigger signal line 37 is interrupted. At this time, the movable portion 212 becomes a state protruding from a casing of the wiring breaker 210 as shown in FIG. 22B.

In contrast, when an external force in a downward direction is applied to the movable portion 212, the movable portion 212 moves in the downward direction against a biasing force of the biasing member, and the breaker switch 211 is thereby turned on to conduct the trigger signal line 37. At this time, the movable portion 212 becomes a state pressed into the casing of the wiring breaker 210 as shown in FIG. 22A.

The switch lever 213 is a rod-shaped or plate-shaped member that moves the movable portion 212 in the up-down direction. A rear end side of the switch lever 213 is fixed to the casing of the wiring breaker 210. The switch lever 213 is configured to be pivotable about such a fixed portion. The switch lever 213 is biased in a direction away from the casing of the wiring breaker 210 by the not-shown biasing member. Thus, when no external force is applied to the switch lever 213, the switch lever 213 moves away from the casing of the wiring breaker 210 as shown in FIG. 22B. In this case, the movable portion 212 is not subject to any external force from the switch lever 213, and thus, the breaker switch 211 is turned off.

When the pipe unit is in the contracted state, as shown in FIG. 22B, no external force is applied to the switch lever 213, and thus, the breaker switch 211 is OFF. In contrast, when the pipe unit is in the extended state, as shown in FIGS. 22A and 23, the slider 201a of the first pipe 201 presses down the switch lever 213, and the movable portion 212 is thereby moved in the downward direction to turn on the breaker switch 211.

Due to such a configuration, in the brush cutter 200 of the present embodiment, when the pipe unit is in the extended state, the breaker switch 211 in the wiring breaker 210 is turned on to thereby conduct the trigger signal line 37 as shown in FIGS. 22A and 23. Thus, the cutting blade 5 can be rotated when the user operates the trigger operating portion 11. In contrast, when the pipe unit is in the contracted state, the breaker switch 211 in the wiring breaker 210 is turned off to thereby interrupt the trigger signal line 37 as shown in FIG. 22B. Thus, the cutting blade 5 is not rotated even when the user operates the trigger operating portion 11.

Although FIGS. 22A, 22B, and 23 show a state in which the two parts of the trigger signal line 37 are arranged between the wiring breaker 210 and the rear end unit 3 along an outer peripheral surface of the second pipe 202, such a state is just one example. A position and a manner for arrangement of the trigger signal line 37 may be decided as appropriate.

Further, it is just one example that the break-target conductor is the trigger signal line 37. At least one conductor other than the trigger signal line 37 may be set as the subject to be broken, or yet another at least one conductor may be set as the subject to be broken in addition to the trigger signal line 37.

Fourteenth Embodiment

An explanation will be given below, with reference to FIGS. 24A, 24B, and 25, about an example of a brush cutter as a fourteenth embodiment, which is different from that in the aforementioned thirteenth embodiment, configured such that a conductor is completed and broken according to an extended/contracted state of a pipe unit.

Figure 25:
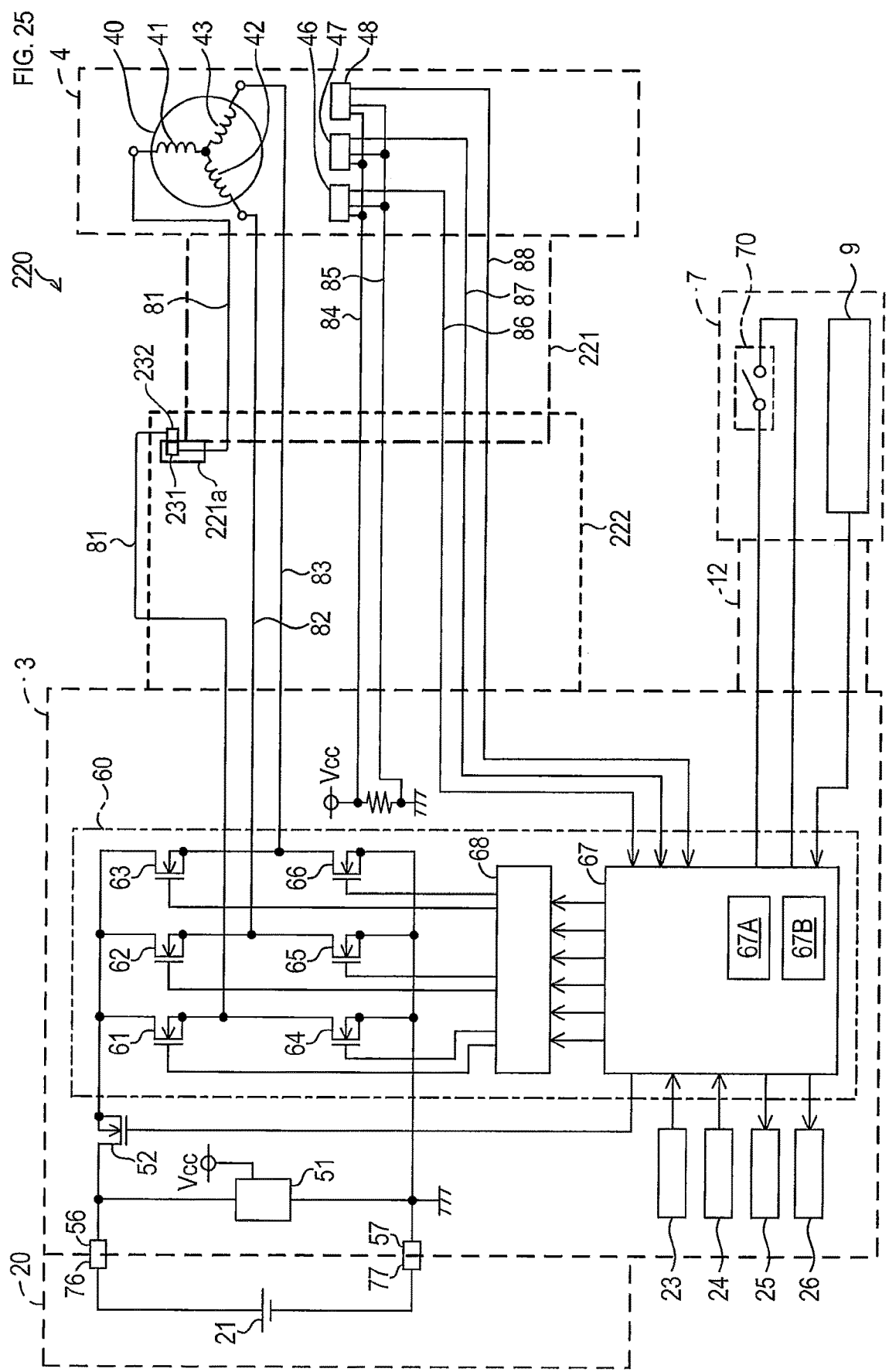
FIG. 25 is an explanatory diagram showing an electrical configuration of the brush cutter of the fourteenth embodiment.

A brush cutter 220 of the fourteenth embodiment shown in FIGS. 24A, 24B, and 25 is different from the brush cutter 200 of the thirteenth embodiment shown in FIGS. 22A, 22B, and 23 in terms of a break-target conductor and a configuration to break the break-target conductor.

Specifically, the brush cutter 220 of the fourteenth embodiment is configured such that the U-phase power line 81 is conducted and interrupted according to extension/contraction of the pipe unit. Such conduction/interruption is performed by coupling/decoupling of connectors caused by extension/contraction of the pipe unit.

As shown in FIGS. 24A and 24B, a first connector 231 is provided to a slider 221a of a first pipe 221. The U-phase power line 81 arranged within the first pipe 221 from the leading end unit 4 toward the rear end side is coupled to the first connector 231.

On the other hand, a second connector 232 is provided to the leading end side of a second pipe 222. The U-phase power line 81 arranged along the second pipe 222 from the rear end unit 3 toward the leading end side is coupled to the second connector 232.

When the pipe unit is in the extended state, as shown in FIGS. 24A and 25, the first connector 231 and the second connector 232 are coupled to each other, to thereby conduct the U-phase power line 81 via the connectors 231 and 232. In contrast, when the pipe unit is brought into the contracted state, as shown in FIG. 24B, the first connector 231 and the second connector 232 are decoupled from each other, to thereby interrupt the U-phase power line 81.

Although FIGS. 24A, 24B, and 25 show a state in which the U-phase power line 81 is arranged between the second connector 232 and the rear end unit 3 along an outer peripheral surface of the second pipe 222, such a state is just one example. A position and a manner for arrangement of the U-phase power line 81 may be decided as appropriate.

Further, it is just one example that the conductor to be broken by the connectors is the U-phase power line 81. A configuration may be adopted in which at least one conductor other than the U-phase power line 81 can be completed and broken by the connectors or in which yet another at least one conductor can also be completed and broken by the connectors in addition to the U-phase power line 81.

Other Embodiments

Although the embodiments of the present disclosure have been described so far, the present disclosure is not limited to the aforementioned embodiments, and can take various forms.

(1) The breaker switch to interrupt the trigger signal line 37 is provided within the coupling portion 16 in the first embodiment (FIG. 7), and is provided within the rear end unit 162 in the ninth embodiment (FIG. 18). However, the breaker switch may be provided in other position.

The specific configuration to turn on and off the breaker switch is not limited to that in which the switch lever 34 is used as in the first embodiment, and to that in which the pressing portion 168 and the switch operating rod 169 are used as in the ninth embodiment. Other configuration may be adopted that allows the breaker switch to be turned on when the pipe unit 2 is in the extended state and that allows the breaker switch to be turned off when the pipe unit 2 is in the folded state.

(2) In the aforementioned respective embodiments having the wiring breaker, the specific configuration of the wiring breaker may be replaced by a different configuration adopted in other embodiment. For example, in the brush cutter 1 of the first embodiment (FIG. 7), instead of the wiring breaker 30 having the breaker switch 36, a wiring breaker having a pair of connectors as in the wiring breaker 92 in the brush cutter 90 of the second embodiment (FIG. 8) may be adopted. Conversely, in the brush cutter 90 of the second embodiment, instead of the wiring breaker 92 having the pair of connectors, a wiring breaker having the breaker switch 36 as in the wiring breaker 30 in the brush cutter 1 of the first embodiment may be adopted.

(3) The conductor to be broken by the wiring breaker when the pipe unit 2 is in the folded state may be any one or more conductors among the plurality of conductors 81 to 88 arranged within the pipe unit 2. For example, all of the conductors 81 to 88 may be broken. Alternatively, three conductors, i.e., the U-phase power line 81, the sensor power-supply line 84, and the second sensor signal line 87, may be broken. The conductors to be broken when the pipe unit 2 is in the folded state may be any combination of the conductors 81 to 88, which combination provides, when broken, prohibition of driving of the motor 40.

The break-target conductor may be a conductor other than the trigger signal line 37 and the eight conductors 81 to 88. For example, a configuration may be adopted in which a conductor that couples the positive terminal 56 of the rear end unit and a drain of the main switching element 52 to each other is routed up to the coupling portion 16 of the pipe unit 2 and the conductor is broken in the coupling portion 16 by means of connectors or a breaker switch. That is, any conductor that provides, when broken, prohibition of driving of the motor 40 may be set appropriately as the conductor to be broken when the pipe unit 2 is in the folded state, among the conductors arranged within the brush cutter.

(4) It is just one example that the pipe unit has a straight shape as a whole as in the aforementioned respective embodiments, and various shapes may be adopted as a specific shape of the pipe unit. For example, the pipe unit may have a shape in which at least one portion thereof in the longitudinal direction is bent at a specified angle. In such a case, the pipe unit may be configured to be capable of being folded from the extended state, in which the at least one portion is bent at the specified angle. That is, the pipe unit may take a form in which the at least one portion thereof is bent at the specified angle in its extended state and may take a form folded from the extended state in its folded state.

Various forms may be adopted as a specific form of the folded state. For example, the pipe unit may be folded in various directions and/or at various angles. The pipe unit may be configured to be foldable in a direction opposite to a folding direction in the aforementioned embodiments. The pipe unit may be configured such that the first pipe 14 can be folded in the left-right direction.

A position where the coupling portion is provided is also discretionary. In other words, a foldable position in the pipe unit may be decided as appropriate. For example, the coupling portion 16 may be provided on a more rear end side than the handle 6, and the pipe unit may be configured to be foldable at the more rear end side than the handle 6. The pipe unit may have two or more foldable portions.

(5) The configuration to inhibit driving of the motor 40 when the pipe unit 2 is in the folded state adopted in the first to twelfth embodiments can be similarly applied to the brush cutter having the pipe unit configured to be extendable and contractible as shown in the thirteenth and fourteenth embodiments.

Specifically, in each of the first to twelfth embodiments, the pipe unit configured to be foldable may be replaced by the pipe unit configured to be extendable and contractible. The brush cutter may be configured, when the pipe unit is in the contracted state, to be electrically equivalent to the brush cutter in its folded state, and may be configured to prohibit driving of the motor 40 in an electrically similar manner.

The folded state shown in each of the aforementioned respective embodiments is one form of the non-extended state of the pipe unit, in which the entire length thereof is shorter than that in the extended state. Various forms can be taken as a specific form of the non-extended state apart from the folded states shown in the aforementioned respective embodiments.

(6) As the motor 40, a delta-connection brushless motor may be used or a motor other than a brushless motor may be used.

As the rotation sensor, a Hall sensor having an output format different from an open collector output format may be used. For example, a Hall sensor having a CMOS inverter output format may be used that can output signals of H level and L level. In such a case, pulling-up within the motor controller becomes unnecessary. The rotation sensor may be a sensor other than the Hall sensor.

(7) It is just one example that a drive circuit of the controller is a so-called three-phase inverter comprising the six switching elements 61 to 66. A drive circuit having other configuration may be used that can properly control a current flowing to the motor and can properly drive the motor as a drive source.

(8) Application of the present disclosure is not limited to application to the brush cutter to/from which the battery pack can be attached/detached. For example, the present disclosure can be applied also to a brush cutter having the battery 21 integrated into the rear end unit.

(9) In the aforementioned embodiments, the cutting blade 5 made of metal and having saw blade-like teeth formed on a circumference thereof over its entirety is illustrated as the working element that clips the plants. However, a material, a shape, and a structure of the cutting blade 5 are not limited to those of such an example. For example, a cutting blade made of resin, a nylon cord, or the like may be used as the cutting blade 5.

Application of the present disclosure is not limited to application to the brush cutter. Apart from the above-described brush cutter, the present disclosure can be applied to a working machine of various types having an operation rod, such as a pole hedge trimmer, a pole saw, and a pole clipper.

(10) Additionally, the functions performed by one component in the aforementioned embodiments may be performed by a plurality of components, or the functions performed by a plurality of components may be performed by one component. At least part of the configuration of each of the aforementioned embodiments may be replaced by a known configuration having a similar function. Part of the configuration of each of the aforementioned embodiments may be omitted. At least part of the configuration of each of the aforementioned embodiments may be added to or replaced by the configuration of the other embodiment. All aspects included in the technical idea specified only by the language recited in the claims are embodiments of the present disclosure.

What is claimed is:
1. A working machine comprising:
   a pipe unit including:
      a first pipe;
      a second pipe; and
      a coupling that (1) couples the first pipe and the second pipe, (2) is configured for folding the pipe unit, and (3) includes:
         a first holder attached to the first pipe;
         a second holder attached to the second pipe; and
         a pipe pivot pivotably connecting the first holder and the second holder;
   a handle attached to the second pipe and including a trigger switch;
   a leading end unit located at an end of the first pipe and including a motor;
   a rear end unit located at an end of the second pipe and including a motor controller;
   a wiring breaker including:
      a breaker switch that is part of one of the first holder and the second holder; and
      a switch lever that is part of the other of the first holder and the second holder and configured to:

activate the breaker switch to a breaker switch ON position when the pipe unit is in an extended state; and release the breaker switch to a breaker switch OFF position when the pipe unit is in a folded state; and a trigger signal line including:
  a first trigger signal line connecting the motor controller to a first node of the breaker switch;
  a second trigger signal line connecting a second node of the breaker switch to a first node of the trigger switch; and
  a third trigger signal line connecting a second node of the trigger switch to the motor controller; wherein:

the trigger switch is in a trigger switch OFF position unless activated by a user to a trigger switch ON position;

the trigger signal line is configured to transmit a trigger signal from the motor controller, serially through the breaker switch and the trigger switch, and then back to the motor controller when two conditions are simultaneously satisfied:
  i) the pipe unit is in the extended state such that the switch lever activates the breaker switch to the breaker switch ON position; and
  ii) the trigger switch is activated to the trigger switch ON position; and the motor controller is configured to not drive the motor unless the trigger signal through the breaker switch and the trigger switch is received by the motor controller.

2. A working machine comprising:
a pipe unit including:
  a first pipe;
  a second pipe; and
  a coupling that (1) couples the first pipe and the second pipe, (2) is configured for folding the pipe unit, and (3) includes:
    a first holder attached to the first pipe;
    a second holder attached to the second pipe; and
    a pipe pivot pivotably connecting the first holder and the second holder;
a handle attached to the second pipe and including a trigger switch;
a leading end unit located at an end of the first pipe and including a motor;
a rear end unit located at an end of the second pipe and including a motor controller;
a wiring breaker including:
  a breaker switch located in the coupling; and
  a switch lever located in the coupling and configured to:
    activate the breaker switch to a breaker switch ON position when the pipe unit is in an extended state; and
    release the breaker switch to a breaker switch OFF position when the pipe unit is in a folded state; and
a trigger signal line including:
  a first trigger signal line connecting the motor controller to a first node of the breaker switch;
  a second trigger signal line connecting a second node of the breaker switch to a first node of the trigger switch; and
  a third trigger signal line connecting a second node of the trigger switch to the motor controller; wherein:

the trigger switch is in a trigger switch OFF position unless activated by a user to a trigger switch ON position;

the trigger signal line is configured to transmit a trigger signal from the motor controller, serially through the breaker switch and the trigger switch, and then back to the motor controller when two conditions are simultaneously satisfied:
  i) the pipe unit is in the extended state such that the switch lever activates the breaker switch to the breaker switch ON position; and
  ii) the trigger switch is activated to the trigger switch ON position; and the motor controller is configured to not drive the motor unless the trigger signal through the breaker switch and the trigger switch is received by the motor controller.

3. A working machine comprising:
a pipe unit including:
  a first pipe;
  a second pipe; and
  a coupling that (1) couples the first pipe and the second pipe, (2) is configured for folding the pipe unit, and (3) includes:
    a first holder attached to first pipe;
    a second holder attached to the second pipe; and
    a pipe pivot pivotably connecting the first holder and the second holder;
a trigger switch;
a leading end unit located at an end of the first pipe and including a motor;
a rear end unit located at an end of the second pipe and including a motor controller;
a wiring breaker including:
  a breaker switch located in the coupling; and
  a switch lever located in the coupling and configured to:
    activate the breaker switch to a breaker switch ON position when the pipe unit is in an extended state; and
    release the breaker switch to a breaker switch OFF position when the pipe unit is in a folded state; and
a trigger signal line extending from the motor controller and wired so as to connect the breaker switch and the trigger switch in series and to return to the motor controller; wherein:

the trigger signal line is configured to transmit a trigger signal from the motor controller, serially through the breaker switch and the trigger switch, and then back to the motor controller when two conditions are simultaneously satisfied:
  i) the coupling is in the extended state such that the switch lever activates the breaker switch to the bracket switch ON position; and
  ii) the trigger switch is activated to the trigger switch ON position; and the motor controller is configured to not drive the motor unless the trigger signal through the breaker switch and the trigger switch is received by the motor controller.

4. The working machine according to claim 3, wherein the breaker switch is located in the first holder and the switch lever is located in the second holder.

5. The working machine according to claim 3, wherein the trigger signal line includes:
  a first trigger signal line connecting the motor controller to a first node of the breaker switch;
  a second trigger signal line connecting a second node of the breaker switch to a first node of the trigger switch, and
  a third trigger signal line connecting a second node of the trigger switch to the motor controller.

6. The working machine according to claim 3, further comprising a handle attached to the second pipe, wherein the trigger switch is located in the handle.

\* \* \* \* \*